(12) United States Patent
van Breen

(10) Patent No.: US 11,443,260 B1
(45) Date of Patent: Sep. 13, 2022

(54) SYSTEM FOR MANAGING AN INTEGRATED DRIVE-THROUGH RESTAURANT AND CARWASH FACILITY PROVIDING ESTIMATED WAIT TIMES VIA A GRAPHICAL USER INTERFACE

(71) Applicant: DBD Design Inc., Manchester Center, VT (US)

(72) Inventor: Edward T. van Breen, Manchester Center, VT (US)

(73) Assignee: DBD Design Inc., Manchester Center, VT (US)

( * ) Notice: Subject to any disclaimer, the term of this patent is extended or adjusted under 35 U.S.C. 154(b) by 5 days.

(21) Appl. No.: 16/948,958

(22) Filed: Oct. 7, 2020

Related U.S. Application Data

(60) Provisional application No. 62/911,546, filed on Oct. 7, 2019.

(51) Int. Cl.
| | |
|---|---|
| *G06Q 10/06* | (2012.01) |
| *G06Q 30/06* | (2012.01) |
| *G06Q 50/12* | (2012.01) |
| *B60S 3/04* | (2006.01) |
| *G06Q 20/20* | (2012.01) |
| *B60S 3/00* | (2006.01) |
| *G06Q 30/02* | (2012.01) |

(Continued)

(52) U.S. Cl.
CPC .......... *G06Q 10/06312* (2013.01); *B60S 3/04* (2013.01); *B65G 47/80* (2013.01); *G06N 20/00* (2019.01); *G06Q 10/109* (2013.01); *G06Q 20/202* (2013.01); *G06Q 30/0202* (2013.01); *G06Q 30/0613* (2013.01); *G06Q 30/0631* (2013.01); *G06Q 30/0637* (2013.01); *G06Q 30/0641* (2013.01); *G06Q 50/12* (2013.01); *G07C 9/10* (2020.01); *G08G 1/095* (2013.01); *B60S 3/004* (2013.01)

(58) Field of Classification Search
CPC .............. G06Q 20/202; G06Q 20/322; G06Q 30/0621; G06Q 30/0641; G06Q 20/20; G06Q 20/18; G06Q 50/12; G07F 17/0071; G07F 17/20
See application file for complete search history.

(56) References Cited

U.S. PATENT DOCUMENTS

| | | |
|---|---|---|
| 4,527,713 A | 7/1985 | Ingram |
| 5,139,100 A | 8/1992 | Brauneis |

(Continued)

OTHER PUBLICATIONS

A fast food drive thru combined with a car wash drive thru so you can get good and a wash in one pass Reddit.com, 2015 (Year: 2015).*

(Continued)

*Primary Examiner* — Scott L Jarrett
(74) *Attorney, Agent, or Firm* — Downs Rachlin Martin PLLC

(57) ABSTRACT

Quick service restaurants with car wash systems and traffic management systems for managing customer traffic and routing customers who have made food-only purchases and customers who have purchased both a food item and a carwash service. In some examples, graphical user interfaces incorporated in point of sale systems display time predictions for the delivery of food items and carwash services to aid and encourage customer selection of both food items and carwash services.

26 Claims, 36 Drawing Sheets

(51) Int. Cl.
  *G06Q 10/10* (2012.01)
  *G07C 9/10* (2020.01)
  *G06N 20/00* (2019.01)
  *G08G 1/095* (2006.01)
  *B65G 47/80* (2006.01)

(56) References Cited

U.S. PATENT DOCUMENTS

| | | | |
|---|---|---|---|
| 5,174,399 A | 12/1992 | Brauneis | |
| 5,371,681 A | 12/1994 | Juds et al. | |
| 5,493,315 A | 2/1996 | Atchley | |
| 5,636,710 A * | 6/1997 | Ables | E04H 3/04 186/41 |
| 6,070,156 A * | 5/2000 | Hartsell, Jr. | B67D 7/067 705/413 |
| 6,073,840 A * | 6/2000 | Marion | B67D 7/067 235/381 |
| 6,089,284 A * | 7/2000 | Kaehler | G06Q 50/06 141/94 |
| 6,116,505 A * | 9/2000 | Withrow | G06Q 20/342 235/375 |
| 6,415,555 B1 | 7/2002 | Montague | |
| 6,573,884 B1 * | 6/2003 | Kinzie | B67D 7/04 208/15 |
| 6,574,603 B1 * | 6/2003 | Dickson | G07C 5/0858 235/381 |
| 6,810,304 B1 * | 10/2004 | Dickson | B67D 7/067 700/231 |
| 7,185,809 B2 | 3/2007 | Barton et al. | |
| 7,213,753 B2 | 5/2007 | Barton et al. | |
| 7,422,148 B2 | 9/2008 | Barton et al. | |
| 7,801,763 B2 | 9/2010 | Sidlo et al. | |
| 8,224,699 B2 | 7/2012 | Wald et al. | |
| 8,229,790 B2 | 7/2012 | Wald et al. | |
| 8,234,171 B2 | 7/2012 | Sidlo et al. | |
| 8,386,322 B2 | 2/2013 | Williams et al. | |
| 8,438,065 B2 | 5/2013 | Sidlo et al. | |
| 8,702,018 B1 | 4/2014 | Rivera | |
| 8,818,879 B2 | 8/2014 | Robbins et al. | |
| 8,897,978 B2 | 11/2014 | Fyie et al. | |
| 9,047,596 B2 | 6/2015 | Williams et al. | |
| 9,104,537 B1 | 8/2015 | Penilla et al. | |
| 9,139,091 B1 | 9/2015 | Penilla et al. | |
| 9,171,268 B1 | 10/2015 | Penilla et al. | |
| 9,189,900 B1 | 11/2015 | Penilla et al. | |
| 9,215,274 B2 | 12/2015 | Penilla et al. | |
| 9,229,905 B1 | 1/2016 | Penilla et al. | |
| 9,244,133 B2 | 1/2016 | Icove et al. | |
| 9,262,760 B2 | 2/2016 | Carapelli et al. | |
| 9,288,270 B1 | 3/2016 | Penilla et al. | |
| 9,310,218 B2 | 4/2016 | Choi | |
| 9,348,492 B1 | 5/2016 | Penilla et al. | |
| 9,365,188 B1 | 6/2016 | Penilla et al. | |
| 9,426,225 B2 | 8/2016 | Penilla et al. | |
| 9,429,453 B1 | 8/2016 | O'Keefe et al. | |
| 9,488,723 B2 | 11/2016 | Elkins et al. | |
| 9,499,129 B1 | 11/2016 | Penilla et al. | |
| 9,600,813 B2 | 3/2017 | Sidlo et al. | |
| 9,663,067 B2 | 5/2017 | Penilla et al. | |
| 9,697,503 B1 | 7/2017 | Penilla et al. | |
| 9,702,725 B2 | 7/2017 | Choi | |
| 9,778,831 B2 | 10/2017 | Penilla et al. | |
| 9,817,404 B1 | 11/2017 | Loo et al. | |
| 9,818,088 B2 | 11/2017 | Penilla et al. | |
| 9,875,472 B2 | 1/2018 | Granbery et al. | |
| 9,916,071 B2 | 3/2018 | Penilla et al. | |
| 9,928,488 B2 | 3/2018 | Penilla et al. | |
| 10,032,212 B2 | 7/2018 | Winkelman et al. | |
| 10,037,520 B2 * | 7/2018 | Koralek | G06Q 20/202 |
| 10,089,669 B2 | 10/2018 | Hurst et al. | |
| 10,210,487 B2 | 2/2019 | Penilla et al. | |
| 10,210,777 B2 | 2/2019 | Carter | |
| 10,218,771 B2 | 2/2019 | Penilla et al. | |
| 10,225,350 B2 | 3/2019 | Penilla et al. | |
| 10,282,708 B2 | 5/2019 | Penilla et al. | |
| 10,286,919 B2 | 5/2019 | Penilla et al. | |
| 10,289,288 B2 | 5/2019 | Penilla et al. | |
| 10,346,836 B2 | 7/2019 | Karlsson | |
| 10,346,896 B1 | 7/2019 | Rajagopal et al. | |
| 10,354,476 B2 * | 7/2019 | Jones | G07F 11/16 |
| 10,360,551 B1 | 7/2019 | Perry | |
| 10,366,435 B2 | 7/2019 | Swinson | |
| 10,372,402 B1 | 8/2019 | Fitzgerald et al. | |
| 10,378,943 B2 | 8/2019 | Kim et al. | |
| 10,407,026 B2 | 9/2019 | Penilla et al. | |
| 10,442,399 B2 | 10/2019 | Penilla et al. | |
| 10,467,559 B1 * | 11/2019 | Svenson | G06Q 20/209 |
| 10,540,135 B1 | 1/2020 | Fitzgerald et al. | |
| 10,554,759 B2 | 2/2020 | Penilla et al. | |
| 10,572,123 B2 | 2/2020 | Penilla et al. | |
| 10,628,962 B2 | 4/2020 | Slattery et al. | |
| 10,943,289 B2 * | 3/2021 | Mattingly | G06Q 30/0639 |
| 10,943,311 B1 * | 3/2021 | Svenson | G06Q 20/20 |
| 10,977,606 B2 * | 4/2021 | Mimassi | G06Q 10/063114 |
| 11,182,864 B1 * | 11/2021 | Fox | G06Q 30/0621 |
| 11,328,372 B2 * | 5/2022 | Theobald | H04W 40/244 |
| 2001/0042007 A1 * | 11/2001 | Klingle | G07F 17/0014 705/14.26 |
| 2004/0210474 A1 * | 10/2004 | Hart | G06Q 10/06398 705/7.42 |
| 2004/0249497 A1 * | 12/2004 | Saigh | E04H 14/00 700/216 |
| 2005/0261974 A1 * | 11/2005 | Podratz | G06Q 30/06 705/22 |
| 2006/0144430 A1 * | 7/2006 | Ringdahl | G07F 17/20 134/123 |
| 2006/0178943 A1 * | 8/2006 | Rollinson | G06Q 30/0601 705/26.1 |
| 2007/0007331 A1 * | 1/2007 | Jasper | G07F 7/00 235/379 |
| 2007/0174142 A1 * | 7/2007 | Kissel, Jr. | G06Q 30/02 705/26.1 |
| 2007/0187183 A1 * | 8/2007 | Saigh | E04H 14/00 186/53 |
| 2008/0222004 A1 * | 9/2008 | Pollock | G06Q 30/0603 705/15 |
| 2008/0319864 A1 * | 12/2008 | Leet | G06Q 10/087 705/15 |
| 2010/0274633 A1 * | 10/2010 | Scrivano | G06Q 10/087 705/7.11 |
| 2010/0325003 A1 * | 12/2010 | Ringeman | G07F 13/025 705/21 |
| 2011/0258011 A1 * | 10/2011 | Burns | G06Q 50/12 705/7.15 |
| 2014/0249938 A1 * | 9/2014 | Garrett | G06Q 30/06 705/15 |
| 2014/0330623 A1 * | 11/2014 | Detrick | G06Q 30/0207 705/14.1 |
| 2014/0364164 A1 * | 12/2014 | Griffin | A63F 13/34 455/550.1 |
| 2014/0379530 A1 * | 12/2014 | Kim | G06Q 10/20 705/26.81 |
| 2015/0088671 A1 * | 3/2015 | Xiong | G06Q 30/016 705/15 |
| 2015/0310615 A1 * | 10/2015 | Bulan | G06K 9/6267 348/143 |
| 2015/0331094 A1 * | 11/2015 | Elkins | G06Q 10/04 367/118 |
| 2015/0379650 A1 * | 12/2015 | Theobald | H04W 4/80 705/15 |
| 2016/0171469 A1 * | 6/2016 | Pugh | G06Q 20/385 705/16 |
| 2016/0171592 A1 * | 6/2016 | Pugh | G06Q 30/0635 705/26.81 |
| 2017/0018041 A1 * | 1/2017 | Fox | G06Q 10/02 |
| 2017/0046800 A1 * | 2/2017 | Zomet | G06Q 50/12 |
| 2017/0076265 A1 * | 3/2017 | Royyuru | G06Q 20/3224 |
| 2017/0076274 A1 * | 3/2017 | Royyuru | G06Q 20/18 |
| 2017/0300888 A1 * | 10/2017 | Koralek | G06N 7/023 |
| 2018/0082352 A1 * | 3/2018 | Mattingly | G06Q 30/0601 |
| 2018/0082356 A1 * | 3/2018 | Wilkinson | G06Q 10/087 |

(56) References Cited

U.S. PATENT DOCUMENTS

2018/0082361 A1* 3/2018 Wilkinson ......... G06Q 30/0639
2018/0247381 A1* 8/2018 Cronin ................ H04W 4/02
2018/0345918 A1* 12/2018 Foerg ................ G06Q 30/0283

OTHER PUBLICATIONS

A fast food drive-through that is also a car wash Reddit.com 2013 (Year: 2013).*
My local Dunkin' Donuts used to be a car wash so the drive thru is inside the building Reddit.com (Year: 2017).*
Luann—comic strip Thecomicstrips.com, Apr. 19, 2015 (Year: 2015).*
http://highdeas.com/food/fast_food_car_wash; Fast Food Car Wash; accessed from website on Oct. 7, 2020; pp. 1-2.
https://www.reddit.com/r/CrazyIdeas/comments/1exksn/a_fast_food_drivethrough_that_is_also_a_car_wash/; A fast food drive-through that is also a car wash; accessed from website Oct. 7, 2020; pp. 1-8.
Dipaolo, Rich; Q&A: Adding a C-Store to a Carwash; Aug. 29, 2019, pp. 1-11.

* cited by examiner

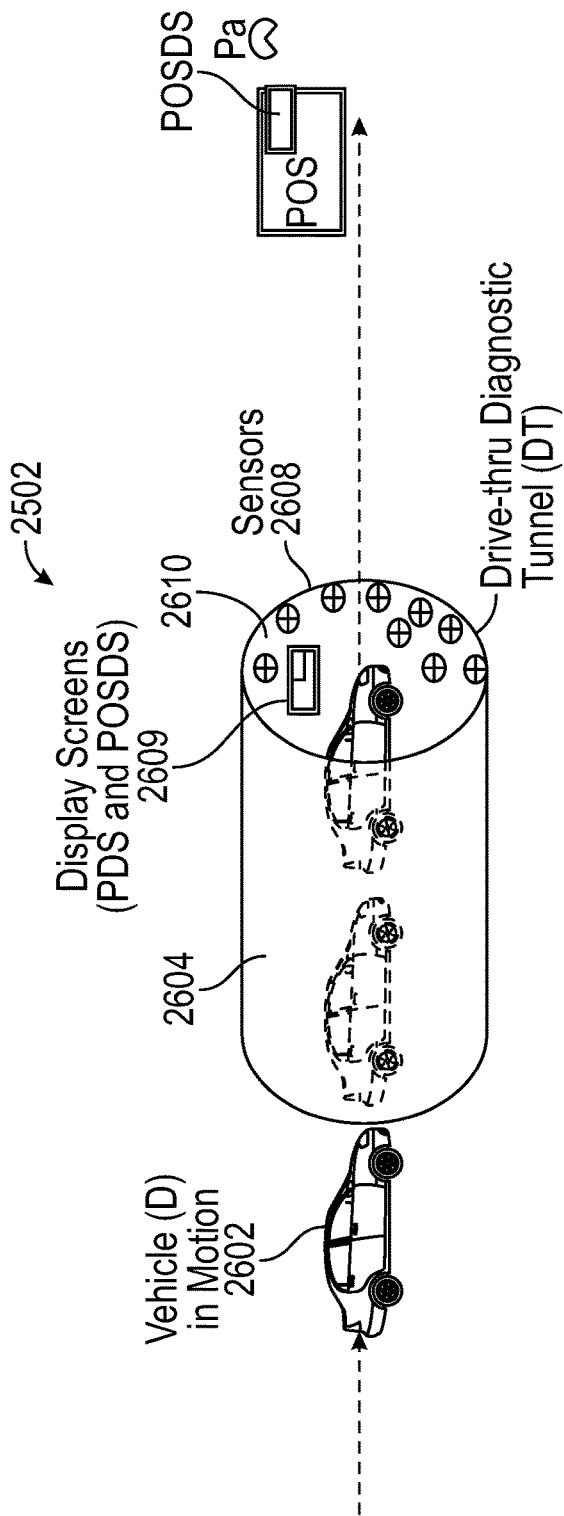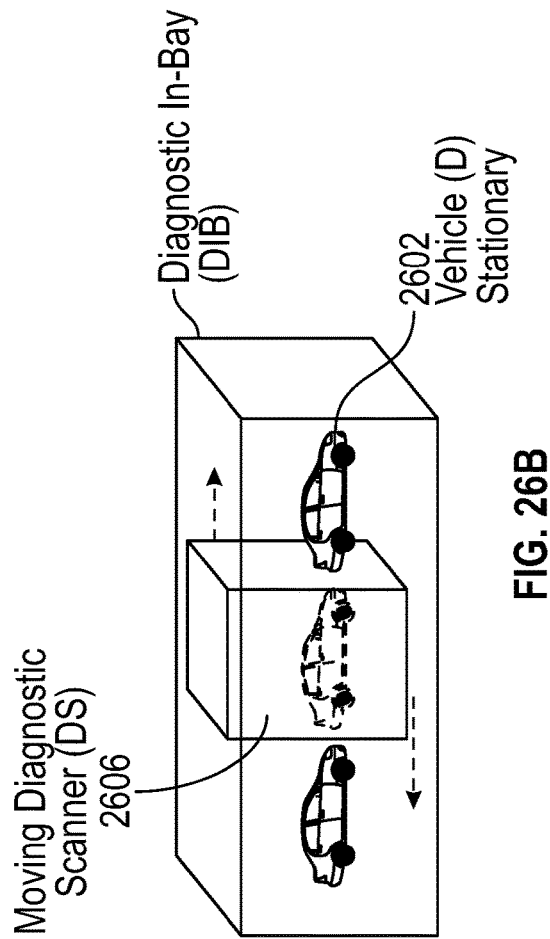
FIG. 26A
FIG. 26B

SYSTEM FOR MANAGING AN INTEGRATED DRIVE-THROUGH RESTAURANT AND CARWASH FACILITY PROVIDING ESTIMATED WAIT TIMES VIA A GRAPHICAL USER INTERFACE

RELATED APPLICATION DATA

This application claims the benefit of priority of U.S. Provisional Patent Application Ser. No. 62/911,546, filed Oct. 7, 2019, and titled "Drive-Thru Systems for Optimizing Time, Space and Service of Drive-Thru Operations of a Quick-Service Restaurant and Methods of Using the Same," which is incorporated by reference herein in its entirety.

FIELD OF THE DISCLOSURE

The present disclosure relates generally to the field of quick-service restaurants. In particular, drive-through systems for optimizing time, space and service of drive-through operations of quick-service restaurants and methods of using the same.

BACKGROUND

Quick service restaurant (QSR) establishments are designed to offer an alternative to home cooking and fine dining at restaurants. QSRs have limited menus and rarely provide table service by a waitstaff at a diner's table. The four core service elements of a QSR are convenience, affordability, predictability and speed. The element of speed was exponentially expanded when customers could order and receive their menu selections without ever leaving their cars and could select, order and pick up their food items in the drive-through lane of a QSR. Today, the greatest portion of a QSR business comes from its drive-through lane and QSRs have become commonly known as fast-food restaurants. The speed of service measured between the moment cars enter the drive-through lane and the moment they exit, (referred to herein in some examples and figures as the Origin-Destination Vector or O-D Vector) became the major platform on which QSR brands competed with each other.

The three core business elements of a QSR are profitability, volume and customer satisfaction. A typical QSR runs on thin profit margins; therefore, to be profitable high volume sales are needed, which are largely driven by repeat customers. Customer satisfaction is thus of utmost importance. Today, customers judge QSR brands based on their overall experience, no longer just speed. Finding a formula that squares all the four core elements of service with the three core business elements in a satisfactory manner and for all stakeholders has proven to be elusive. Customers are increasingly feeling entitled to better-quality food and thus have added a fifth element for QSRs to meet—customer satisfaction. In addition, this demand for higher-quality food has put pressure on the profitability of QSR establishments. This in turn resulted in ever-changing, more unpredictable menu items as QSRs are continuing to seek a balance between profitability for themselves and affordability for their customers. At the same time, higher-quality food items often require longer preparation times resulting in increased wait times for customers, including drive-through wait times which has negatively impacted the perception of convenience, the core attraction of a QSR.

SUMMARY OF THE DISCLOSURE

In one implementation, the present disclosure is directed to a quick service restaurant (QSR). The QSR includes a building, a point of sale (POS) apparatus, a pickup window, and a drive through for routing customer vehicles from the POS apparatus to the pickup window; and a carwash system that includes at least one automatic carwash apparatus; wherein the drive through includes an optional carwash portion that routes at least a portion of the customer vehicles to the automatic carwash apparatus to provide an optional carwash service to the customer vehicles while the customer vehicles are in the drive through and en route to the pickup window; wherein the POS apparatus includes a graphical user interface (GUI) that displays a plurality of QSR menu items, a plurality of carwash menu items, and at least one time prediction display portion, wherein the at least one time prediction display portion displays a predicted impact on a drive through wait time due to the addition of one of the carwash menu items to a selection of one or more of the QSR menu items.

In another implementation, the present disclosure is directed to a method of providing a quick service restaurant (QSR) food item and a carwash service at a facility that includes a drive through. The method includes displaying, on a point of sale (POS) graphical user interface (GUI), a plurality of QSR menu items and a plurality of carwash menu items; in response to a customer selection of one of the carwash menu items and one of the QSR menu items, directing a customer vehicle to an automatic carwash apparatus for receipt of a carwash service and upon completion of the carwash service, directing the customer vehicle to a pickup window for receipt of the QSR menu item; and in response to a customer selection of only one or more of the QSR menu items, directing a customer vehicle to bypass the automatic carwash apparatus and go directly to the pickup window.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein:

FIG. 26A is another illustration of the AVCD system of FIG. 25;

FIG. 26B is another illustration of the AVCD system of FIGS. 25 and 26A;

DETAILED DESCRIPTION

Aspects of the present disclosure include methods for utilizing the wait time and space of a brick-and-mortar QSR to incorporate car wash (CW) services to the presentation of options to a customer at a drive through QSR establishment. In some examples, a wait time includes, but is not limited to, the time period between ordering a product at a point of sale (POS) terminal, device, or application, and receiving the product at a pick-up window (PUW). Systems of the present disclosure include systems for the control of drive-through operations of a QSR establishment that, in some examples, also includes a CW service, in some examples, a CW system is configured to wash a vehicle within the wait time for a food order and in the available space of a QSR, for example a drive-through lane of a QSR. In some examples, traffic management and routing systems at the QSR facility facilitate routing of customer vehicles in a variety of manners including separating customers that have elected to order only food from customers that have ordered food and a carwash, and facilitating the flow of customer vehicles, including the efficient flow of a plurality of customer vehicles that have chosen a car wash to ensure each customer's carwash is complete and each customer has received his or her food order in a minimum amount of time, and in some examples, in the same amount of time as if the customer had not obtained a carwash. In some examples, systems, apparatuses and methods are provided for optimizing the prime real estate and customer experiences of QSR establishment.

Figure 1:
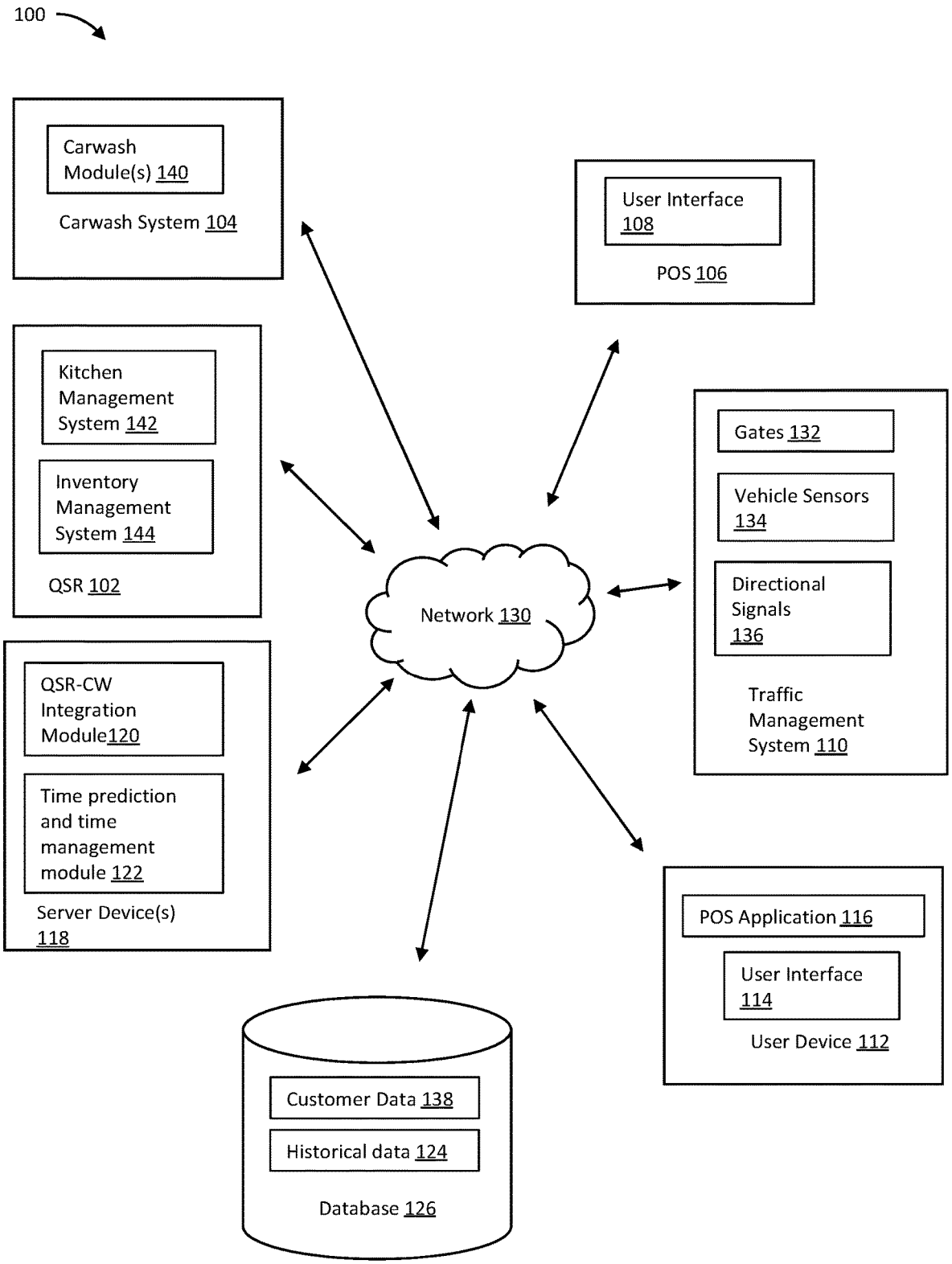
FIG. 1 is a functional block diagram of one example of a system that includes a quick service restaurant (QSR) and a car wash (CW) system.

FIG. 1 is a functional block diagram of an example system 100 made in accordance with the present disclosure that includes both a QSR 102 and a CW system 104 and that is designed and configured to efficiently provide both food and carwash services in an efficient manner and with an efficient use of commercial real-estate space to thereby provide a combination of services that are superior to prior art QSR and CW systems. In the illustrated example, system 100 includes a POS 106 that may include a user interface 108 for displaying a plurality of options to a customer including QSR food options, CW options, and combinations thereof, and receiving customer order information. System 100 may also include a traffic management system 110 for managing vehicle traffic. In some examples, system 100 may be configured to communicate with one or more user devices 112, for example to provide functions similar to POS 106, such as to display QSR and CW options and receive customer orders via a user interface 114. Implementations include receipt of customer orders via user device 112 through the execution of a POS mobile application 116 stored on and executed by the user device, and/or via a web application executed by the user device 112. System 100 may also include at least one server device 118 which may be a computing device configured to provide one or more control functions for any of the components of system 100. In some examples, server device 118 includes a QSR-CW integration module 120 which may include instructions for receiving data and providing instructions to other components of system 100 for coordinating the efficient provision of food and carwash services. Server device 118 may also include a time prediction and time management module 122 with instructions for receiving data, such as real time data from QSR 102, carwash system 104, and traffic management system 110, as well as historical data 124 stored in a database 126 for dynamically determining an estimated amount of time it will take QSR 102 to prepare one or more food items, an estimated amount of time it will take carwash system 104 to perform a carwash service, and displaying time predictions to a customer, for example via user interface 108 of POS 106 and/or user interface 114 of user device 112.

The components of system 100 may be configured to communicate with other components of the system via a network 130 which may have any configuration and topology known in the art. For example, network 130 can include direct device to device communication as well as any suitable public and/or private communications network such as a private local area network (LAN) operatively coupled to a wide area network (WAN), such as the Internet. In some cases, network 130 may include one or more second-generation (2G), third-generation (3G), and/or fourth-generation (4G) mobile communication technologies. In some cases, network 130 may include a wireless local area network (WLAN) (e.g., Wi-Fi wireless data communication technologies). In some instances, network 130 may include Bluetooth wireless data communication technologies. In some cases, network 130 may include supporting infrastructure and/or functionalities, such as a server and a service provider. The components of system 100 may include communication modules for wired and wireless communication and be configured for communication with other components, for example through across network 130, utilizing any wired and/or wireless communications protocols known in the art, including, for example, a Wi-Fi protocol, a Bluetooth protocol, RFID technology and protocols, near field communication (NFC) technology and protocols, and/or a Zig-Bee protocol, etc.

POS 106 may have a variety of configurations known in the art of POS systems and in one implementation may be a computing device located proximate the entrance of a drive through lane and user interface 108 may include a graphical display for displaying QSR menu items and CW menu items. In some examples, POS 106 may receive real-time data from other components of system 100 and be configured to display time information associated with various menu items. In some examples, POS 106 may be configured to display or otherwise identify one or more CW services that can be received without delaying the time to receive a food item, and/or display an additional amount of time to receive a CW service relative to the amount of time it would take to just receive a given food item without the CW service. Similarly, POS 106 may be configured to display or otherwise identify one or more food items that can be received without delaying the time to complete a CW service and/or display an additional amount of time to receive a CW service relative to the amount of time it would take to just receive a given food item.

In some examples, substantially the same user selections and functionality provided by POS 106 may be provided via user device 112. For example, a user may make a series of selections via user interface 114 while en-route to the QSR 102 and CW system 104, where user interface 114 may include a display of user control elements and information associated with QSR 102 and CW system 104, such as QSR and CW menu items and time information to assist a user in his or her selection of items. User device 112 may be configured to display POS menu items via a web browser and/or via a mobile app downloaded to the user device as is known in the art. User device 112 may be any type of computing device known in the art, such as a mobile phone, tablet, laptop, smartwatch, etc. User interface 108 and user interface 112 may have any feature of user interfaces known in the art, including a display screen for providing a graphical user interface including a touch and pressure-sensitive display for displaying graphical user control elements, receiving user control inputs and measuring a pressure of a user's touch on the display, and one or more hard control elements, such as buttons, switches, dials, etc. for receiving user controls.

In some examples, after making a selection via a user device 112 while en-route to a QSR 102, a user may provide an arrival indication to system 100 when the user has arrived at the drive through lane so that the user's food items can be prepared by the QSR 102 and, if applicable, traffic management system 110 can route the user to CW system 104 and otherwise track a status of the user as his or her vehicle progresses through a drive through lane. System 100 may be configured to receive an arrival signal that the customer has arrived at the drive though in any of a variety of ways. For example, by receiving a user selection via user interface 114, such as a user selection of an "I'm here!" user control element displayed on a touch screen display of user interface 114. In other examples, after completing an order, the user may receive a unique machine readable symbol, such as a QR code or bar code that is associated with the user's order that the user may display at POS 106 when he arrives. For example, a user may be instructed to hold his phone up to a camera of the POS 106 so a QR code displayed on user interface 114 of user device 112 can be imaged and read by the POS. In yet other examples, the customer may provide a license plate number and a vehicle identification sensor (one of vehicle sensors 134) located at a drive though entrance may be configured to capture images of vehicle license plates, process the images with a machine vision algorithm and recognize when a vehicle with the user-provided license plate number has arrived.

Traffic management system 110 may be configured to route car traffic through one or more drive through lanes and provide real-time data to other components of system 100, such as data on a current location of vehicles in the drive though lanes. In one example, traffic management system includes moveable gates 132, vehicle sensors 134, and directional signals 136 which may be controlled by one or more computing devices operably coupled to traffic management system 110. In one example, one or more of gates 132 and directional signals 136 are configured to instruct vehicles to move or stop and to direct vehicles to one or more drive through lanes. Vehicle sensors 134 may be located at a plurality of locations throughout a drive though lane and be configured to detect the presence of a vehicle at a particular location. Vehicle sensors 134 may include any of a variety of sensor types known in the art, including any type of proximity or presence sensor such as one or more of light sensors, acoustic sensors, photo-resistor and temperature sensors, proximity and infrared (IR) transceivers, ultrasonic and infrared distance sensors, laser range sensors, encoders, stereo cameras, and pressure sensors for detecting the presence of a vehicle. Vehicle sensors 134 may also include identification sensors for determining identification information for a particular vehicle or customer associated with the vehicle. In some examples, a vehicle identification sensor may be located at the entrance of a drive though lane for checking each vehicle for identification information and comparing detected information to customer data 138 stored in database 126, for example, for identifying user preferences and modifying a display of items on POS 106. In some examples, customers may be provided with a unique identification number that can be detected by vehicle sensors 134 as the vehicle progresses through a drive though lane. Any of a variety of techniques may be used to facilitate user ID tracking as the user progresses through a drive through lane. For example, user device 112 may be configured to continuously transmit a unique identification number via a wireless communication protocol, such as Wi-Fi, Bluetooth, RFID, NFC, or ZigBee, etc. while the user progresses through a drive through lane and vehicle sensors 134 located along the drive through lane may be configured to detect the unique customer signals and transmit the detected signals to, e.g., server device 118 for tracking a status of customers in the drive through lane. In other examples, customers may be given disposable RFID or NFC tags when they are at POS 106 that include a securing element for temporarily securing the tag to the vehicle, such as by a clip, magnet, or adhesive.

CW system 104 may include one or more CW modules 140 configured to wash one or more cars. CW module(s) 140 may be permanently or temporarily installed, may be configured to connect to local utilities, such as electrical, water, and sewer, or may be self-supporting for one or more of electrical, water, and sewer. CW modules 140 may include any type of CW system known in the art, such as in-bay, tunnel, contact, and/or touchless carwash system. In some implementations, CW modules 140 may include one or more mobile CW modules configured to move along a drive through lane of a QSR and/or configured to be transported to and from QSR locations. In some implementations, CW modules 140 include transportable standalone systems that can be quickly and easily installed at a QSR and operate without requiring hookup to one or more utilities typically needed by a CW system, such as water supply, electrical supply, and/or water disposal. CW system 104 may be configured to transmit status information to other components of system 100, including server device 118 for providing status information, such as whether each CW module 140 is idle, loading a new vehicle, car wash in progress, or unloading a vehicle and details on a wash cycle being performed, such as type of wash, percent complete, and time remaining.

QSR 102 may be any type of QSR known in the art and in the illustrated example includes a kitchen management system 142 configured to receive orders from POS 106 and/or user device 112 and track the status of preparation of each order via inputs from QSR staff. QSR 102 also includes an inventory management system 144 that is operably coupled to kitchen management system 142 and provides a current status of inventory for each ingredient of each QSR menu item. QSR 102 may also include any other component typically found at a QSR, such as any type of kitchen equipment for storing and cooking food, including ovens, fryers, prep stations, refrigerators and freezers, etc. (not illustrated).

Server device 118 may be configured to send and receive data from one or more components of system 100 and provide control signals to one or more components of the system. For example, time prediction and time management module 122 may be configured to calculate a time duration for preparation of any combination of items on a QSR menu and may be configured to calculate a time duration for the execution of any carwash service made available by CW system 104. In one example, time prediction calculations may be based on historical data 124 as well as real time information from the components of system 100. Historical data 124 may include historical time duration data from prior instances of preparing each QSR menu item and for executing each CW service. In addition to time durations, the historical data 124 may also include additional data that is associated with each time duration value, such as time of day, day of the year, weather conditions, staffing level, etc. when the prior QSR meu item was prepared or CW service performed and that is associated with the time duration data and that can be used to predict future time durations. Historical data 124 may also include nominal or baseline expected time durations for each QSR and CW menu item. Real time data may include any real time data provided by the components of system, such as, time of day, day of the year, current weather conditions, current staffing level. Real time data may also include real time food order que information for QSR 102 and CW system 104 which may include a number of orders in que and a status of each order, (for example, not yet started, in progress, complete and at pickup window, delivered). Time prediction and time management module 122 may also be configured to compare que information to inventory information from inventory management system 144 to predict inventory shortages and compare status information from kitchen management system 142 to que information to predict preparation time. For example, if a particular piece of kitchen equipment, such as a deep fryer or oven is currently being used and will be required for a number of items in the que, time prediction and time management module 122 may use that information to calculate an increased time duration for a subsequent order that also requires the same kitchen equipment and a shorter time duration for an item that only requires a piece of kitchen equipment that is idle or further from full capacity. Time prediction and time management module 122 may also be configured to receive real time data from CW system 104 and que information to calculate a time duration prediction for CW services. For example, as the number of vehicles in que and the anticipated time duration of each service increases, the predicted time duration for the next customer to receive a particular CW service may be increased, according to a capacity of the CW system.

In some implementations, time prediction and time management module 122 may be configured with one or more artificial intelligence or machine learning algorithms for learning from historical data 124 to determine a predicted time duration. In some examples, machine learning algorithms include one or more models that may utilize training instances to provide a time prediction. Machine learning broadly refers to utilizing algorithms to learn from data and identify and compare patterns in data. A variety of different types of machine learning techniques may be employed in embodiments of the present disclosure. Non-limiting examples of machine learning techniques that may be employed include decision tree and association rule learning, supervised, unsupervised, or semi-supervised learning, and classification, regression, and clustering techniques, among others. One example implementation utilizes supervised classifier machine learning models and algorithms. In some examples, supervised learning models utilizing Support Vector Machines (SVM) may be used. As will be appreciated, these models are merely provided by way of example and other machine learning techniques may also be utilized to provide a digital impairment assessment in accordance with the present disclosure.

In some examples, time prediction and time management module 122 may be configured to learn from historical data 124 to train one or more classifiers and learn from the data and provide a time prediction based on the machine learning classifiers that, in some examples, are continuously updated with information as new data is received. In some examples, time prediction and time management module 122 may be configured to leverage both supervised and unsupervised artificial intelligence and classification and clustering methods to calculate time predictions. Artificial intelligence, classification, and clustering methods may include but are not limited to: logistic regression, decision trees, and neural network models in which previously captured/collected or existing historical data and also aggregate or larger scale time performance data from other locations is utilized in the time prediction analysis.

In some implementations, an order and fulfillment process within an O-D Vector may include, when a vehicle arrives at a QSR premises, the guest vehicle is recognized, for example, by a vehicle sensor 134, and the information compared to customer data 138 in database 126, where customer name and/or preferences have been recorded and which could be displayed upon approach to the POS 106 on user interface 108. The vehicle recognition process may also include checking database 126 to determine if an order has already been remotely ordered, for example, via POS application 116 and user device 112, where vehicle registration may be part of the order and payment transaction. The order can be automatically displayed on the POS screen of POS 106 and QSR 102 may begin the food preparation sequence. In one example, throughout the day, the wait time (also referred to herein as the dwell time) of cars can be monitored and recorded by a series of vehicle identification sensors (SVI), vehicle recognition sensors (SVR) and vehicle detections sensors (SVD). In one example, one or more sensors and methods of use described in U.S. Pat. No. 9,488,723, titled "Method and system of controlling a Drive-through operation of a quick-service restaurant," which is incorporated by reference herein in its entirety, may be used. POS 106 may be configured to display a customer's order together with projected wait time, but also together with a projected wait time for the same food item in combination with a carwash. The customer's selections, including choice of carwash from the carwash menu and/or choice of food item from the food menu is communicated to other components of the system, including CW system 104, QSR 102, server device 118. In response to receipt of the user selections, server device 118 may send control signals to traffic management system 110 to direct and monitor the customer vehicle through the drive through so the guests arrive at the food pickup location with or without a car wash when their food is fully prepared and ready for pick up.

Figure 2:
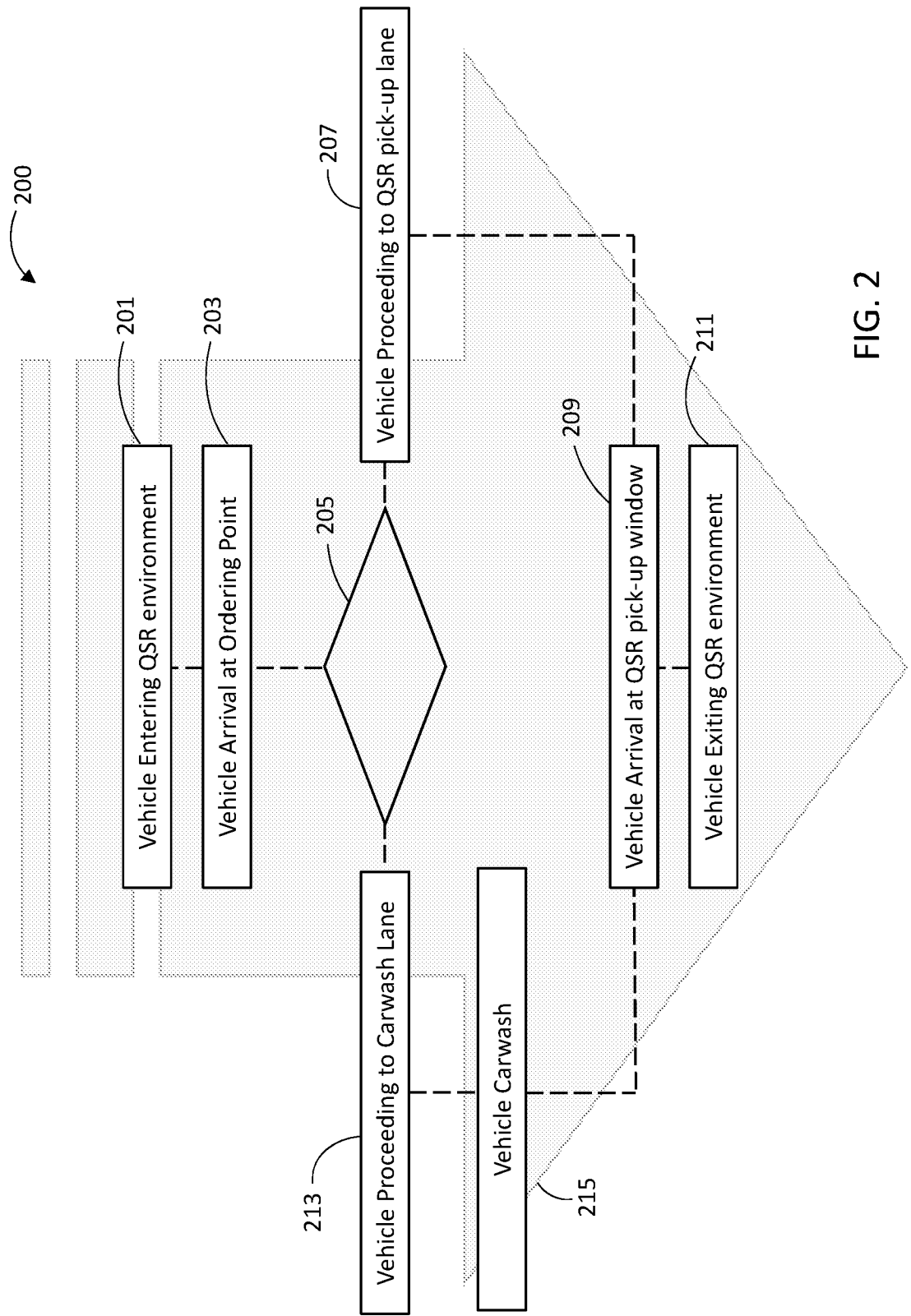
FIG. 2 is flow chart for one example method of using a system that includes both QSR and CW components.

FIG. 2 illustrates a flow chart for one example method 200 of using a system, such as system 100 that includes both QSR and CW components. In the illustrated example, at block 201, a vehicle enters the QSR environment and at block 203 the vehicle proceeds to an ordering point such as a window or standalone POS kiosk (e.g., POS 106), where orders and choices are made. In examples where a user had previously placed an order, for example via user device 112, the user can indicate his or her arrival when he or she has arrived at the ordering point. At the ordering station, in some examples, a vehicle recognition system using, e.g., vehicle sensors 134, may recognize the customer's preferences which become part of the overall order. At block 205, the user considers the options presented to him at POS 106, including time duration information, which may be determined by server device 118, and in the illustrated example, decides whether to only order food or to also order a carwash. At block 207, the customer has elected to proceed into the drive-through lane and simply wait for the QSR food items and the vehicle enters a dedicated food pickup lane before arriving, at block 209, at a QSR food pick-up window and then at block 211, exiting the facility. On the other hand, if at block 205 the customer elected to utilize the dwell time while waiting for her food items to be prepared, at block 213 the vehicle first enters into a carwash lane and at block 215 proceeds into the vehicle carwash, e.g., one of CW modules 140, before arriving at the QSR pick-up window at block 209 and exiting at block 211.

Figure 3:
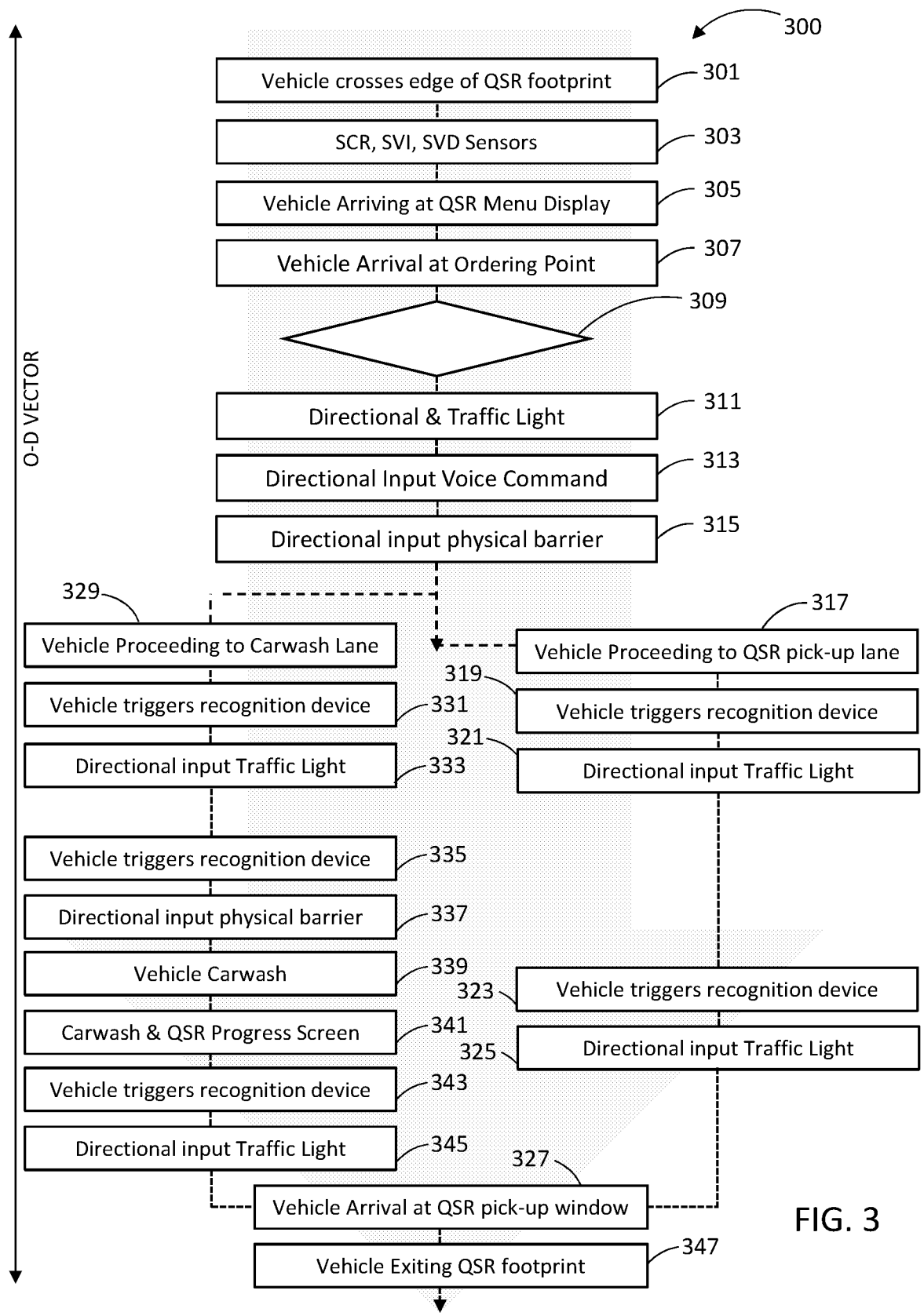
FIG. 3 is flow chart of another example method of using a system that includes both QSR and CW components.

FIG. 3 illustrates a flow chart of another example method 300 of using a system, such as system 100, that includes both QSR and CW components. In the illustrated example, at block 301, a vehicle enters a QSR environment and at block 303, a plurality of sensors, such as vehicle identification (SVI) sensors, vehicle recognition (SVR) sensors, and/or vehicle detection (SVD) sensors are deployed. In one example, SVI, SVR, and SVD sensors are examples of vehicle sensors 134 (FIG. 1). In one implementation, a SVI sensor may include a license plate recognition sensor will first enter the vehicle into a database, e.g., in customer data 138 of database 126, with a time and date stamp and determine whether the vehicle information is already stored in customer data 138 and if the customer data includes customer preferences, and if so, display the previously stored customer preferences on a POS display, e.g., user interface 108 of POS 106 (FIG. 1). At block 305 the vehicle moves forward and at block 307 arrives at a menu display offering both QSR menu items and carwash options and at block 309, the customer makes one or more selections. In one implementation, all along the physical path of the drive-through lane, as the vehicle proceeds forward, vehicle detection sensors monitor the vehicle's progress with the aid of a plurality of SVD sensors, which may include, for example, one or more of light sensors, acoustic sensors, photo-resistor and temperature sensors, proximity and infrared (IR) transceivers, ultrasonic and infrared distance sensors, laser range sensors, encoders, stereo cameras, and pressure sensors. Each sensor may be configured to transmit sensor data by wired and/or wireless communication to a computing device, such as server device 118 and/or a computing device of traffic management system 110. As traffic moves through the O-D Vector, the server device 118 and/or traffic management system 110 may receive information of the progress of both the food preparation and carwash service in real time and in real time together with the vehicle progress in the drive-through lane and convert the information into vehicle guidance paradigms. This may include directional lights and traffic lights and directional voice commands and in some examples, a physical barrier such as a movable gate for directing traffic.

At block 307 an ordering window may be presented where customers place their orders and payments are made to a QSR employee operating a POS device such as POS device 106, or customers may directly place orders on the POS ordering device with automated payment, e.g., credit card payment capabilities. The POS device may include a screen on which the QSR menu items are displayed, together with the carwash options, and may include the estimated time of completing the O-D Vector of each selection. A car recognition device (SVR), through contact with a server, e.g. server device 118, may be configured to verify if an order and payment have been made through an app or via the internet or LAN. Upon completion of the order transaction, at block 311 customers can be directed via a directional traffic light, possibly combined, at block 313 with a voice command to the appropriate lane corresponding to their orders. At block 315, a physical barrier, such as an automatic gate, may help prevent the vehicle going in the wrong lane, while opening the appropriate available lane. In one example, the physical barrier has a design and construction similar to physical barriers used for toll booths and parking garages.

At block 317, for QSR food orders only, where the customer chooses to not purchase a carwash, the customer proceeds to a food only traffic lane. At blocks 319-325, recognized by SVRs, that the car is proceeding toward the food pick-up window and a directional lights can help assist the driver and traffic flow to arrive, at block 327, at the pick-up window. Returning to block 315, for customers who elected to utilize their anticipated dwell time by having their car washed, they proceed after ordering, at blocks 329-337 to a carwash lane assisted by recognition devices, directional lights and gates before being allowed to enter a vehicle carwash at block 339. In some examples, at block 341, while moving automatically through the carwash, the customers will be able to see the progress of their carwash, and in some examples, communication screens will also display the status of the chosen QSR menu item that will be waiting for the QSR guests once they clear the carwash, helping to increase the food anticipation. For example, a progress screen may be displayed in user interface 114 of user device 112. At blocks 343 and 345, recognition devices, gates, and directional lights may be configured to confirm the car has exited the carwash and guide the freshly cleaned cars to a pick-up window at 327. In one example, both types of customers exit the QSR facility, their overall dwell times monitored by the system until they exit at block 347.

Figure 4:
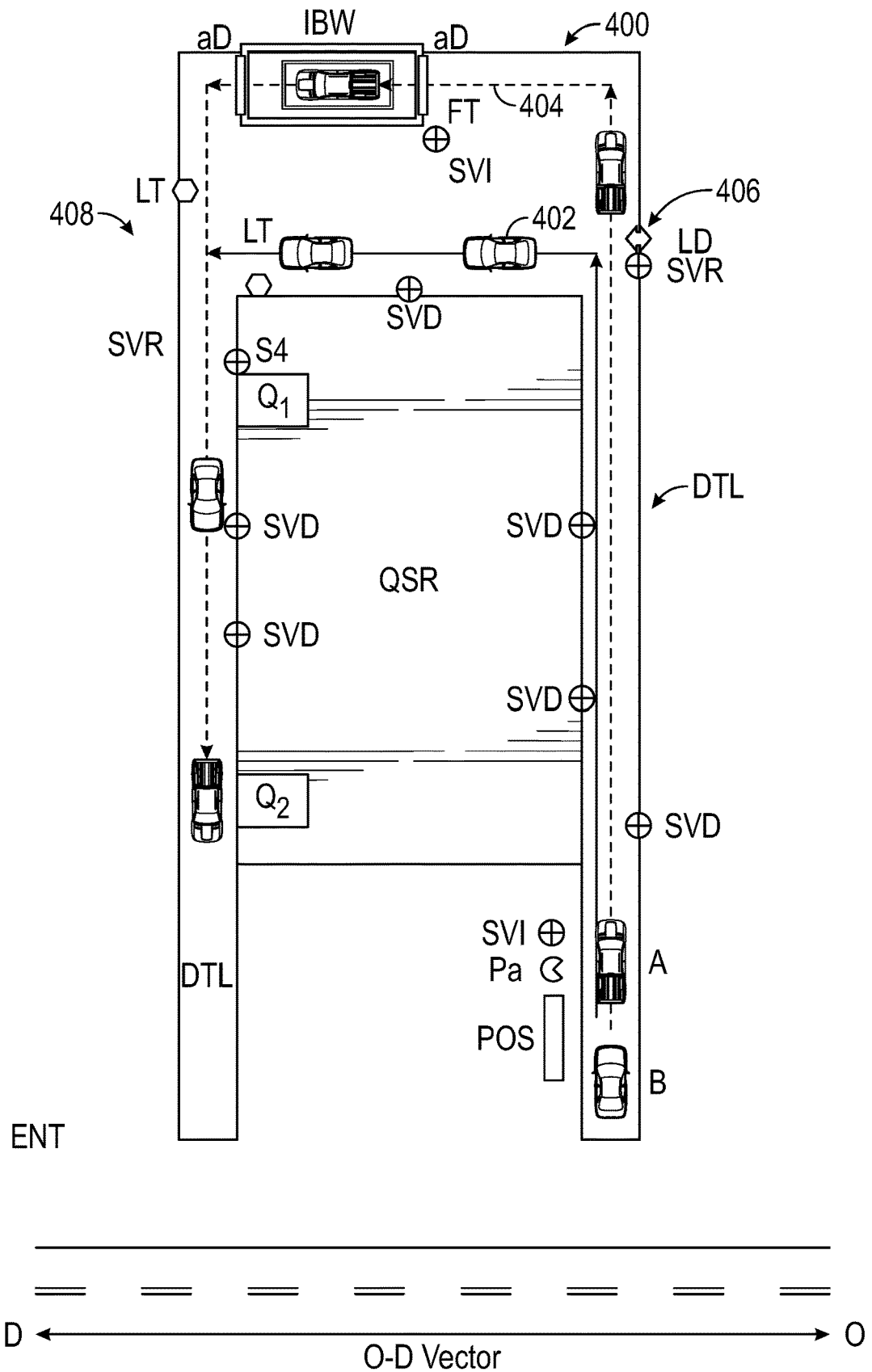
FIG. 4 is a diagram of an example facility that includes a QSR and a CW system.

FIG. 4 illustrates one example implementation of system 100 in the form of a facility 400 that includes a QSR, CW system, and traffic management system. In the illustrated example, a single drive through lane (DTL) surrounds a QSR which has a POS a payment window (Q1) and an order pick-up window Q2. Facility 400 also includes an in-bay carwash (IBW) which includes a space (also referred to as a bay) that is configured to receive a vehicle, and the vehicle remains stationary in the bay during the wash; wash apparatuses circle the car in a friction, and/or frictionless manner. The DTL includes a primary drive through lane 402 and a secondary drive through lane 404, wherein the secondary drive through lane extends from a lane divergence location 406 of the primary drive through lane, through the at least one automatic carwash apparatus (IBW), to a lane merge location 408 of the primary drive through lane. The secondary drive through lane 404 is an example of an optional carwash portion that routes at least a portion of the customer vehicles to the automatic carwash apparatus (IBW) to provide an optional carwash service to the customer vehicles while the customer vehicles are in the drive through and en route to the pickup window Q2.

As shown in FIG. 4, both vehicle A and B have crossed the edge of the QSR establishment (ENT) and arrived at the POS. Both vehicles may have been advised on the POS screen of the anticipated dwell time associated with a decision. Upon learning the information, vehicle B only orders food items at the POS from the QSR menu, while vehicle A chooses to order both a food item as well as a carwash. An SVI identifies the different cars. SVDs monitor the progress of the vehicles through the DTL. After the POS station, both cars arrive at a SVR that directs vehicles through a directional signal (LD) to either go left around the QSR to pick up the food items at Q2 via payment at Q1, or go further to enter the carwash (IBW). An SVI in front of the carwash has identified the car and the carwash options chosen, checked the availability of the carwash, and coordinates with the automatic doors (aD) of the IBW. Vehicle type A is then directed out of the carwash (IBW) and instructed to merge with vehicle B traffic in the food pick up drive-through lane through the use of traffic lights (LT) controlled by a traffic management system (e.g., traffic management system 110 (FIG. 1). Facility 400 is configured to coordinate the preparation of food items for both vehicle types A and B, with the food preparation time and the carwash timing. Vehicle B may provide payment for the carwash either at POS and payment option (PA) or at a separate POS/PA located in or proximate IBW. In examples where ordering and payment is made at the drive through entrance, SVI may be configured to recognize the vehicle and associate each vehicle with its CW order.

In another example, instead of ordering at the POS and paying soon after, customers can push a button at the POS where they receive a small mobile ordering device (MOD) which functions as a wireless POS. While proceeding in the DTL, customers can place their orders. Each MOD may be configured for wireless communication with a server device such as server device 118 and/or position sensors located along DTL to receive customer orders and track a position of a customer vehicle along the DTL. Orders may be made until a certain point in the DTL where vehicles are either directed to make their orders and proceed or are instructed to take an off-ramp. Payment can be made by credit card or at the food pick up window. To keep a constant supply of MODs available, the POS is constantly fed with sufficient MOD devices by way of a delivery system, for example, using pneumatic tubing. In another example, customers return the MOD at the pickup window and a QSR employee physically places the MOD device in a receptacle of the POS device located inside the QSR. In another example customers may also by-pass the POS ordering station, without picking up a MOD, if they are already part of QSR membership program allowed to make their orders using their mobile devices (e.g., user device 112) while in the DTL. In yet another example, a customer can make an order via an app on their mobile phone while waiting in the DTL or carwash.

Figure 5:
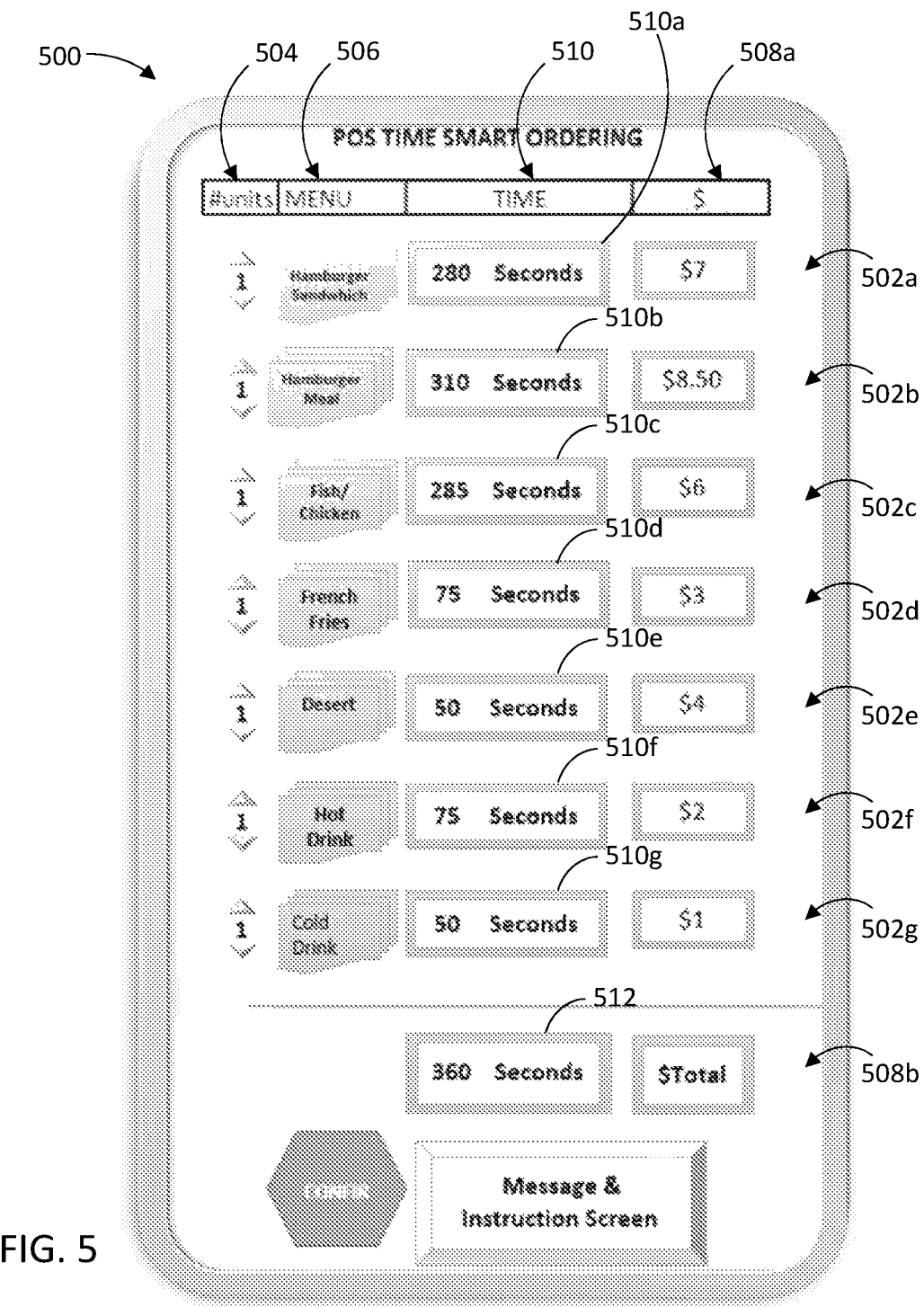
FIG. 5 illustrates an example graphical user interface (GUI) that displays a plurality of QSR menu items and time duration information representing a predicted duration of time to receive the QSR menu items.

FIG. 5 illustrates an example graphical user interface (GUI) 500 configured to be displayed on user interface 108 of POS 106 and/or user interface 114 of user device 112. In the illustrated example, GUI 500 is configured to display a plurality of QSR menu items 502a-502g and each menu item includes a user control element 504 for selecting a number of each item, an item type display portion 506 for displaying the type of item, a price display portions 508a and 508b for dynamically updating total cost according to the number of items selected. GUI 500 also includes a predicted time display portion 510 that includes a plurality of time prediction display portions 510a-510g for displaying a predicted time duration for preparation of the QSR menu item as well as a total time display portion 512 that displays a total predicted preparation time to prepare all food items. GUI 500 may be configured to communicate in real time with server device 118 and display continuously updated time predictions in time display portion 510 and 512 according to, for example, calculations performed by time prediction and time management module 122 (FIG. 1).

In the illustrated example, a customer has selected seven different menu items and GUI 500 is configured to display in predicted time display portion 510 a predicted duration of time to prepare each item. In the illustrated example, server device 118 and/or POS 106 is also configured to utilize information from QSR 102 and historical data 124 to account for concurrent preparation of multiple items 502. For example, the total predicted time displayed in total time display portion 512 in the illustrated example is only six minutes (360 seconds) even though the cumulative time to individually prepare each of the seven items is approximately 18 minutes. Thus, in the illustrated example, POS 106 may consider concurrent order fulfilment methods. Server device 118 may, for example, take into consideration that some items may be prepared at the same time, while other items of the order may need to be added to the workflow. In the illustrated example, display portion 510*a* indicates it will take 280 seconds for a single hamburger to be completed, however, if another menu item is selected that could be prepared concurrently with the hamburger, for example, using the same kitchen equipment, such as another hamburger or a chicken sandwich, total time display portion 512 may remain the same or only slightly increase even though 280-285 seconds may also be required to prepare the second hamburger or chicken sandwich. GUI 500 may be configured to dynamically update the time predictions displayed in display portions 510 and 512 as the user increases or decreases a number of food items 502 and as conditions at the QSR change.

In some examples, POS 106 and server device 118 may utilize real time data including que information regarding previously received orders that are in progress, and the status of kitchen equipment and inventory received from kitchen management system 142 and inventory management system 144 to modify a predicted preparation time displayed on GUI 500. For example, an additional order of french fries 502*d* may normally have increased the time prediction displayed in display portion 510*d* by only the predicted amount of time to load french fries into a second container if data from kitchen management system 142 and/or inventory management system 144 indicates there is a sufficient quantity of cooked french fries available. However, if kitchen management system 142 and/or inventory management system 144 indicates additional french fries will need to be freshly made to fulfill a second order because, for example, a comparison of preceding orders in que to a current inventory of cooked french fries indicates more will need to be cooked. In this instance, a small additional french fries order may result in a greater amount of time added to time display portions 510*d* and 512 thereby forewarning the customer when he or she is ordering at POS 106, which may help adjust service expectations and reduce possible disappointment at the final pick up window when the total wait time in the drive-through lane is longer than average.

Figure 6:
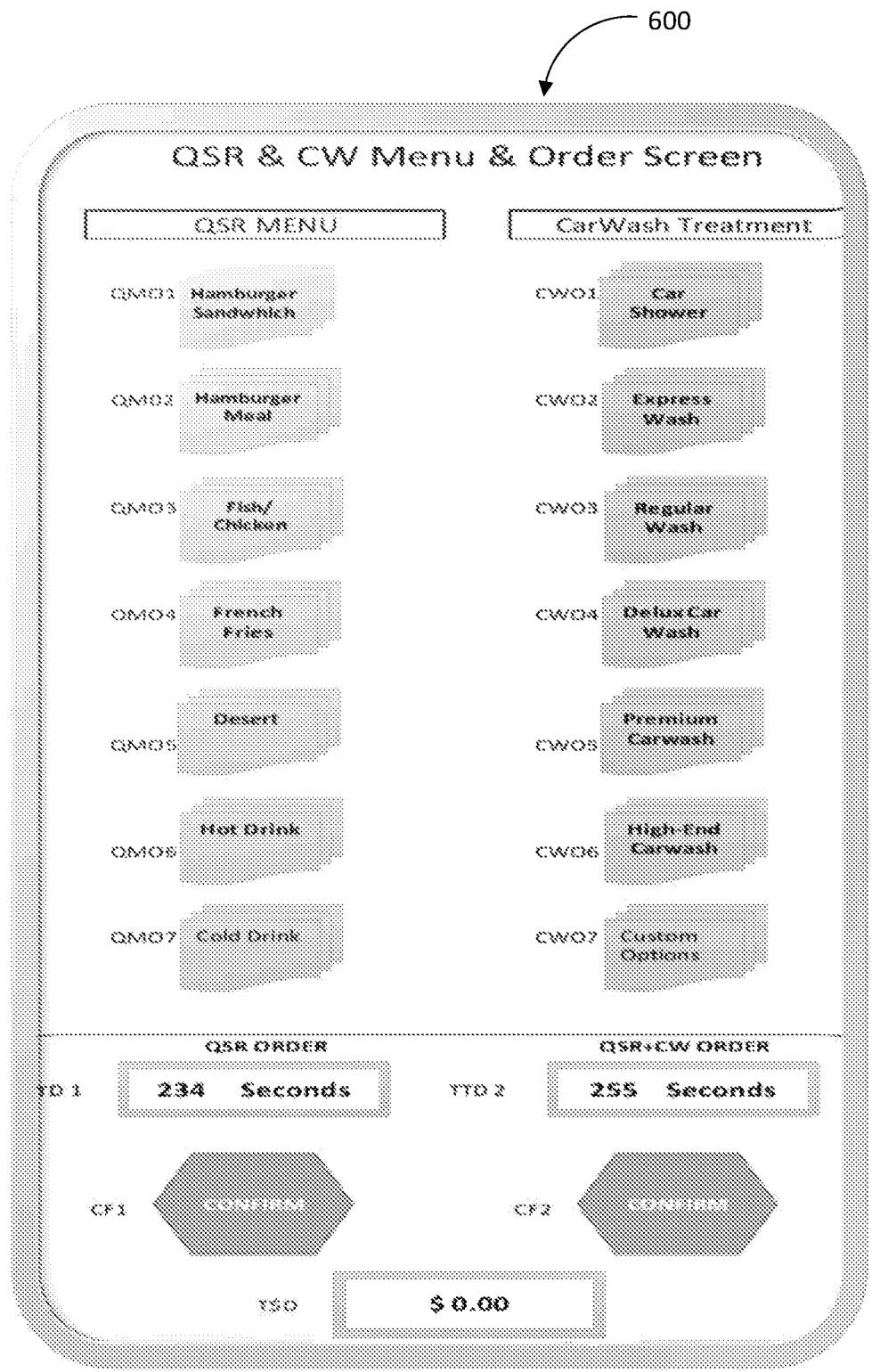
FIG. 6 illustrates an example graphical user interface (GUI) that displays a plurality of QSR menu items, a plurality of CW menu items, and time duration information representing a predicted duration of time to receive the QSR menu items and a predicted duration of time to receive both QSR menu items and CW menu items.

FIG. 6 illustrates an example graphical user interface (GUI) 600 configured to be displayed on user interface 108 of POS 106 and/or user interface 114 of user device 112. In the illustrated example, GUI 600 is configured to display a plurality of QSR menu items QM01-QM07 and a plurality of CW menu items CW01-CW07. Each of the QSR menu items and CW menu items are graphically displayed soft user control elements and configured to be selectable by a user pressing the touch-sensitive display where the corresponding user control element is displayed. GUI 600 also includes a total QSR time prediction display portion TD1 and a total QSR and CW time prediction display portion TTD2 for conveying to the customer how a total wait time may be impacted by adding or removing QSR items and by adding or removing CW menu items. The time predictions may be determined using any of the techniques and methodologies disclosed herein, including by calculations performed by time prediction and time management module 122 (FIG. 1). As in other examples described herein, the time predictions displayed in display portions TD1 and TTD2 may be dynamically updated according to user selections and real time data from the system. Although not illustrated in FIG. 6, GUI 600 may include additional display portions and user control elements as shown in FIG. 4 for allowing the user to select a number of each item and for displaying a price of each item. GUI 600 also includes a first confirm or order button CF1 for ordering just food and a second confirm or order button CF2 for ordering both food and a carwash. Thus, GUI 600 is designed and configured to communicate whether adding a carwash to a food order will increase a total wait time utilizing, in some examples, advanced time prediction techniques disclosed herein to provide an intelligent and real time prediction of an estimated wait time. In the illustrated example, GUI 600 indicates a total predicted wait time will be 234 seconds to receive a food order and only an additional 21 seconds to also obtain a car wash, which may encourage the customer to add a car wash to his or her order.

Figure 7A:
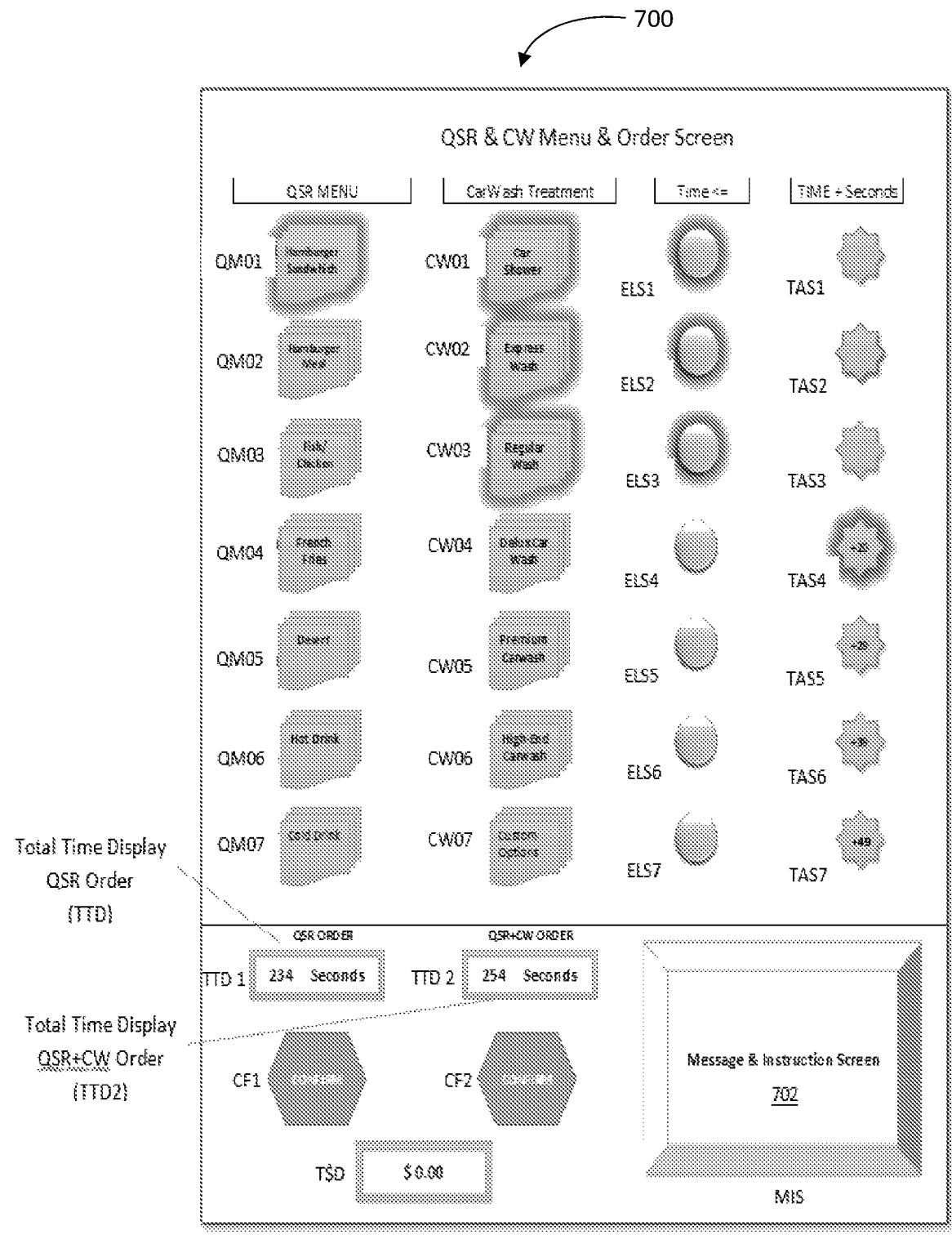
FIG. 7A illustrates an example graphical user interface (GUI) that displays QSR menu items, CW menu items, equal time indicators and additional time indicators.

FIG. 7A illustrates another example graphical user interface (GUI) 700 configured to be displayed on user interface 108 of POS 106 and/or user interface 114 of user device 112. In the illustrated example, GUI 700 includes the same display portions and user control elements as GUI 600 including a plurality of QSR menu items QM01-QM07 and a plurality of CW menu items CW01-CW07. GUI 700 also includes a plurality of equal time indicators ELS1-ELS7 and additional time displays TAS1-TAS7. In the illustrated example, each of the CW menu items, equal time indicators ELS and additional time displays TAS are configured to dynamically adjust display information according to a user selection of QSR menu items to convey which CW menu items will not increase a wait time. For the CW menu items where a wait time would be longer, the additional amount of time may also be displayed. In the illustrated example, a user has selected a hamburger and in response user control element QM01 becomes highlighted and a plurality of CW control elements also become highlighted to indicate which CW options if selected would not increase the user's wait time to receive the hamburger. In the illustrated example, CW options CW01, CW02, and CW03 are highlighted, indicating they will not add time. Equal time indicators ELS1-ELS3 are also highlighted to convey CW options CW01-CW03 will not add to the total wait time. Additional time displays TAS4-TAS7 display a calculated time duration indicating how much each option would add to the total wait time as compared to just ordering QSR item QM01. A user may vary his or her selection of food items by pressing user control elements QM01-QM07 and as the user adds or subtracts food items from his order, GUI 700 dynamically adjusts the display of CW menu items CW01-CW07, equal time indicators ELS1-ELS7 and additional time displays TAS1-TAS7 to convey how changing the food order may change the available CW items that the customer may be able to get without increasing the total wait time. GUI 700 also includes a messaging and instruction screen 702 for adding a user annotation such as special food preparation instructions and allergy information. In the example shown in FIG. 7, a user has selected user control element QM01 (hamburger) and user control element CW04 (deluxe carwash), time display TTD1 indicates a predicted total wait time to receive a hamburger is 234 seconds and the predicted time to also receive a deluxe carwash is 254 seconds, or an additional 20 seconds relative to just a hamburger order or just a hamburger order combined with one or CW options CW01-CW03. The user can confirm his selection by pressing confirm button CF1 (for just a food order) or CF2 for hamburger and deluxe carwash.

Figure 7B:
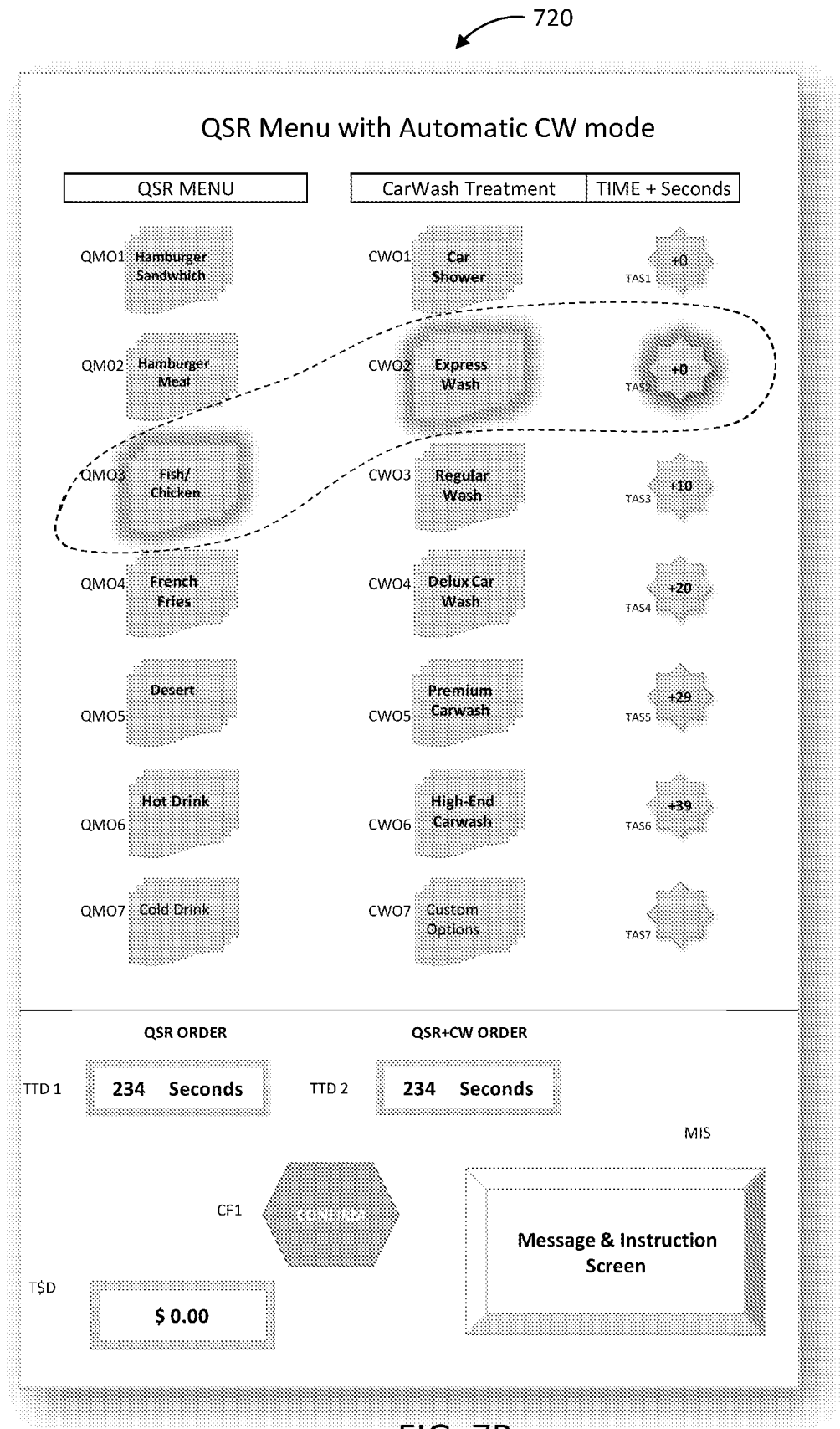
FIG. 7B illustrates an example graphical user interface (GUI) that displays QSR menu items, CW menu items, time duration information, and CW service recommendation that will not add to the customer's total wait time.

FIG. 7B illustrates another example graphical user interface (GUI) 720 configured to be displayed on user interface 108 of POS 106 and/or user interface 114 of user device 112. GUI 720 is similar to GUI 700 and includes a plurality of QSR menu items QM01-QM07, a plurality of CW menu items CW01-CW07, and a plurality additional time displays TAS1-TAS7. In the illustrated example, GUI 720 is configured to automatically suggest a type of carwash option that would result in no time penalty for a corresponding food order by highlighting only one carwash option. For example, if a customer orders only coffee, the quickest carwash type is recommended. When a customer orders a complex meal, an involved carwash that takes longer to complete is recommended. In another example, the driver of vehicle A may select a chicken sandwich (QMO3) from the QSR menu. A time prediction and time management module 122 may perform a time prediction calculation using any of the data and calculation techniques disclosed herein and determine that carwash treatment CW02, an express carwash, is the best possible carwash that will not increase the customer's wait time in a drive through lane or time to receipt of his food order. The recommendation is communicated via highlighting or flashing user control element CW02 and the corresponding additional time display indicator TAS2, communicating the recommended carwash option will require zero seconds of additional wait time. Total time display TTD1 for QSR order without a carwash and total time display with a carwash TTD2 show the same total time. The calculated additional required time for longer duration carwash treatments CW03-CW06 is displayed in the corresponding TAS indicators and the customer may choose to order one of carwash treatments CW03-CW06 instead of the recommended CW02 if, for example, he or she has enough time and/or determines the improved wash is worth the additional wait.

Figure 7C:
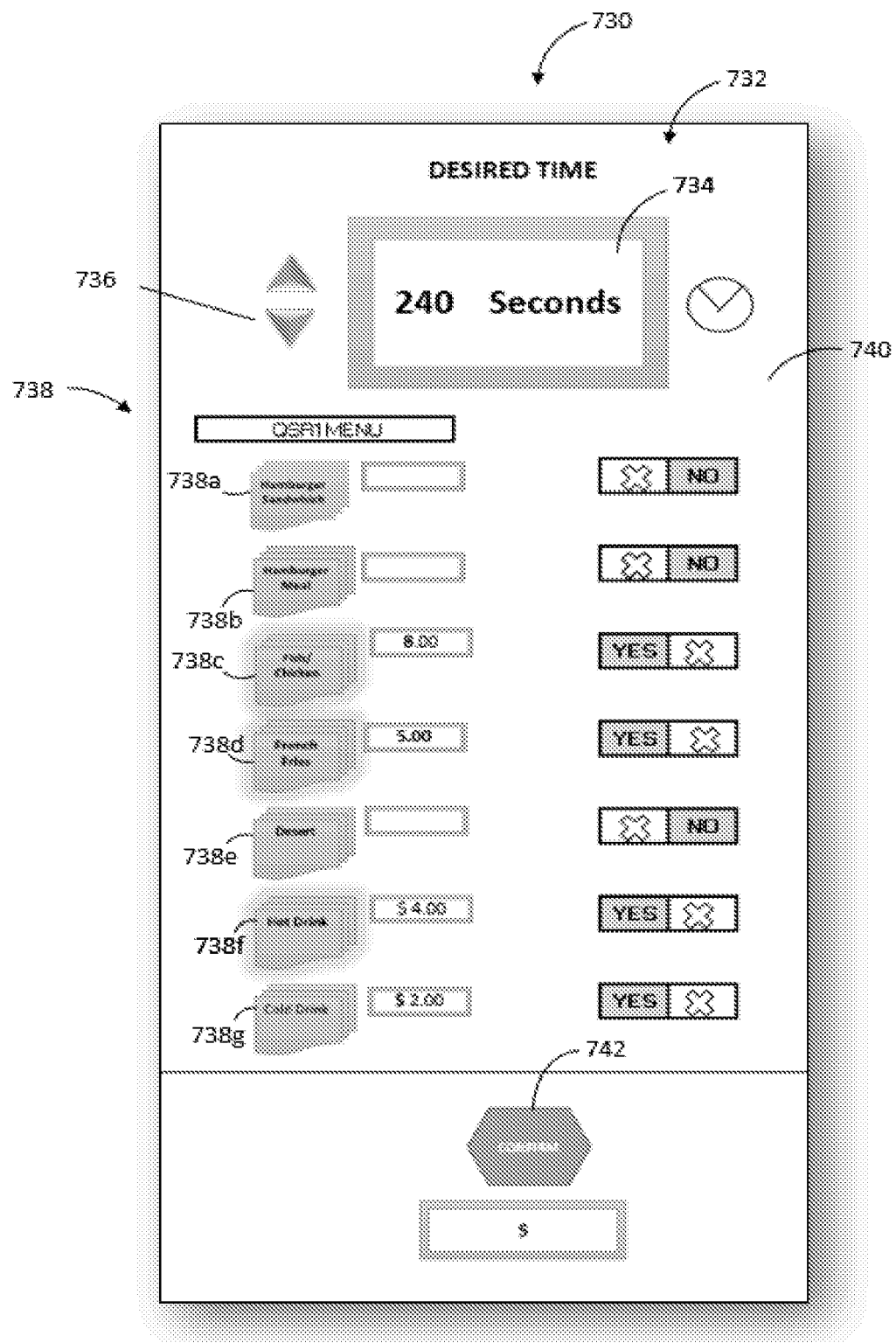
FIG. 7C illustrates an example graphical user interface (GUI) that includes a desired time portion that allows a user to specify the maximum amount of time he or she is willing to wait for a food order.

FIG. 7C illustrates another example graphical user interface (GUI) 730 configured to be displayed on user interface 108 of POS 106 and/or user interface 114 of user device 112. GUI 730 includes a desired time portion 732 that includes a desired time display 734 and a control element 736 for allowing a user to specify the maximum amount of time the user is willing or able to wait for a food order, also referred to herein as a user-specified maximum wait time. In response to inputting a maximum time value, here 240 seconds, time prediction and time management module 122 (FIG. 1) may be configured to execute any of the calculation methodologies disclosed herein to calculate a predicted time duration for each of a plurality of QSR menu items 738, compare the predicted time durations to the user-specified time duration and highlight the user control elements for the QSR menu items 738 that are capable of being delivered with the customer-specified time duration. In the illustrated example, server 118 (FIG. 1) has determined that QSR menu items 738*c*, 738*d*, and 738*f* are available within the user-specified time duration by highlighting those options. GUI 730 may also or alternately include yes/no indicators 740 for indicating the result of the time calculation. In one example, the customer may select one or more QSR menu items 738 and then select a confirm button 742 to process the order. In the illustrated example, GUI 730 only includes QSR menu items, however, in other examples, GUI 730 may also include CW menu items and indicate which CW menu items are available within the user-specified time duration.

Figure 7D:
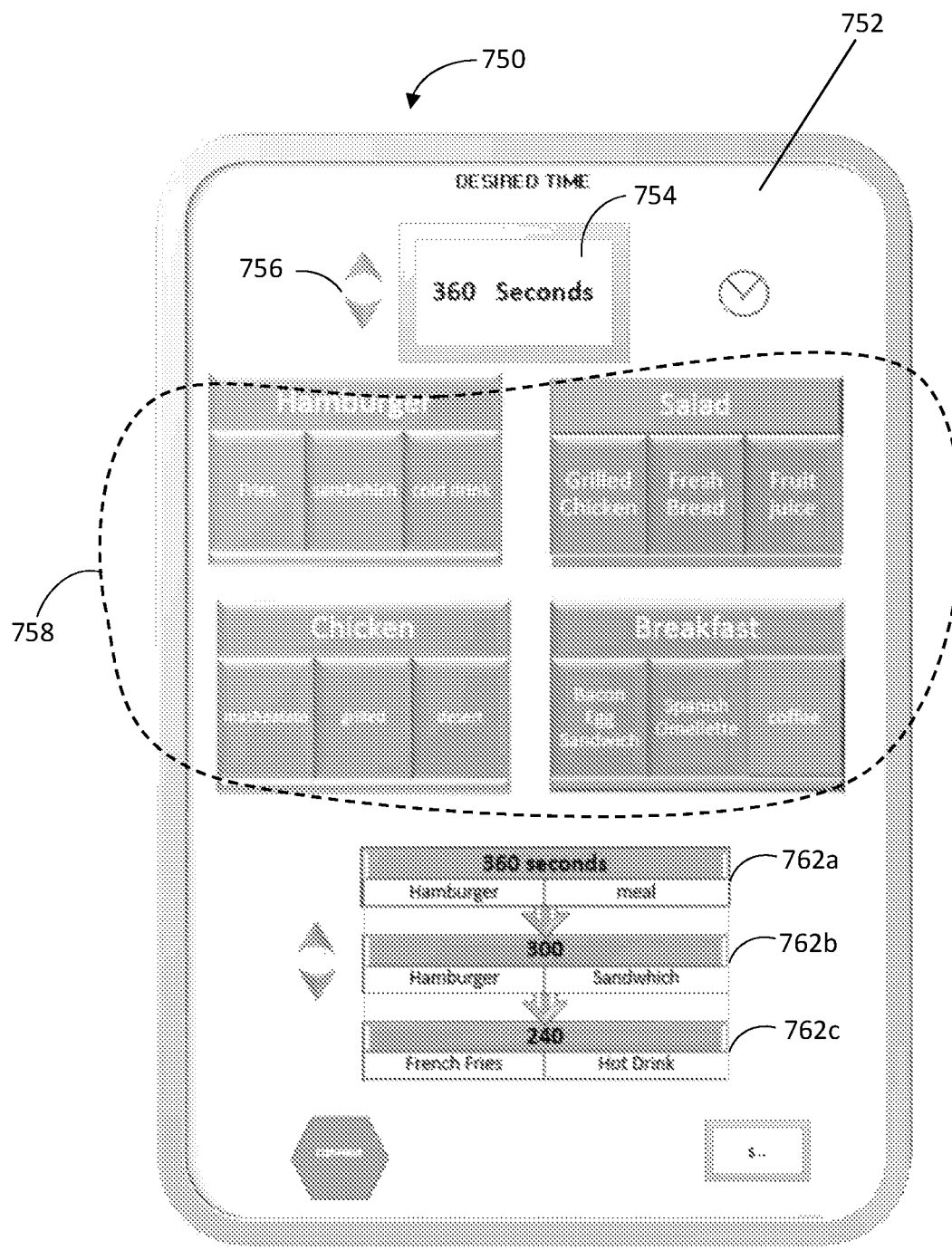
FIG. 7D illustrates an example graphical user interface (GUI) that includes a desired time portion that allows a user to specify the maximum amount of time he or she is willing to wait for a food order and recommended QSR menu options that can be delivered within the desired time.

FIG. 7D illustrates another example graphical user interface (GUI) 750 configured to be displayed on user interface 108 of POS 106 and/or user interface 114 of user device 112. GUI 750 includes a desired time portion 752 that includes a desired time display 754 and a control element 756 for allowing a user to specify the maximum amount of time the user is willing to wait or the maximum amount of time the user has. In response to inputting a maximum time value, here 360 seconds, time prediction and time management module 122 (FIG. 1) may be configured to execute any of the calculation methodologies disclosed herein to calculate a predicted time duration for each of a plurality QSR menu items. In the illustrated example, GUI 750 includes a dynamic QSR menu display portion 758 that is configured to only display items from the QSR menu that can be prepared and delivered within the time specified by the customer. Thus, GUI 750 provides a simplified and user-friendly configuration showing only a subset of QSR menu items for selection by a user. The automatic suggestions may help reduce decision time, and may also maximize sales within the allotted time and the array of suggestions may entice customers to the most profitable items.

In the illustrated example, QSR menu display portion 758 includes a plurality of user control elements grouped by category and also includes recommended sub options within each category for completing a meal rather than just one item. In the illustrated example, four order recommendations are displayed that are organized by category and within each category a combination of menu items is suggested, where each combination can be delivered within the user-specified 360 second time frame. In this example, the four categories are: "Hamburger", "Salad", "Chicken", and "Breakfast." In each of those categories a combination is suggested, still within the 360 seconds. For example in the category "Hamburger", a menu combination of French-fries, sandwich, and cold drink is recommend. The recommendations in display portion 758 may be communicated to consumers by way of an interactive communication screen and the recommendations may be accompanied by pictures, illustrations, and details of ingredients. Some recommendations may be supported by voice recordings, personal advice from a customer service person within the establishment, and other advertising and promotional materials. Factors other than time may also be taken into account when determining the recommended combinations of menu items to display in display portion 758. For example, customer preferences, customer order history, and customer information (such as proximity to a special even such as a birthday or anniversary) may be utilized as well as day of the year, current weather conditions, time of day.

In addition to or instead of QSR menu display portion 758, GUI 750 may include a scrollable display 760 that allows a user to scroll through combinations of menu items according to a predicted time duration to prepare the menu item. In the illustrated example, scrollable display 760 is showing three options 762*a*, 762*b*, 762*c* arranged by length of time to prepare. In the illustrated example, GUI 750 only includes QSR menu items, however, in other examples, GUI 750 may also include CW menu items and indicate which CW menu items are available within the user-specified time duration.

Figure 7E:
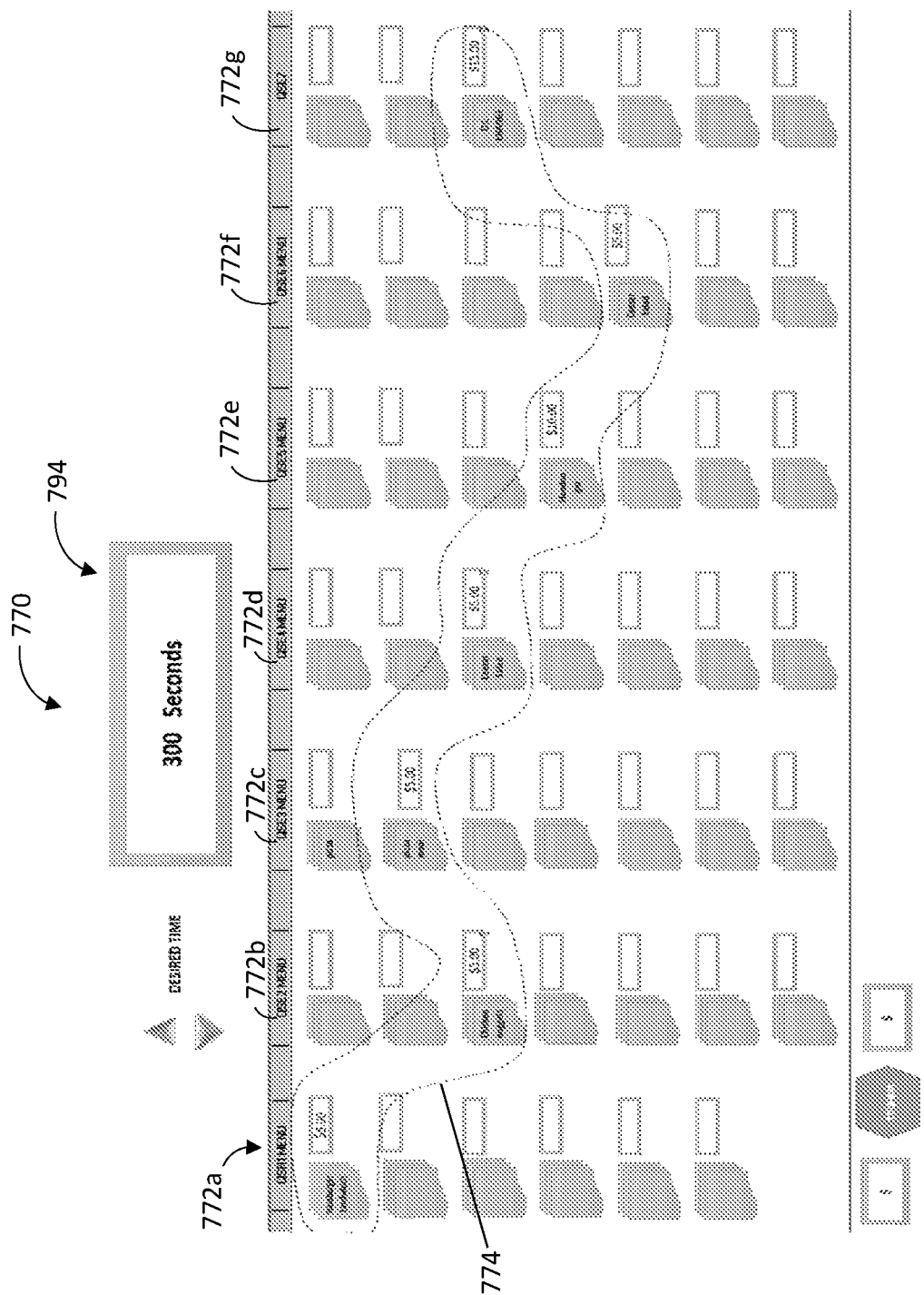
FIG. 7E illustrates an example graphical user interface (GUI) that includes a desired time portion and displays predicted time durations for QSR menu items for a plurality of QSR establishments.

FIG. 7E illustrates another example graphical user interface (GUI) 770 configured to be displayed on user interface 108 of POS 106 and/or user interface 114 of user device 112. GUI 770 displays a plurality of QSR menus 772a-772g to assist a user in deciding which QSR establishment to go to and also to pre-order one or more QSR items. GUI 770 also includes a desired time portion 774 for specifying a maximum amount of time the customer has or is willing to wait. In response, a server device, such as server device 118 may calculate a time duration for each menu item for each QSR and GUI 770 may be configured to indicate which QSRs have menu items that can be prepared in the user-specified time duration and the specific QSR menu items that are available. In the illustrated example GUI 770 includes a highlighted portion 776 that has highlighted one menu item from each QSR that would be available. In response, a user may select one or more menu items and complete his or her order while en route to the selected QSR establishment. In the illustrated example, GUI 770 only includes QSR menu items, however, in other examples, GUI 770 may also include CW menu items and indicate which CW menu items are available within the user-specified time duration.

Figure 8:
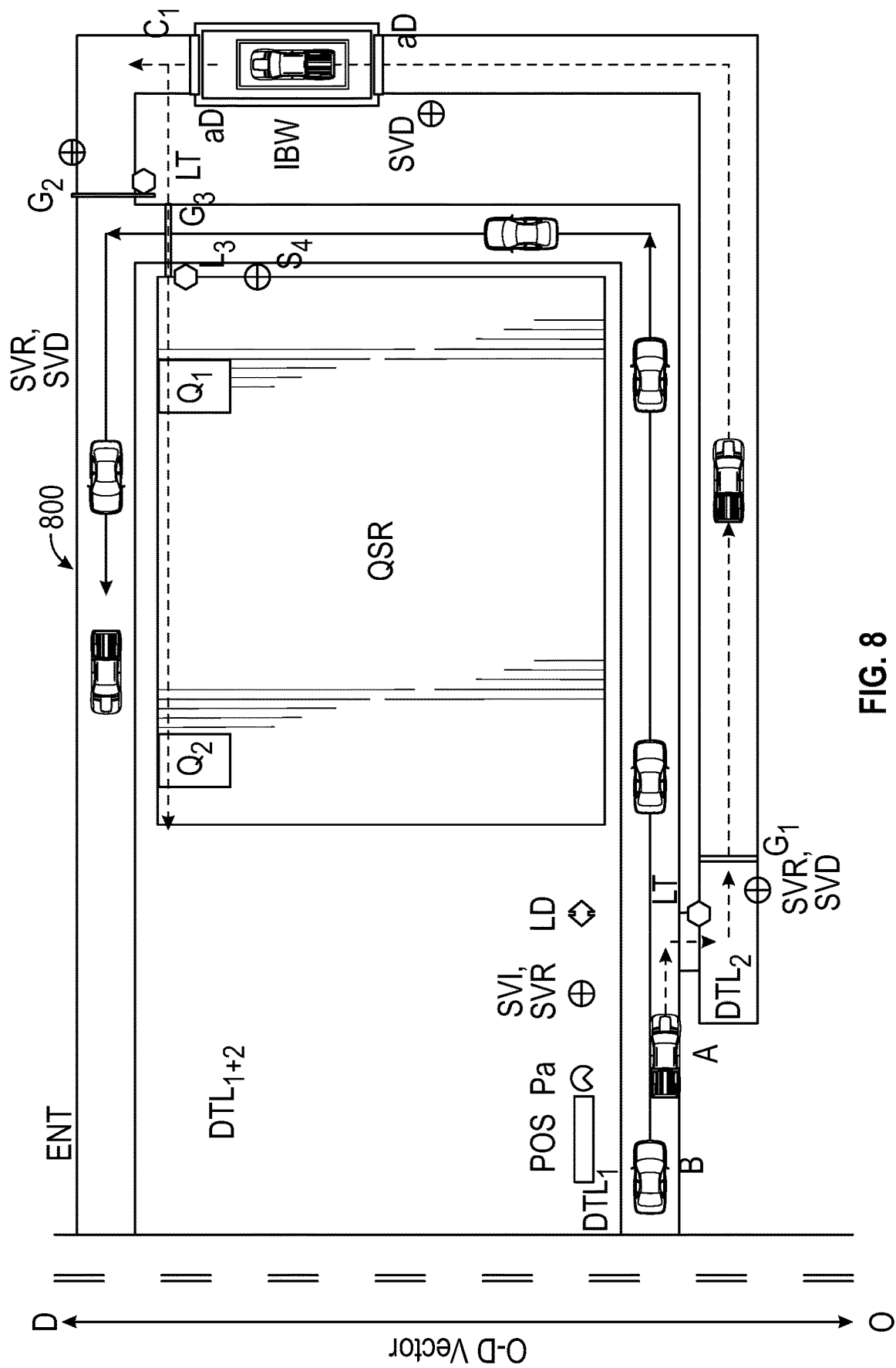
FIG. 8 is a diagram of an example facility that includes a QSR and a CW system that includes an automatic in bay carwash apparatus (IBW)

FIG. 8 illustrates another example implementation of system 100 (FIG. 1) in the form of a facility 800 that includes a QSR, CW system, and traffic management system. In the illustrated example, a QSR is serviced by 2 drive-through lanes (DTL1,2). Vehicle A has chosen both a carwash and a QSR item at the POS station and optional payment station (Pa). The order and payment are communicated from the POS to other components of the facility including one or more of a server device, kitchen management system and CW system (see, e.g., FIG. 1). A traffic management system directs the vehicle to proceed by way of directional light (LD) and traffic light (LT) into a second drive-through lane D2, when other sensors confirm that the lane is safe to enter. Vehicle detection sensors (SVD), for example, inductive and capacitive sensors and/or radar sensors, are configured to detect vehicles that are both stationary and in motion. A vehicle recognition sensor (SVR) confirms the arrival of the vehicle at the gate G and that payment has been made for the carwash and allows gate G to open the dedicated carwash lane so that the car can proceed to the in-bay automatic carwash (IBW). Vehicle detection sensor SVD coordinates with a detection sensor in the carwash to allow the car to proceed. For example, a wireless ultrasonic sensor uses sound waves mounted directly onto the ceiling of the IBW. The automatic doors aD open when the IBW is available and allows car A to enter. Meanwhile car B has chosen only to purchase a QSR item and proceeds in drive-through Lane DTL1. When Car A is exiting the IBW carwash, sensor C1 for example optical sensors with an opposed mode sensor that uses the interruption of a light beam between an emitter and a receiver, communicates that the car is exiting the IBW. Traffic in DTL1 and DTL2 is coordinated by way of vehicle detections sensors SVD, traffic lights LT and gates G so that both vehicles A and B approach their destination within an optimum O-D vector.

Figure 9:
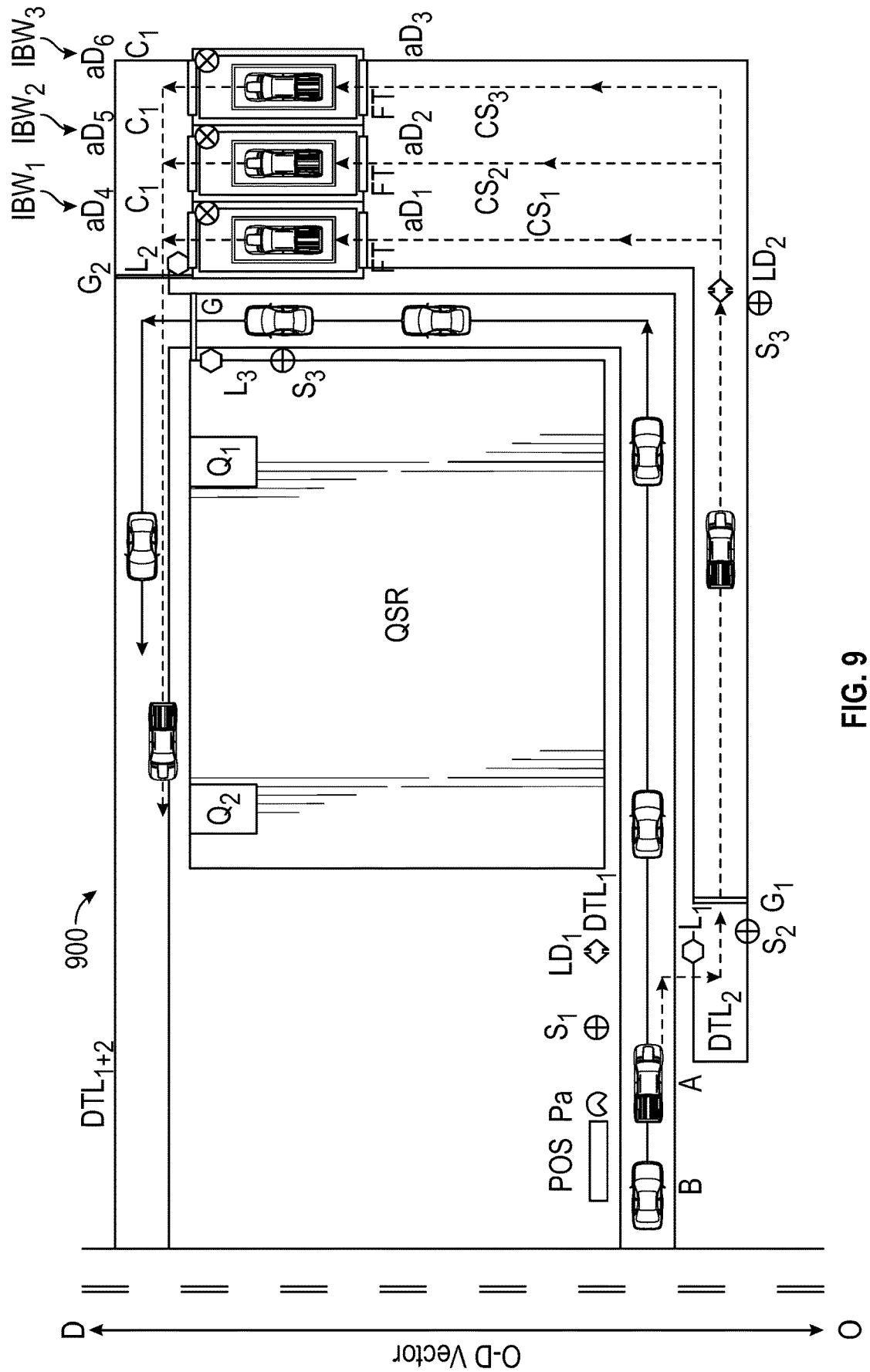
FIG. 9 is a diagram of an example facility that includes a QSR and a CW system that includes a plurality of MWs.

FIG. 9 illustrates another example implementation of system 100 (FIG. 1) in the form of a facility 900 that includes a QSR, CW system, and traffic management system. In the illustrated example, facility 900 includes a plurality of carwash modules, here, three in-bay carwash modules IBW1-IBW3 to maximize the number of customers that can receive a carwash without negatively impacting total wait time for any customer. Similar to other example facilities disclosed herein, the vehicle traffic pattern may be coordinated by taking into account the QSR food preparation and presentation times so that getting a car washed does not delay a QSR visit. The ability to coordinate QSR items in combination with a plurality of in-bay carwashes, allows the QSR to scale up within its own real estate as demand for its carwash services grows and traditional QSR customers can experience the same dwell time in the drive-through lanes as before any carwash services were added. In the illustrated example, after POS, vehicle B (without CW) is directed to go directly to pay and pick up the QSR orders and windows Q1 and Q2, and vehicle A (having ordered both QSR+CW) is directed through directional light LD1, sensor S1 and S2, in coordination with in-bay carwash status sensors (CS1, CS2, CS3) to enter into drive-through lane DTL 2 and vehicle type A is directed by directional light DL2 towards the first available in-bay carwash.

Figure 10:
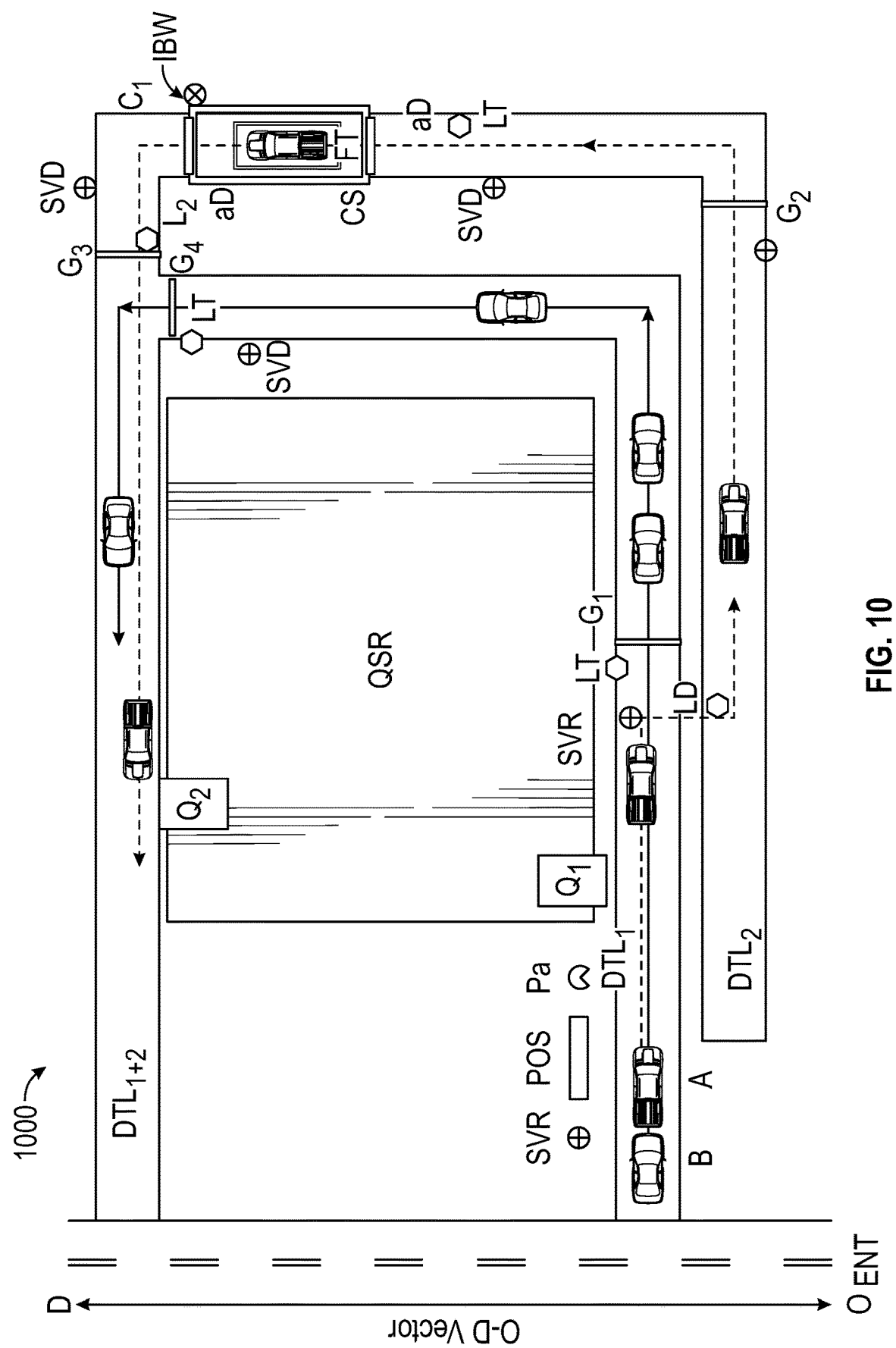
FIG. 10 is a diagram of another example facility that includes a QSR, a CW system, and a traffic management system.

FIG. 10 illustrates another example implementation of system 100 (FIG. 1) in the form of a facility 1000 that includes a QSR, CW system, and traffic management system. In the illustrated example, the customer has pre-ordered and prepaid via an mobile app or a website, where the vehicle registration number is connected to the order. Upon crossing the entrance ENT of the premises, a vehicle recognition sensor SVR identifies the vehicle which is directed to proceed directly forward. In another method the driver orders and makes a credit card payment at the POS station and proceeds forward or makes payment window Q1. Vehicle B (QSR only) is directed by the traffic management system towards the pick-up window Q2 and vehicle A (QSR+CW) is recognized through vehicle recognition and detection sensors SVR, SVD and directed by directional lights LD, Gates G and traffic light L1 to an IBW prior to picking up his or her food order at Q2.

Figure 11:
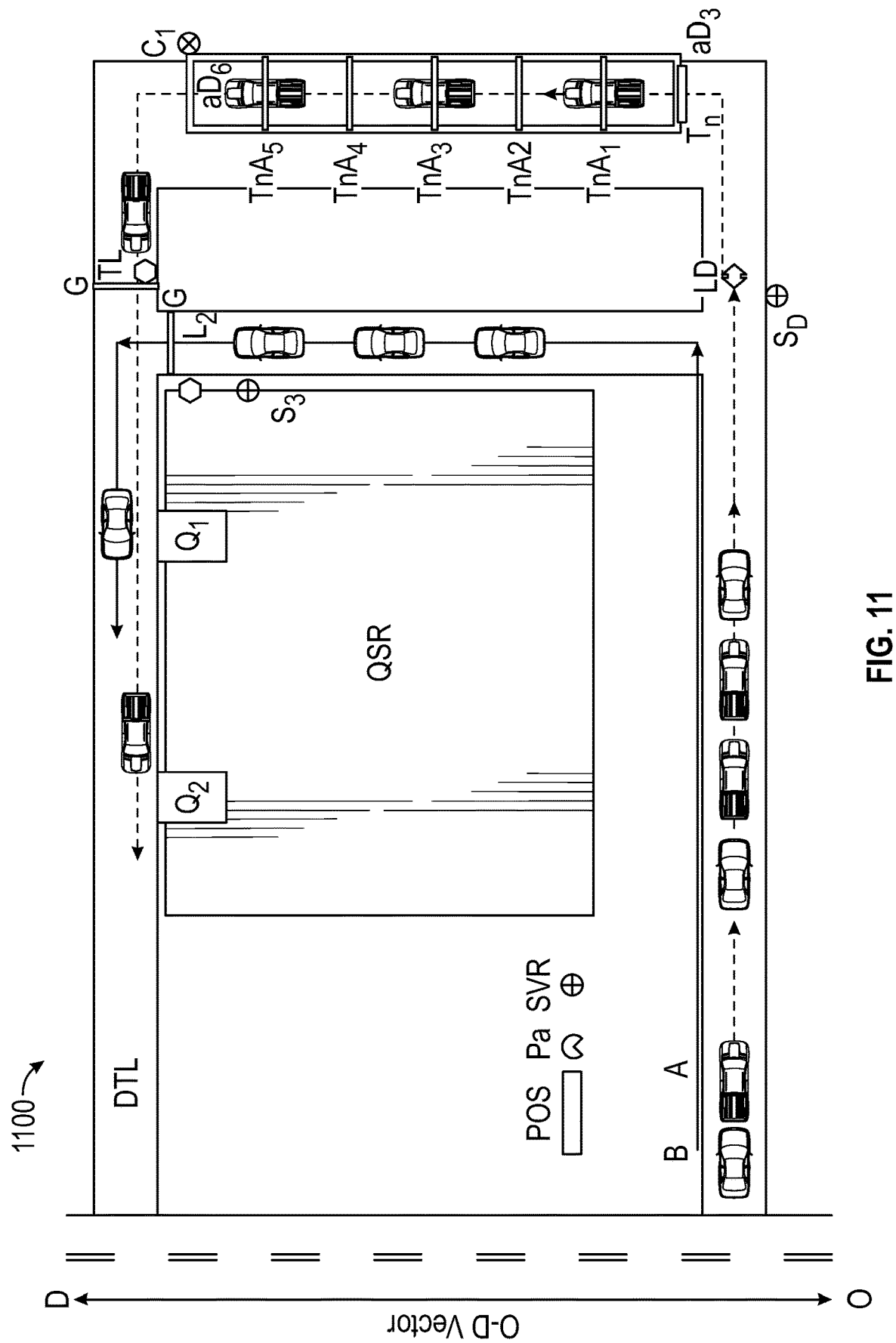
FIG. 11 is a diagram of an example facility that includes a QSR and a CW system that includes a tunnel carwash.
Figure 12:
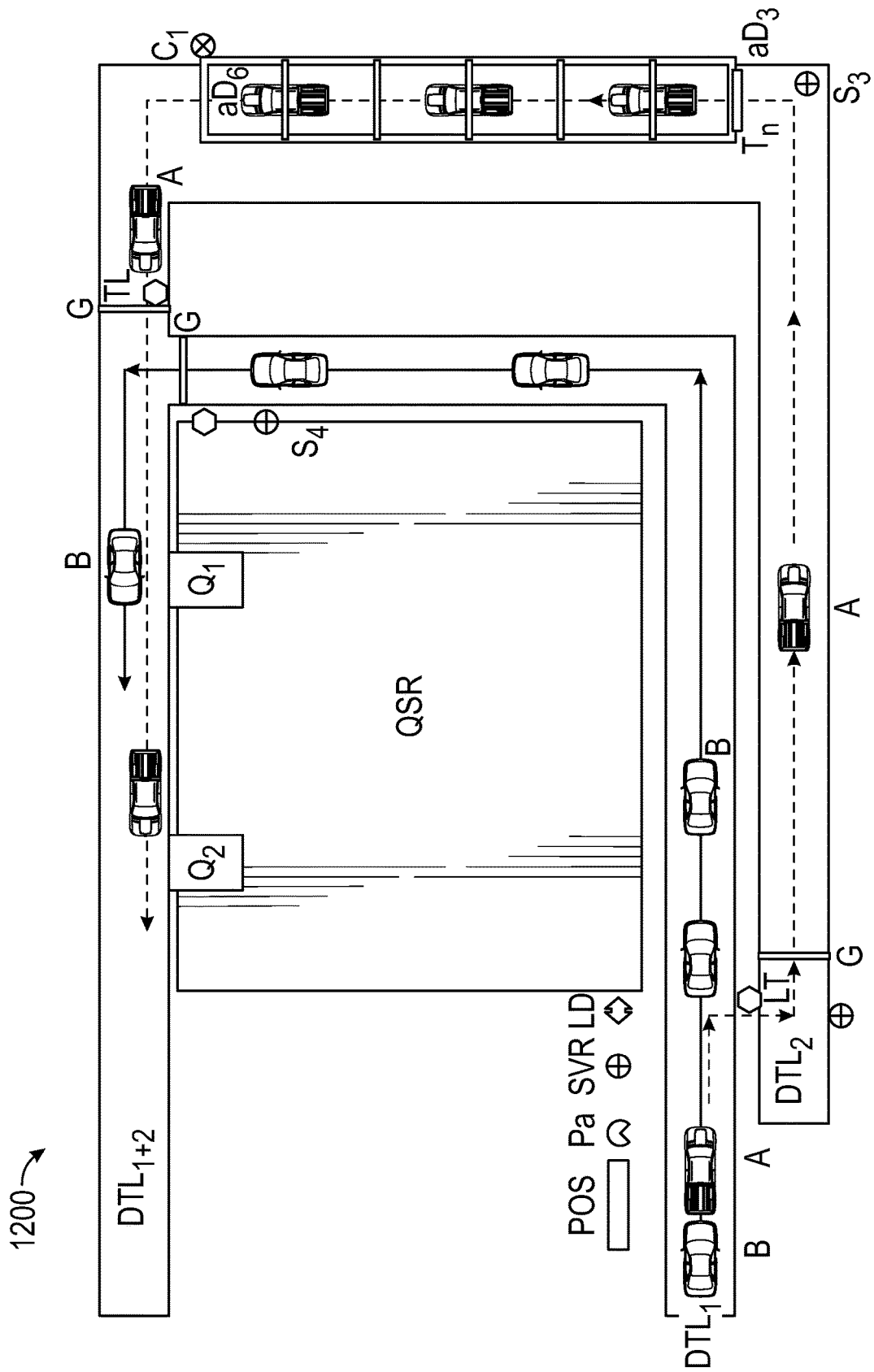
FIG. 12 is a diagram of another example facility that includes a QSR and a CW system that includes a tunnel carwash.

FIG. 11 illustrates another example implementation of system 100 (FIG. 1) in the form of a facility 1100 that includes a QSR, CW system, and traffic management system. In the illustrated example, a single carwash module in the form of a tunnel carwash is provided that includes a conveyor belt and is configured to concurrently wash a plurality of cars. Vehicle A (ordering QSR item+CW) and vehicle B (ordering QSR item only) are coordinated and directed by a traffic management system utilizing an extended lane. Both A and B types of vehicles place their orders at the POS and make payment, either at the credit card option Pa or payment window Q1. During and upon successful payment vehicles are identified as either type A or type B and provided a unique identification number, for example by any of the techniques described herein (e.g., machine vision recognition of license plate or wireless communication with a device located in the vehicle, such as a mobile phone, a temporarily loaned device or a disposable RFID tag) so that each vehicle may be guided and monitored. All vehicles proceed forward after payment and traffic is directed with the aid of sensors, directional lights and gates using any of the implementations of traffic management systems and server devices disclosed herein. FIG. 12 illustrates another example implementation of system 100 (FIG. 1) in the form of a facility 1200 that is substantially the same as facility 1100 except the QSR has 2 lanes and vehicle type A (a combination of QSR+CW) and vehicle type B (strictly QSR) are directed into separate lanes immediately after ordering which may eliminate the need to provide and track a unique vehicle identification number and provide a simplified traffic management and routing process.

Figure 13A:
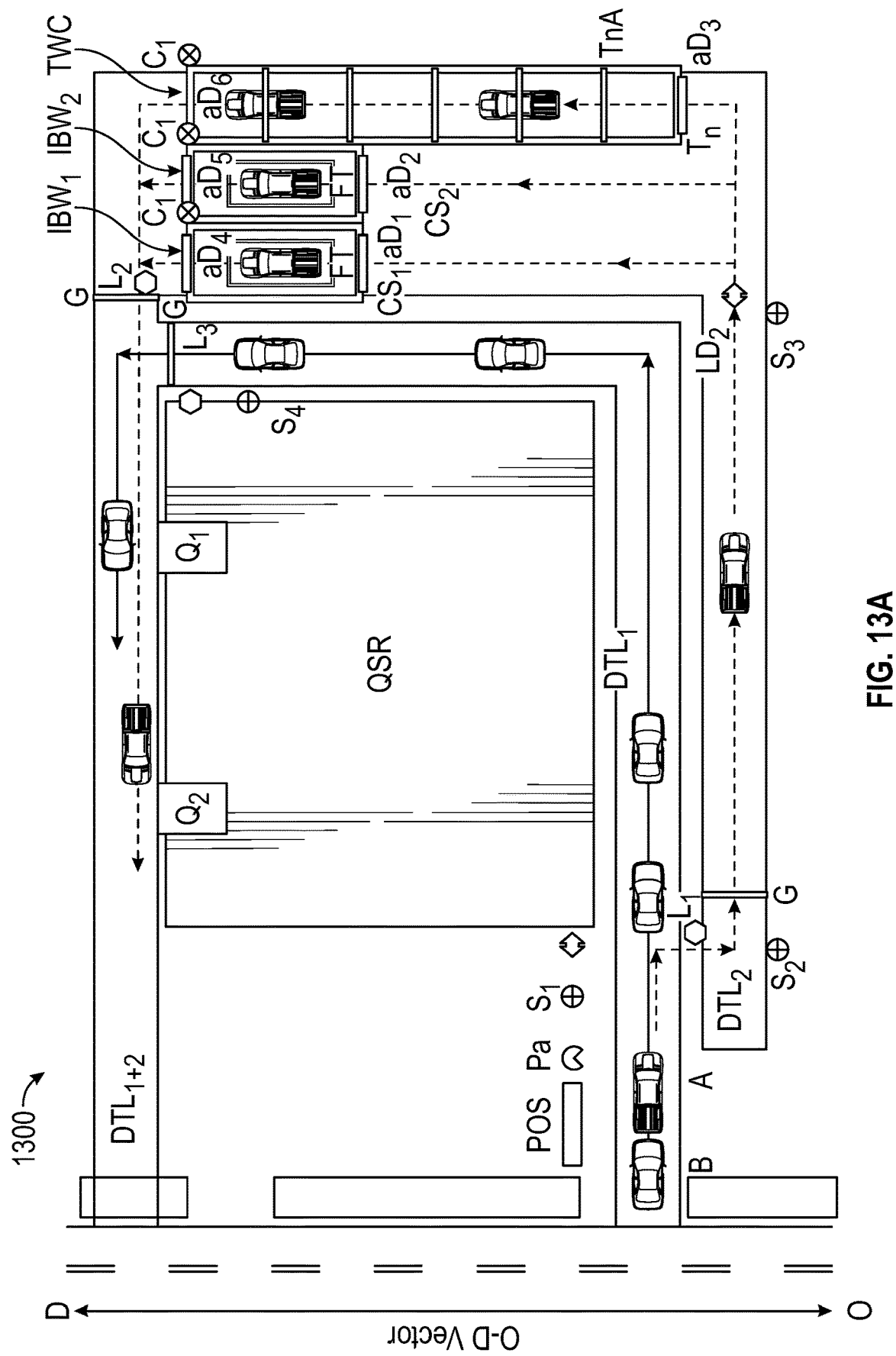
FIG. 13A is a diagram of an example facility that includes a QSR and a CW system that includes a plurality of automatic carwash apparatuses.

FIG. 13A illustrates another example implementation of system 100 (FIG. 1) in the form of a facility 1300 that includes a QSR, CW system, and traffic management system and is substantially the same in many respect to other facilities disclosed herein. In the illustrated example, facility 1300 includes a plurality of types of carwash modules, in the illustrated example, two IBWs (IBW1, IBW2) and one tunnel carwash (TCW). Vehicles are driven completely into the IBW structure and remain stationary and subsequently a carwash apparatus moves around the vehicle in the structure. In a TCW the driver gives up control of the car and the vehicle is moved through the carwash on a conveyor belt, or a chain device that moves or pulls the vehicle through the wash structure where different stationary apparatuses each with a different function come in contact with the moving vehicle. In one example, a first component may spray soap chemicals on the car, a second component may include rollers that clean with friction, a third component may contain high-pressure water hoses that spray any remaining chemicals off the vehicle and a fourth component may include high velocity blowers to dry the vehicle. The TWC requires a larger footprint than an IBW, however, it may provide a higher quality wash, and/or faster wash, and/or the capacity to wash a higher number of vehicles per unit of time as compared to a single IBW.

By having a variety of carwash module types, facility 1300 provides greater choice to customers and also provides more flexibility for a control system of the facility to maximize the ability to provide a carwash to each customer while not exceeding the dwell time associated with a food-only order. For example an IBW may be 'touchless system' by default, where the car is washed without physical contact by rollers simply by water, chemical, solutions, sprays and dryers. Another IBW may be dedicated to very rigorous washing desired by off-road vehicles, for example, while the TWC may offer yet other variables.

One or more of carwash modules IBW1, IBW2, and TCW, may be housed in permanent structures, or one or more may be housed in modular transportable structures. In some examples, facilities made in accordance with the present disclosure may include transportable CW modules that can me moved according to a traffic volume of the QSR establishment. A transportable modular CW structures may provide a variety of benefits, for example, a majority, e.g., two thirds, of the investment in the carwash module can be relocated, reduced, or upgraded, leaving the permanent site work, such as drainage, in place. The type of carwash can also be more easily changed, for example, an IBW may be replaced by a tunnel as customer demand for carwash services increases. Modular transportable carwash structures may, therefore, give greater flexibility for the QSR to respond to changing market conditions.

In some examples, a transportable modular CW apparatus may include a closed-loop self-contained water system that is designed to address two of the largest costs of any carwash operation, namely water and sewer costs while also meeting legal and environmental requirements regarding water usage and water discharge. In some examples, a transportable modular CW apparatus may be a self-contained system and may be designed to remove used chemical particles and suspended solids such as sand and dust from water in a water recycling system. In some examples, a transportable modular CW apparatus may be configured for biodegradable chemicals and may include a reverse osmosis and aeration system configured to process collected water to turn the water from anaerobic to aerobic thus reducing unwanted odors.

In some examples, a transportable modular CW apparatus may be configured with filters and ozone to remove odor and suspended solids and may include a system that applies cyclonic separation and bacteria to clean and recycle water. A self-contained purifying and recycling system and process allows for a fixed volume of water to be continuously re-used with minimal discharge and minimal water requirements. Such environmentally responsible business practices of conserving water and reducing waste may reduce any need for special permitting, while in addition would help to eliminate the need for an extensive utility infrastructure footprint, because the self-contained carwash system would draw water from one or more water reservoirs connected to the transportable modular CW apparatus and deliver recycled and processed water back to the reservoir for re-use. Such a system also reduces the burden on any existing municipal and regional sewage systems. Moreover such a self-contained water recycling system reduces any reliance on the water quality provided by a municipality, which may not be clean or inert enough for an optimal carwash. Such a system would also support environmentally friendly marketing and communication efforts to draw in consumers. Also, a transportable modular CW apparatus has the extra benefit that a carwash can be erected in less space, such as a QSR real estate footprint, and less time, and may be more independent of any governmental rate changes and importantly can be built without the need to special access to a substantial sanitary sewer systems on small wash sites.

A transportable modular CW apparatus may be housed in on-site erected permanent structures, in prefabricated buildings, or may be constructed in a versatile modular fashion, a method which would permit efficient erecting and, if needed, relocating a fully operational CW from one QSR to the another. Flexibility is introduced by adopting modular transportable structures, because both capacity and range of services by different types of carwashes can be upgraded or adjusted more easily such as an IBW may be replaced by a tunnel system, or a touchless system may be easily installed to replace existing roller type IBW. Moreover, two thirds of the investment in the modular carwash may be relocated, leaving only the permanent site work, such as drainage, behind.

A transportable modular carwash may be shipped to a QSR site with the equipment pre-installed within each modular section, or a fully modular equipment room may be supplied that may connect with modular sections that have the required connections such as wiring and piping so that the CW may instantly operate once connected. Modular CW structures may allow for greater quality consistency and construction and may be commenced as soon as zoning boards approve the drawings. Such off-site modular construction may begin concurrently while sites are being prepared. As zoning requirements are often regionally similar a faster roll out may be accomplished to develop a territory and the speed of staking a competitive advantage would only be limited by the availability and capability of transport vehicles capable of moving the large modular sections.

Figure 13B:
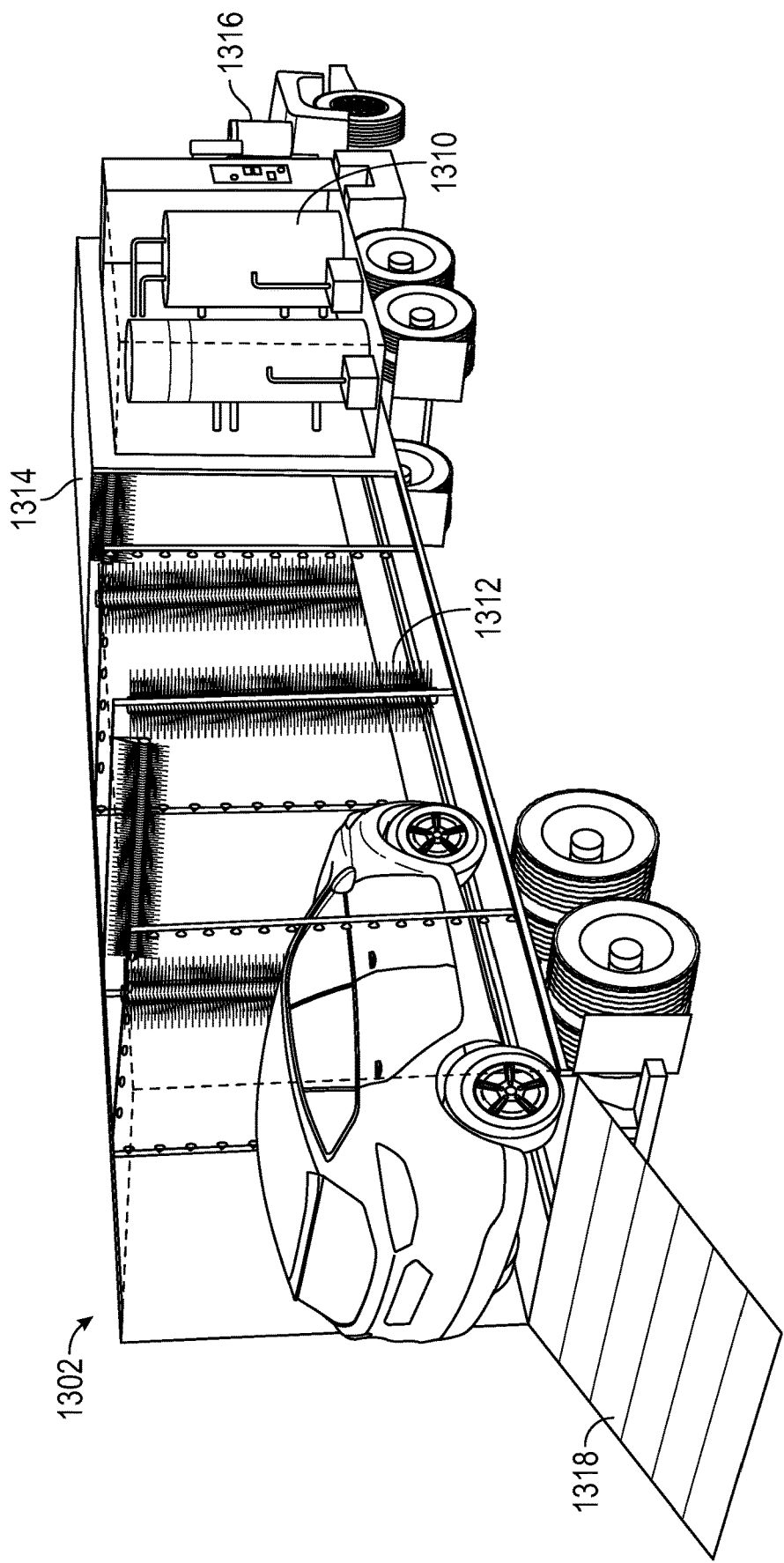
FIG. 13B is a perspective view of one example of a transportable modular CW apparatus.
Figure 13C:
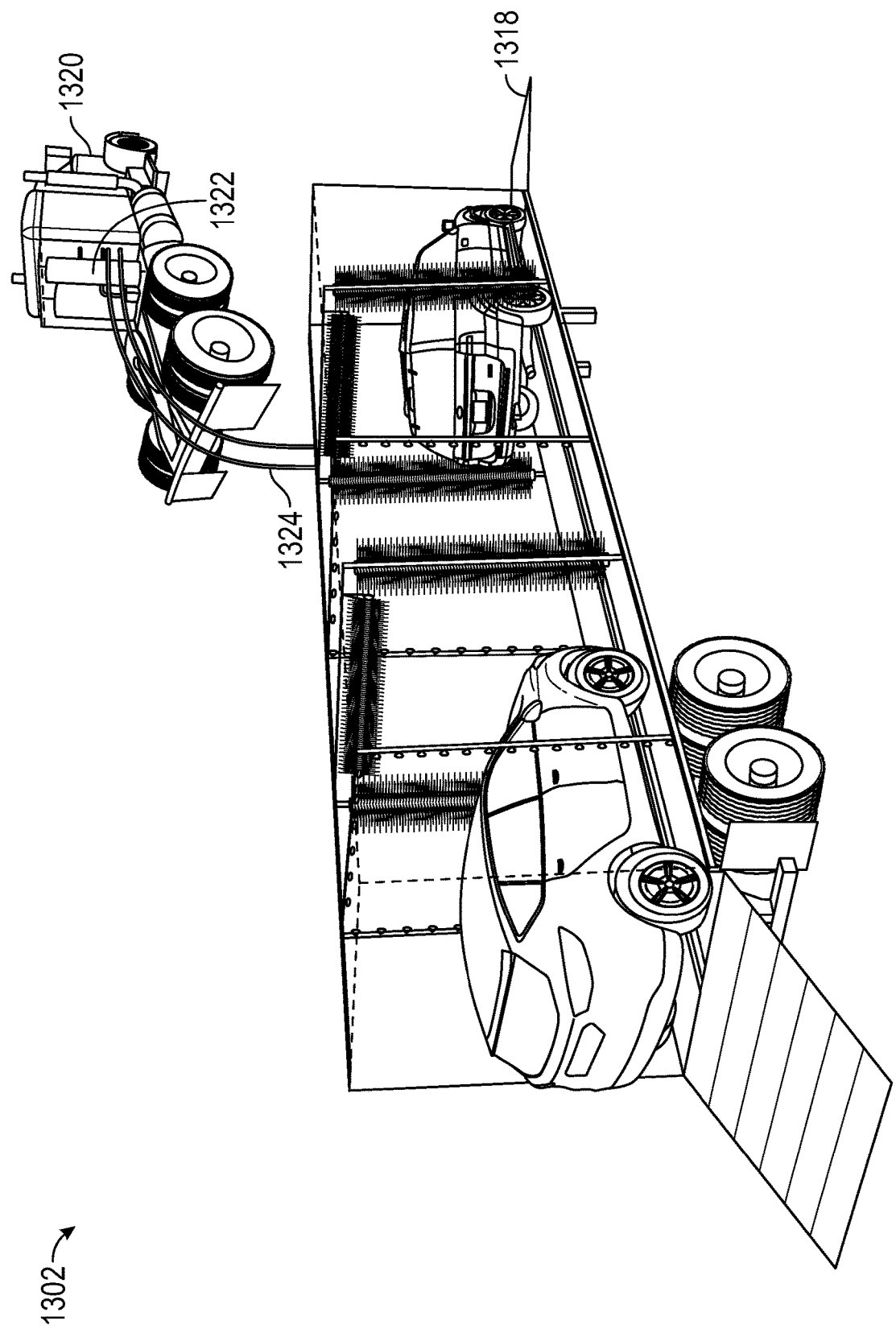
FIG. 13C includes additional view of the transportable modular CW apparatus of FIG. 13B.

FIGS. 13B and 13C illustrate one example of a transportable modular CW apparatus 1302 that is self-propelled under its own power so that it may be quickly and easily driven to a location as needed, for example at a QSR or convenience store. Such a self-propelled mobile carwash may combine the benefits of a closed water system 1310 with a fully equipped mobile section 1312, so that the CW operations can commence, without site preparations, as soon as zoning requirements are met and as fast as the mobile unit can arrive. In some examples, a mobile carwash may be solar powered, for example with solar roof panels 1314, and self-propelled or pulled in a truck-trailer configuration 1316 similar to a container shipment. The mobile unit may have on and off ramps 1318 or may be constructed so that the unit can be lowered to the ground for easy access of cars, with both an entrance and exit similar to an IBW or tunnel carwash (see FIG. 13C). In some examples, a mobile carwash may have a modular configuration, where a number of mobile units are connected to each other to expand the capacity of the carwash, or be connected to a separate equipment unit 1320, a separate closed-loop water containment system 1322, or for example a water tanker truck, the individual parts connected for example by way of hoses, pipes and cables 1324, on or underground. A mobile carwash unit may also be connected or become part of existing permanent carwashes to represent an instant capacity expansion and expansion of type of services.

Figure 14:
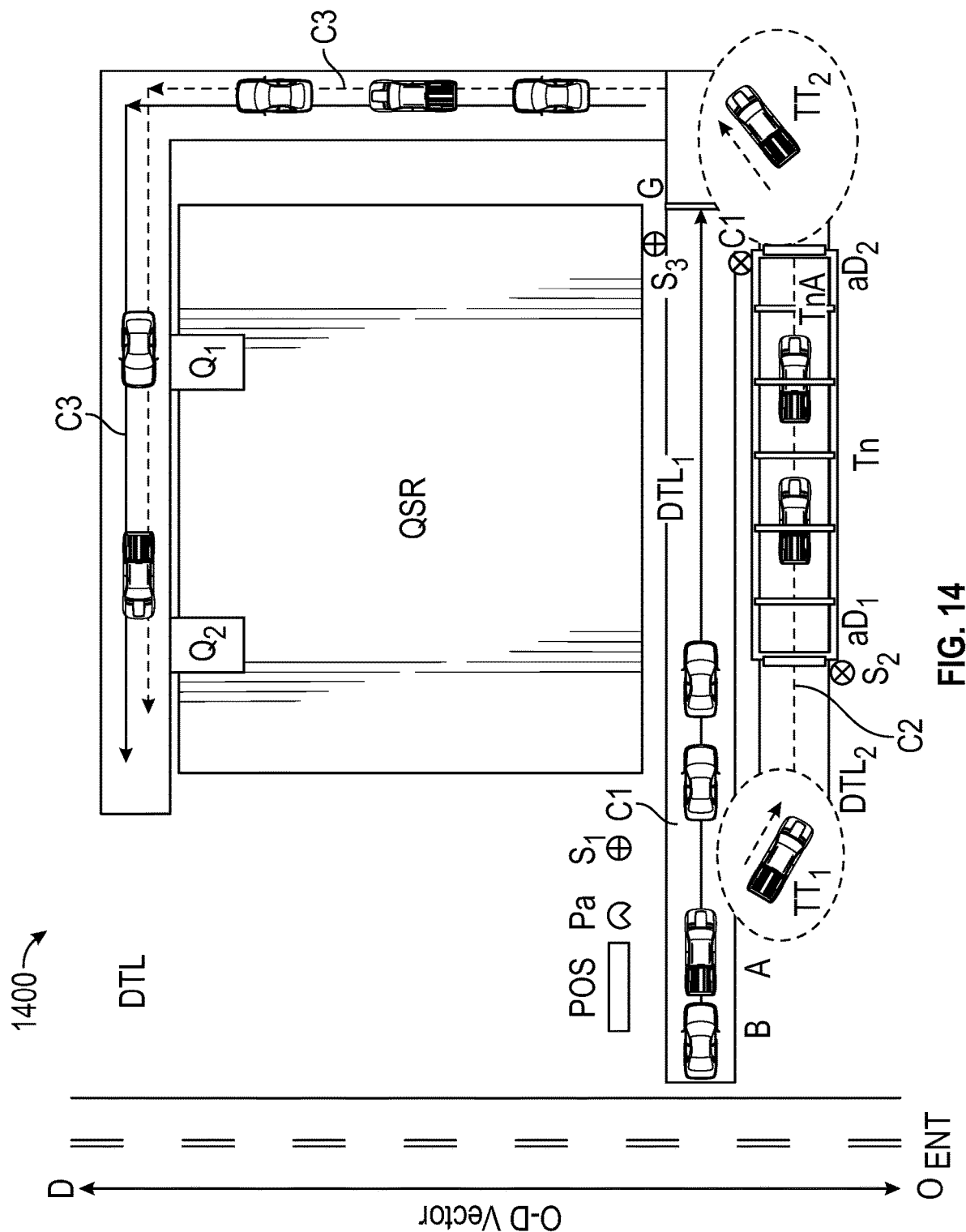
FIG. 14 is a diagram of an example facility that includes a QSR, a CW system, and a traffic management system that includes conveyor belts.

FIG. 14 illustrates another example implementation of system 100 (FIG. 1) in the form of a facility 1400 that includes a QSR, CW system, and traffic management system. In the illustrated example, vehicle A has ordered QSR items plus a carwash and vehicle B has only ordered QSR items. Here at, or near, the POS, both vehicles move onto conveyor belts C1 and C2 that may have a similar construction to TCW conveyor system. A traffic management system, with the aid of a car identification sensor S1 determines whether to convey each vehicle along conveyor C1 or C2 and in the illustrated example the traffic management system includes a turntable TT1 for controlling the conveyance of a vehicle to conveyor C1 or C2. In some examples a second turntable TT2 may be used to direct a vehicle after a car wash, for example at the exit of the illustrated TCW to a common conveyor C3 for conveying both vehicle types to payment window Q1 and food pickup window Q2. The traffic management system may be configured to operate TT2 to automatically convey vehicle A back to the common drive-through lane on conveyor C3, taking into account vehicle type B on conveyor C1 (DTL1) for example, by way of a sensor S3 and a gate G. The presence and number of vehicles on the conveys may be monitored by sensors which interface with the traffic management system, the traffic management system may be configured to controls a speed of conveyors C1 and C2 in order to efficiently merge the two streams of traffic.

Figure 15A:
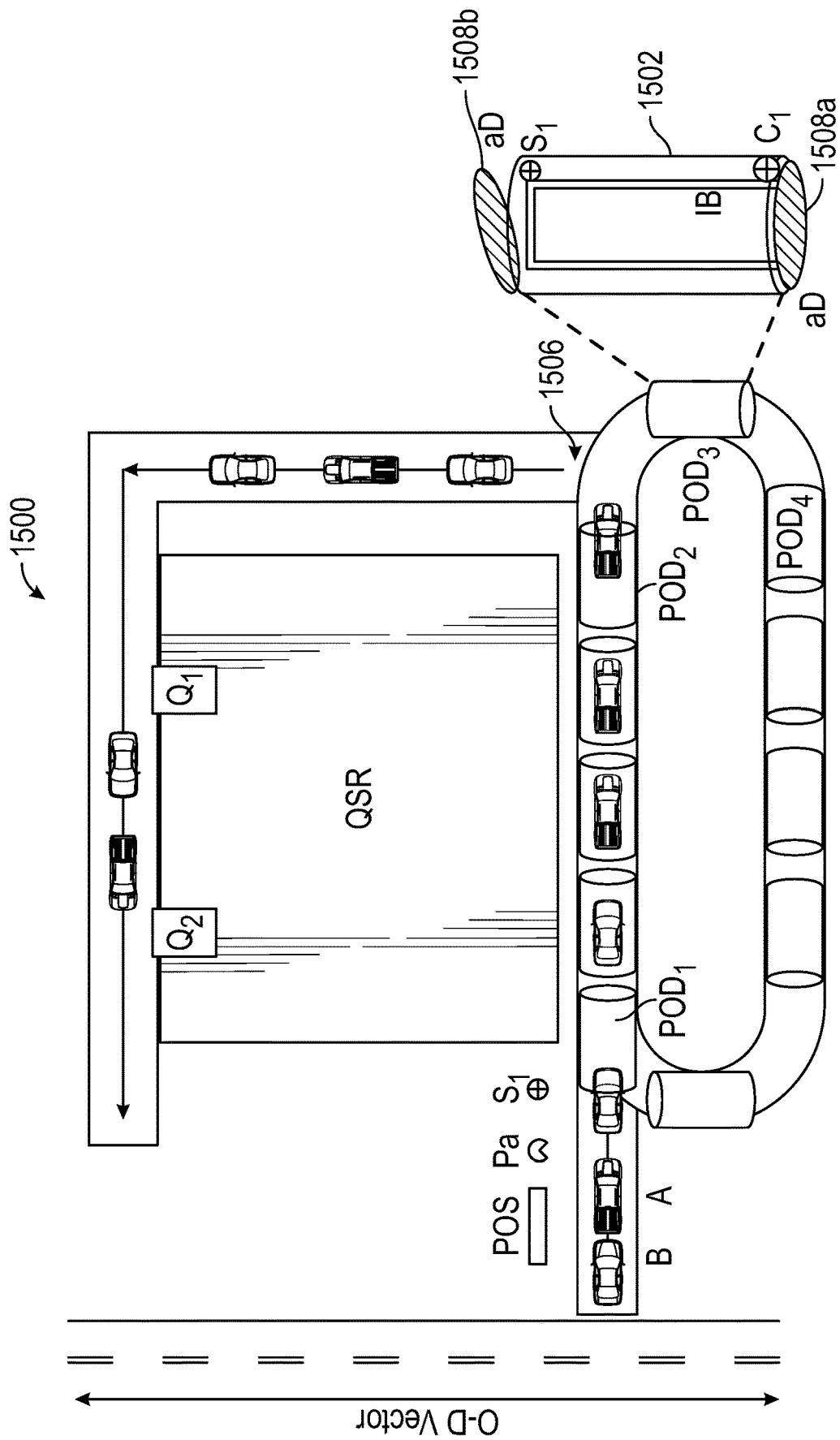
FIG. 15A is a diagram of an example facility that includes a QSR and a CW system that includes a plurality of mobile carwash pods.
Figure 15B:
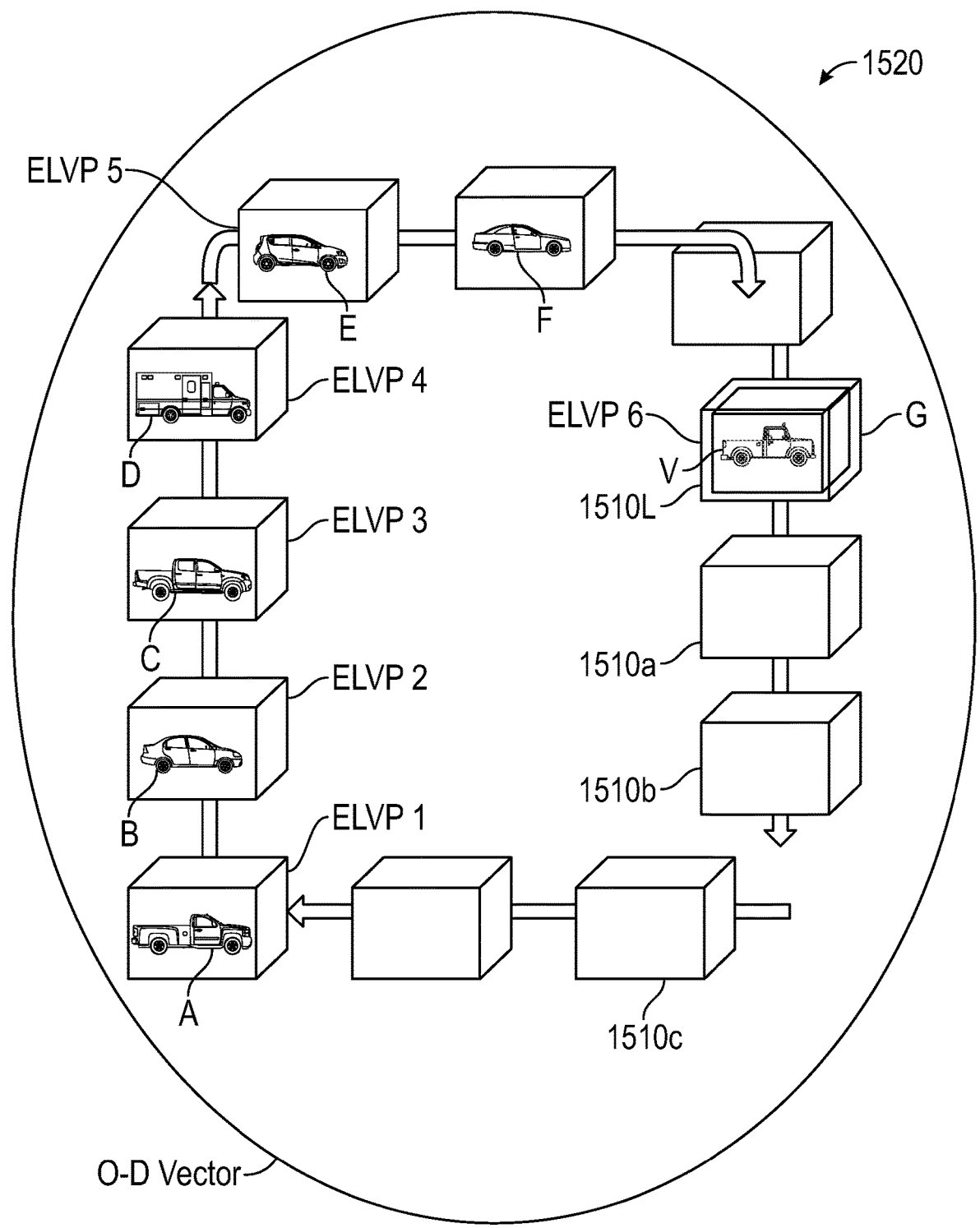
FIG. 15B is a diagram of another example facility that includes a QSR and a CW system that includes a plurality of mobile carwash pods.

FIG. 15 illustrates another example implementation of system 100 (FIG. 1) in the form of a facility 1500 that includes a QSR, CW system, and traffic management system. In the illustrated example, facility 1500 includes a plurality of mobile carwash pods (POD1, POD2, POD3 and POD4 labeled) that are configured to receive a vehicle after ordering at POS and simultaneously transport the vehicle and wash the vehicle as the vehicle is advanced along the drive through lane. In the illustrated example, each carwash pod (e.g. POD1-POD4) includes a self-contained capsule 1502 with self-supporting onboard systems 1504 for washing a vehicle. In one example, onboard systems 1504 may include one or more of water tanks, chemical and soap solution containers, and batteries. In another example, each POD may have connections to water, soap, power, etc., that allow for the POD to move while still remaining in fluid and electrical communication with the corresponding source. In one example, each POD may be continuously coupled to a drainage, for example, an open or closed ditch that extends along a path of the mobile PODs, or for example, by vacuum tubes that suck the fluids from the pod. In another example, each POD may have a waste storage tank with valves that periodically connect to a waste system, for example, after completion of a wash and prior to the commencement of a new wash. In one example, each POD may include docking valves and electric plugs. Once in position to commence a carwash, the docking valves connect with complementary valves that are connected to hoses that supply the carwash POD with water, chemical and other solutions and the plugs are automatically connected to electric sockets to supply the carwash apparatuses, lights and communication screens with power, or for example in a similar fashion as electric trams or buses, by a connecting rod to a life-wire circuit.

In the illustrated example, vehicle A having ordered both a QSR item and CW service at the POS is directed into POD1 (with carwash services inside). Vehicle A enters POD1 and after entry a first door 1508a closes to secure the capsule 1502 and POD1 begins to move. The PODs including POD1 may be mobile by way of a conveyor belt system or via wheels operatively attached to each POD that support the POD and allow it to roll along the DTL, which may include rolling along a track the wheels are captured in. By the time the POD reaches an end point 1506 the carwash cycle is complete, a second door 1508b opens allowing the vehicle to exit. Vehicle B, having only ordered from the QSR menu may either drive or be conveyed along without entry into a POD where the next POD remains stationary at a location adjacent POS until a vehicle orders a CW service, or vehicle B may be instructed to enter a POD but no carwash service is activated. By providing a plurality of mobile carwash modules (PODs) facility 1500 may have a relatively high carwash capacity in a relatively small footprint, which may be particularly advantageous for locations where real estate is limited. Facility enables a high carwash capacity for a larger volume of customers while minimizing wait time to enable the provision of CW services within the time frame required to prepare QSR menu items.

FIG. 15A illustrates another example of a facility 1520 that includes mobile carwash pods 1510a-1510l (only four labeled) wherein the pods are configured for vertical movement via an elevator mechanism, which may be especially useful for urban settings where space is limited. In one example, a choice of type of carwash is arranged in different elevators where, for example, elevator pod 1 (ELVP 1) contains a touch free carwash, while ELVP 2 contains a friction carwash type and ELVP 3 specializes in a wax treatment and ELVP 4 is specially configured to treat vehicles with dirt, etc. After a customer makes a selection, the ELVP of choice comes into position. In another example of an ELVP arrangement vehicles ride the elevator cycle as is exemplified in ELVP 6 where vehicle V has entered the O-D vector in position ELVP1 and rides the cycle until it is back in the same position. The O-D vector moves in a circular motion (first up, then sideways, then down again) whereby the elevator pods are fed with hoses and drainage pipes in a similar fashion as cables follow the elevator, at all times reducing the weight of the elevator carwash pod.

Figure 16:
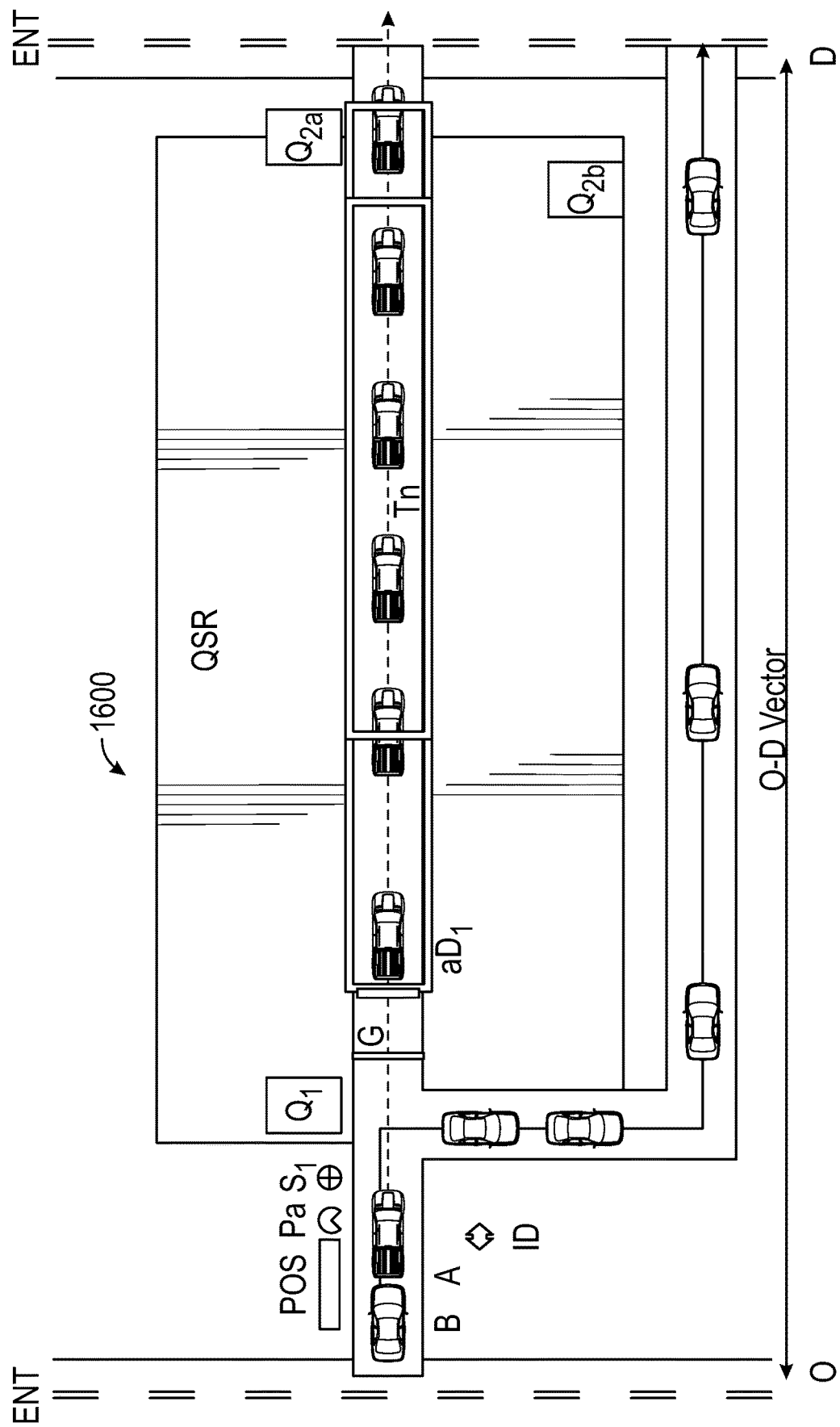
FIG. 16 is a diagram of an example facility that includes a QSR and a CW system that extends through an interior of the facility.
Figure 17:
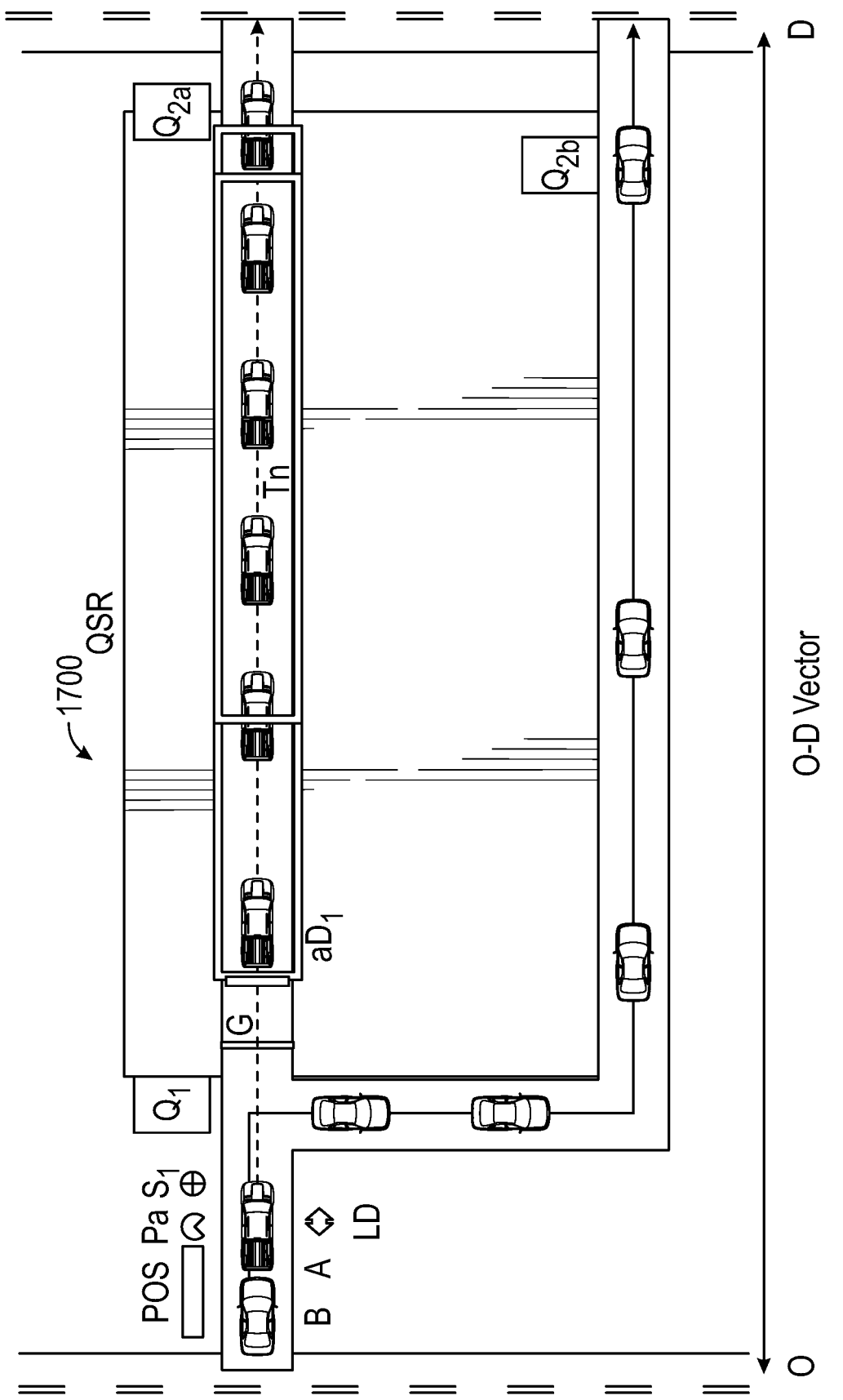
FIG. 17 is a diagram of another example facility that includes a QSR and a CW system that extends through an interior of the facility.

FIG. 16 illustrates another example implementation of system 100 (FIG. 1) in the form of a facility 1600 that includes a QSR, CW system, and traffic management system. In the illustrated example, facility 1600 is an exemplary environment configured to optimize the O-D vector whereby the QSR and CW drive-through operations are completely separated without a confluence at a pick-up window. Carwash services are integrated into a new structural design optimizing the utilization of the QSR real-estate. In this embodiment the drive-through with carwash services becomes the center of the structure optimizing premium real-estate and offering two types of impulse purchases at once, carwash and fast-food, with equal perceived importance. Vehicle type B (ordering strictly from the QSR menu, having paid either at the POS and payment option Pa or at payment window Q1 is directed, for example, by directional lights LD to follow the QSR traditional route, prevented by a gate G from entering the building, and directed to pick-up window Q2b to pick up the food order. Vehicles A, which have ordered from the QSR menu as well as the CW menu are directed to proceed into a tunnel carwash Tn. Upon completion the QSR food items are available at pick up window Q2a. The illustrated configuration makes it very apparent for vehicle A and B that they exit the QSR premises at the same, or nearly the same time, thereby encouraging the vehicle B customers to also order a carwash next time. FIG. 17 illustrates another example of a facility 1700 that is substantially the same as facility 1600 except for the location of the payment window Q1 (located within the QSR structure (FIG. 16) or outside (FIG. 17)).

Figure 18:
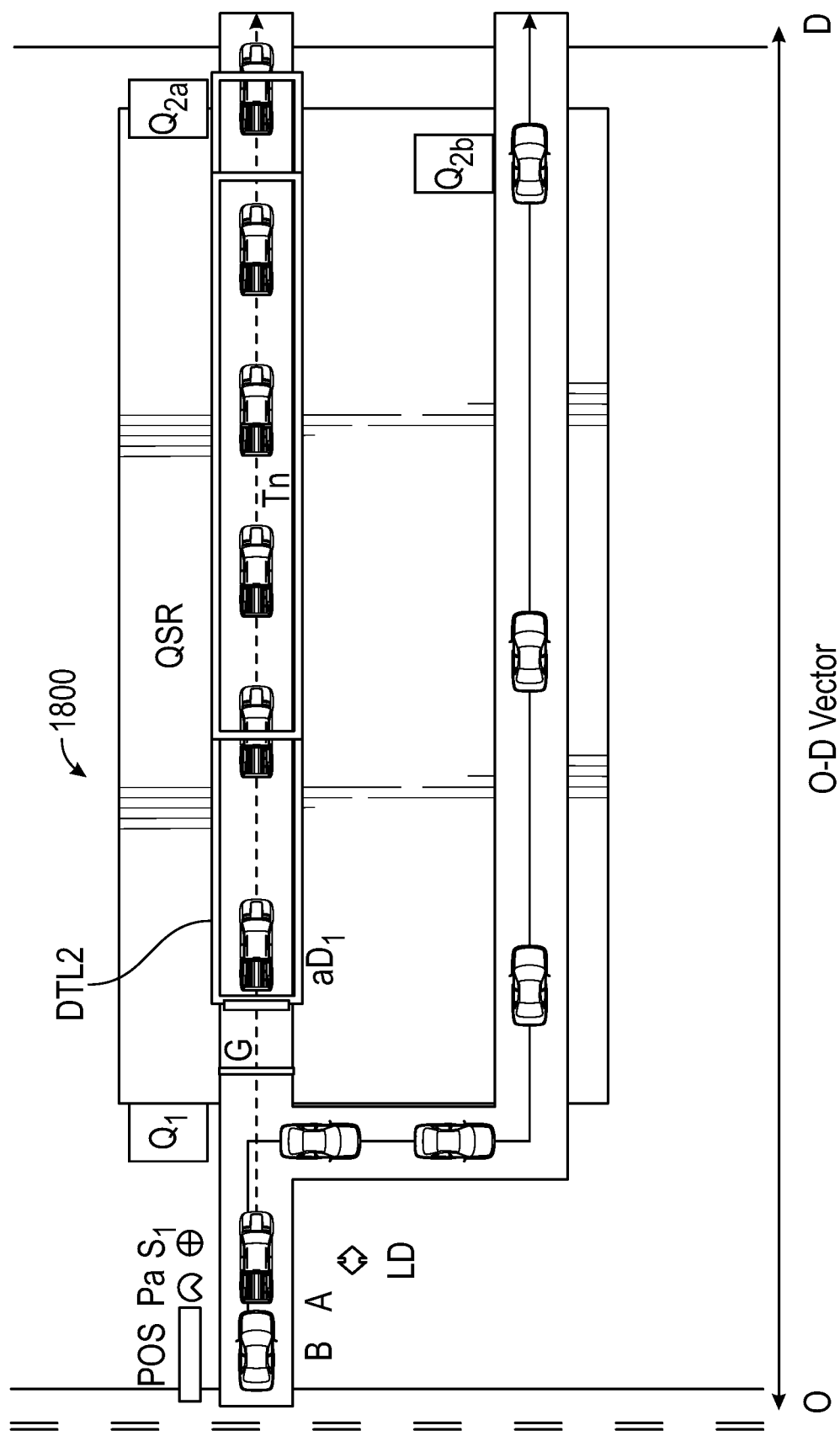
FIG. 18 is a diagram of an example facility that includes a QSR, a CW system that extends through an interior of the facility, and a QSR only drive though lane that also extends through an interior of the facility.

FIG. 18 illustrates another example implementation of system 100 (FIG. 1) in the form of a facility 1800 that includes a QSR, CW system, and traffic management system. In the illustrated example, both drive-through operations are embedded inside the QSR facility. The proximity of the QSR lane DTL1 and the QSR+carwash lane DTL2 inside the structure further facilitates the synergism gained from combining the QSR and CW services. As 70% or more of QSR orders are typically drive-through orders, the drive-through service is the most critical and most appreciated. Moreover since the two lanes DTL1, DTL2 are in closer proximity to each other, the traditional QSR customers in DTL 1 will be able to directly compare and observe that their dwell time is identical to that of customers in DTL 2 that have ordered both from the QSR menu and the carwash services. This observation may stimulate demand for additional carwash services in the future. Both types of customers can observe the inner operations of the QSR which may also stimulate demand for additional QSR items in their next visit. Drivers and passengers may chose to leave their vehicles, and allow the vehicles to proceed independently through the carwash. Upon completion of the carwash and, if applicable, having picked up their QSR orders, the drivers and passengers rejoin their vehicles.

Figure 19:
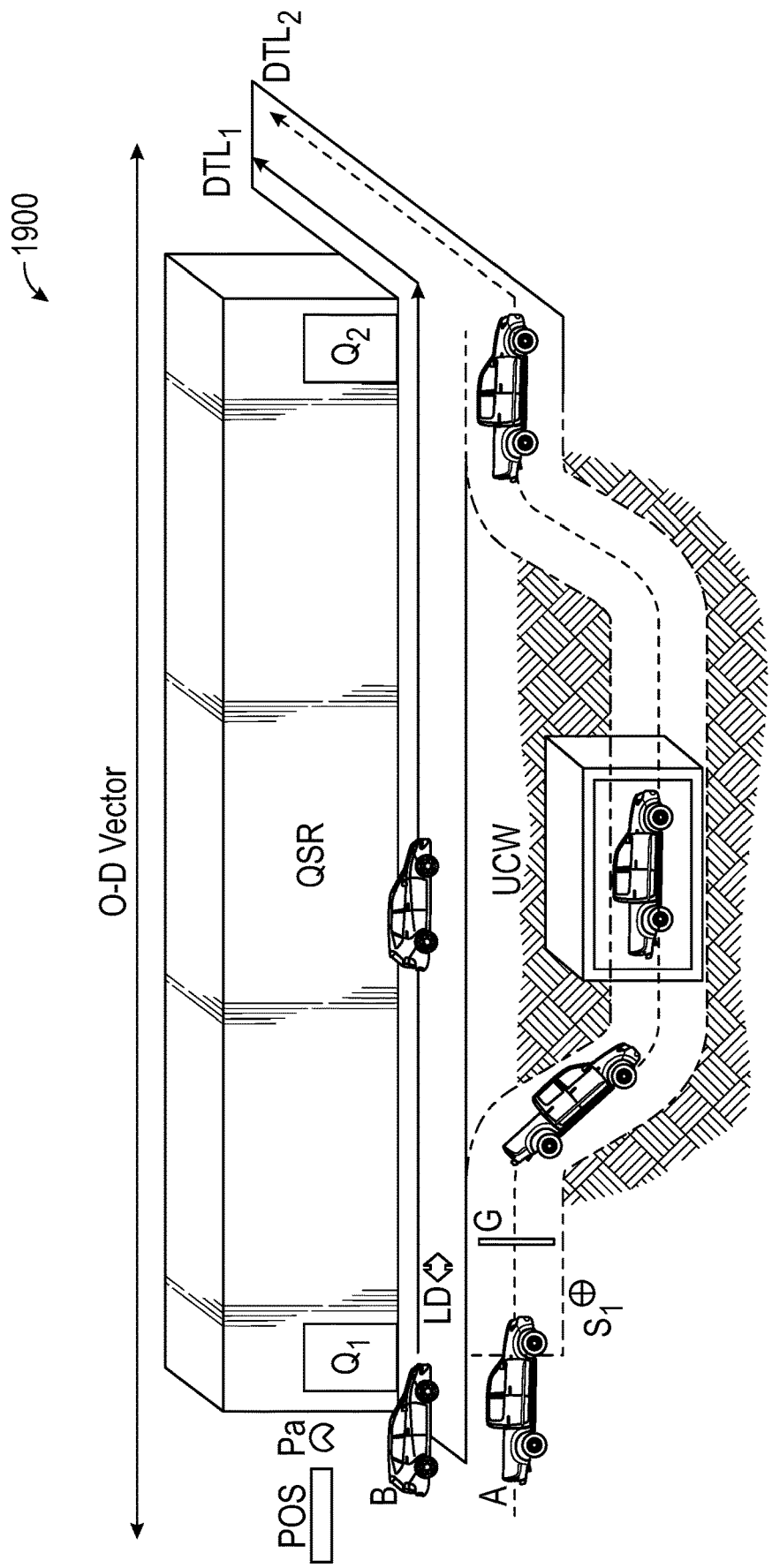
FIG. 19 is a diagram of an example facility that includes a QSR and an underground CW system.

FIG. 19 illustrates another example implementation of system 100 (FIG. 1) in the form of a facility 1900 that includes a QSR, CW system, and traffic management system. In the illustrated example, facility 1900 includes an underground carwash UCW which is beneficial in urban areas where a QSR may not have sufficient real estate to accommodate an above-ground carwash. The entrance to DTL1 and DTL 2 may be essentially the same as the entrance to a parking garage that includes a ground level parking lot and an underground parking lot. A POS located upstream of DTL 1 and DTL 2 may receive the customer's orders and a traffic management system may be configured to direct the customers to the underground DTL2 for a carwash before emerging again at ground level to merge with DTL 1 and proceed to the QSR order pickup window Q2.

Figure 20:
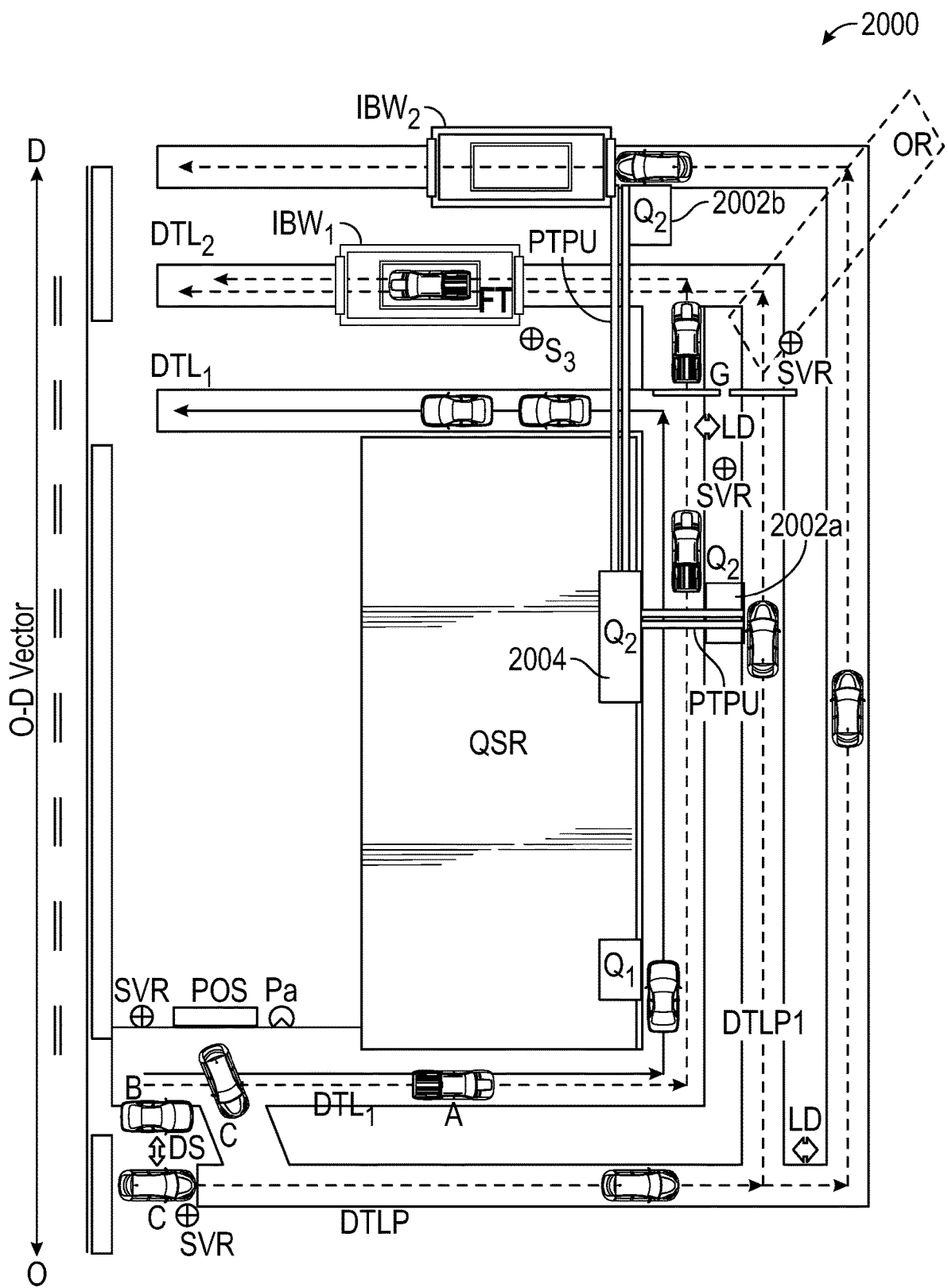
FIG. 20 is a diagram of an example facility that includes a QSR, a plurality of CW modules and a plurality of drive through lanes.

FIG. 20 illustrates another example implementation of system 100 (FIG. 1) in the form of a facility 2000 that includes a QSR, CW system, and traffic management system. In the illustrated example, facility 2000 provides various methods for paid QSR orders to be picked up in advance of a carwash and illustrates an alternate configuration where QSR food items are picked up prior to receiving a carwash. In the illustrated example, prepaid vehicle C enters the QSR premises in a traditional Drive-through lane (DTL1) and is identified by the vehicle recognition sensor (SVR). At the time of ordering, vehicle type C has also supplied the QSR with an expected time of arrival (ETA) and QSR has processed the order for the food to be timely ready for pick-up. Vehicle C is then directed to leave DTL1 and enter a separate prepaid drive-through lane DTLP. In another example, a QSR with a dedicated DTLP can invite prepaid vehicles type C to directly enter this DTLP by way of a directional signage SD at the point of origin of the O-D Vector, at the edge of the premises where a SVR identifies the vehicle. Upon registering the presence of vehicle C on the premises, the QSR kitchen management system may be configured to add vehicle C's order to a que of orders of vehicles on the premises according to the specific DTL and the order of the vehicles in each the DTL so that vehicle C's order is ready for pickup when it arrives at pickup window Q2. In the illustrated example, facility 2000 includes satellite pickup stations 2002a, 2002b that may be supplied by way of QSR staff transporting food orders from the main building of the QSR, who may reach the satellite pick-up stations for example by way of an underground connection. In another example, the satellite pick-ups stations 2002 may be supplied by way of a pneumatic tube-order delivery system PTPU supplied from order pick-up window Q2 2004. Another vehicle type vehicle A, which has paid for a carwash and a QSR order at payment window Q1, may proceed to food pick-up window Q2 2004 and, recognized by an SVR, is directed by LD and G to a DTL2 that includes an IBW1 CW module whereas vehicle B is directed by LD and G to DTL1 and allowed to proceed to an exit without receiving a carwash. Vehicle A proceeds to the IBW1 carwash with their QSR order, similar to prepaid vehicle C, which is directed to IBW2, so that customers may optimize their personal time by consuming their QSR orders while their cars are being washed. If vehicle C, or other type of vehicles in DTLP 1 have to exit before the carwash, they may use off-ramp OR to leave the QSR premises and vehicle type C may be recognized by an SVR on the OR so that it receives credit for a future carwash.

Figure 21:
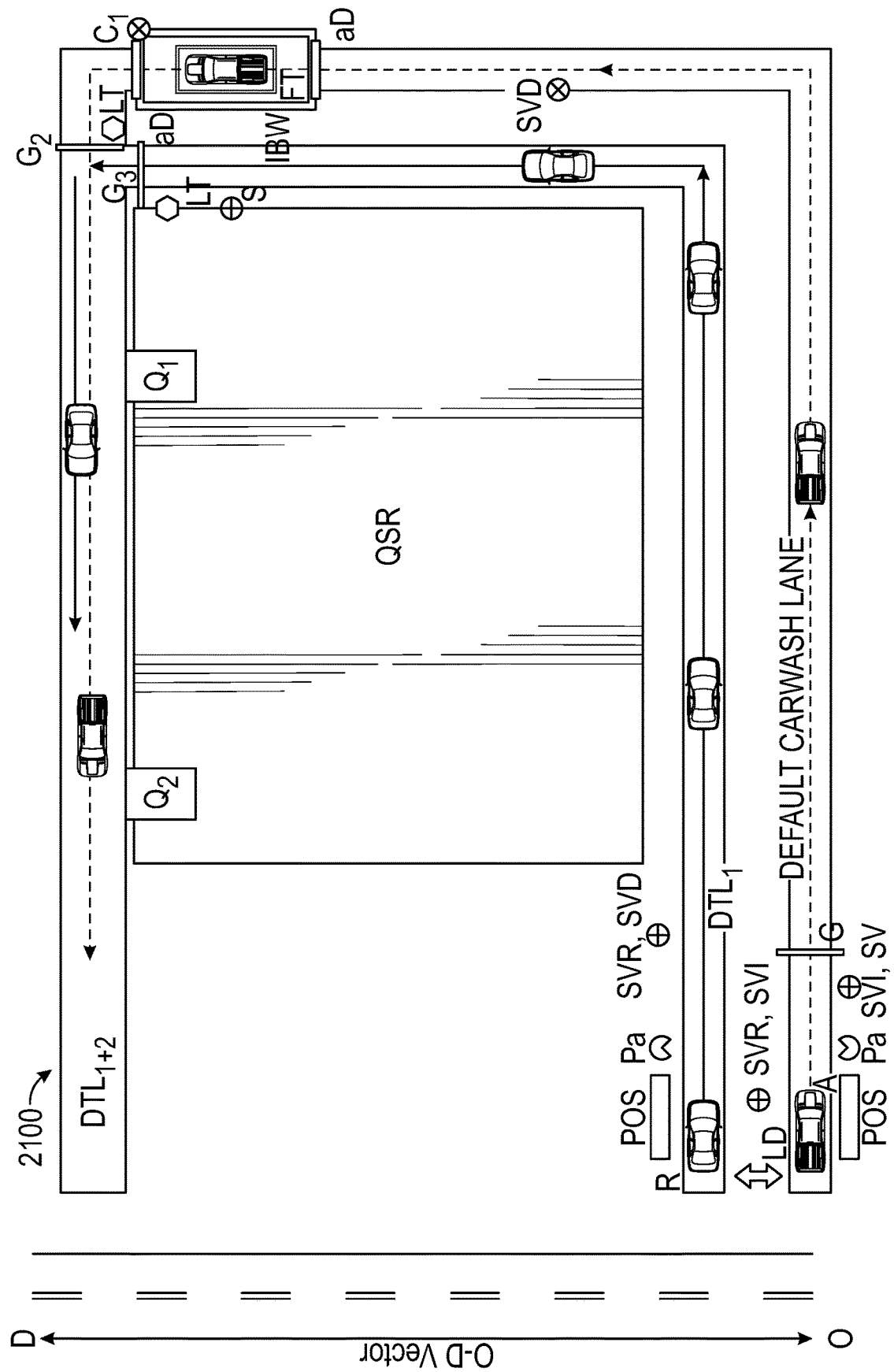
FIG. 21 is a diagram of an example facility that includes a QSR, a CW system and separate dedicated drive through lanes.

FIG. 21 illustrates another example implementation of system 100 (FIG. 1) in the form of a facility 2100 that includes a QSR, CW system, and traffic management system. In the illustrated example, facility 2100 includes one default drive-through lane for carwash customers and another drive through lane DTL1 for QSR only customers. Customers entering facility 2100 may thus make their decision to opt for a carwash before arriving at the facility and choose the corresponding default lane or DTL1. For customers who have pre-ordered and pre-paid via, for example, a mobile app, the traffic management system may be configured to identify those customers, for example, by license plate number, which may be entered by the customer during initial registration in the mobile application, and a directional traffic light directs those customers to the correct default lane. Similarly, other customers who have registered a preferred choice may be guided by the traffic management system to the correct lane. In some examples, the POS for the CW lane may only be configured to present CW menu options and/or may allow the user to only select CW menu options. After paying for w CW service and driving up to the IBW, the customer may be presented with QSR menu items, for example, via the user's user device 112. The user may then make a QSR order while his car is being washed in the IBW and be directed by the directional lights LT and gate G2 to the QSR pickup window Q2 if the customer made a food purchase and directed through an alternate exit route if he/she did not make a food purchase.

Figure 22:
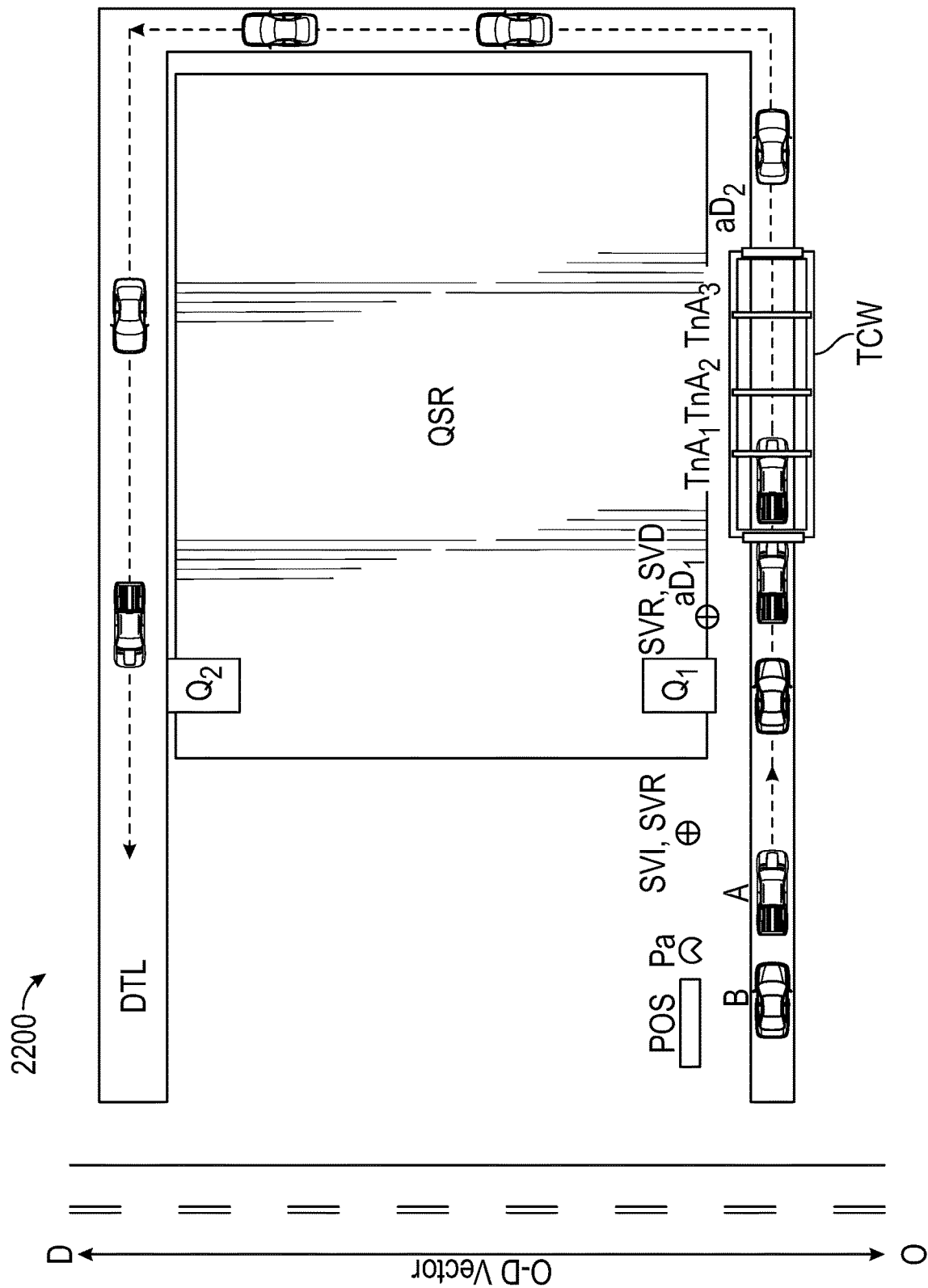
FIG. 22 is a diagram of an example facility that includes a QSR, a CW system that includes a tunnel carwash where all drive through traffic including customers that did not order a car wash is routed through the carwash tunnel.
Figure 23:
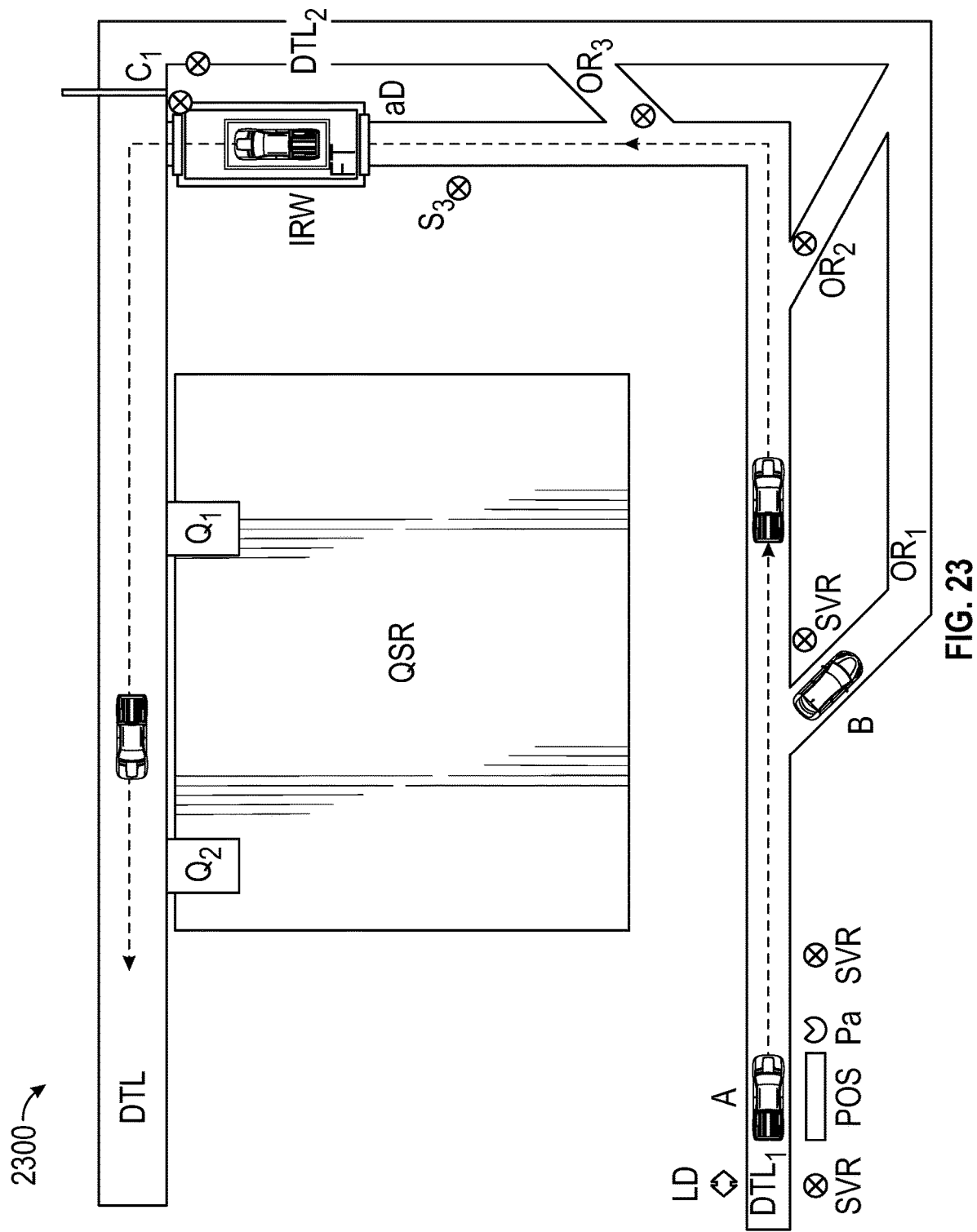
FIG. 23 is a diagram of an example facility that includes a QSR, a CW system and a drive through with off ramps.

FIG. 22 illustrates another example implementation of system 100 (FIG. 1) in the form of a facility 2200 that includes a QSR, CW system, and traffic management system. In the illustrated example, facility 2200 includes a single drive through lane for all customers that includes a tunnel carwash TCW. In the illustrated example, vehicle type A has ordered a carwash and vehicle type B has not. The vehicles are identified and recognized by SVI, SVR, and or SVD, for example, by merely recognizing the presence of the vehicle at the entrance to the TCW and an order in which the vehicles entered the drive though lane. TCW is activated when vehicle A enters and washes the vehicle according to the CW service that was selected while vehicle B is merely conveyed along TCW without activating the cleaning systems of the TCW. FIG. 23 illustrates an exemplary facility 2300 that is similar to facility 2200 (FIG. 22) where a carwash, here an IBW, is a default configuration for the QSR. If a customer chooses to opt-out of the paid carwash, vehicle B, for example, can take one of a series of off-ramps OR1, OR2, OR3 to exit the premises altogether and terminate the O-D vector voluntarily. Traffic management system can be configured to recognize vehicle B's premature departure and register a credit for the vehicle B customer for the unused carwash. Vehicle B after exiting may also rejoin the traffic flow at point C1 to complete the O-D vector and pick up their food order.

Figure 24:
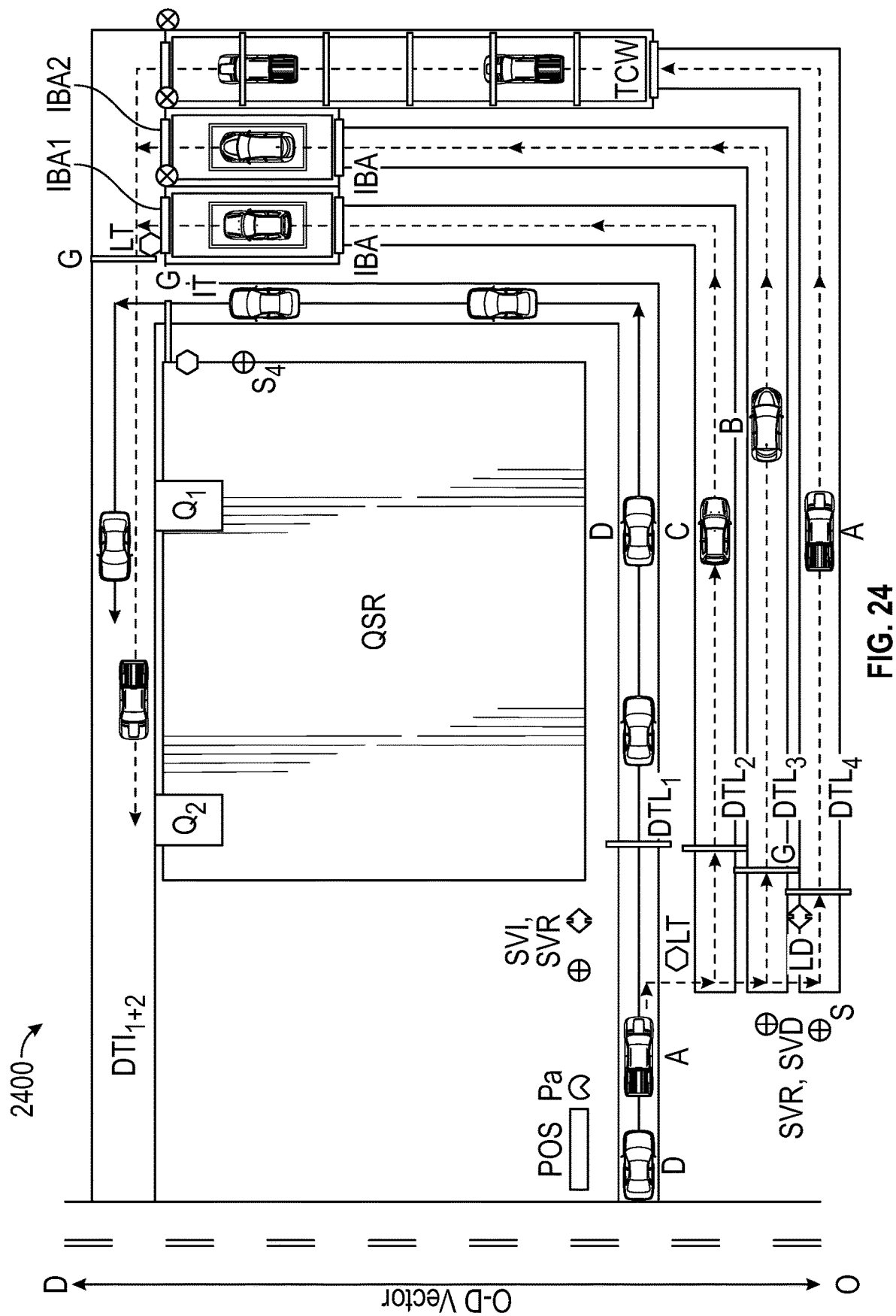
FIG. 24 is a diagram of an example facility that includes a QSR, a plurality of CW modules and a plurality of drive through lanes.

FIG. 24 illustrates another example implementation of system 100 (FIG. 1) in the form of a facility 2400 that includes a QSR, CW system, and traffic management system. In the illustrated example, facility 2400 includes a plurality of CW module types and is configured to direct vehicles according to their food order to a type of carwash module, or preferred other option, at all times optimizing the O-D vector for the customer. For example, vehicle A which may have been recommended, and subsequently confirmed an express carwash that offers zero additional wait time in the DTL is directed by a traffic management system to the appropriate type of carwash, for example an express carwash, and for example specifically a TCW given the properties of speed of a tunnel carwash. In another example, while at all times the aim is to optimize the O-D vector, the method provides for a balanced option which in some instances speeds up food preparations, or the order of food orders, together with a less speedy carwash option, for example by directing a vehicle to a slower IBA1 or IBA2 instead of the faster tunnel TCW in order to ensure that the food items are properly prepared to meet the overarching health and safety standards within the aim to ensure that all vehicles, with or without a carwash travel the O-D vector at the same time. In another example the method also provides for the traffic management system to adjust the speed of the individual carwash apparatuses, or control the traffic speed in the DTLs 1-4 by way of gates and traffic signals, or the speed of the conveyor on which the vehicles may be transported, or for example select faster or slower activating carwash solutions to maximize the customers' overall experience in the O-D vector.

Figure 25:
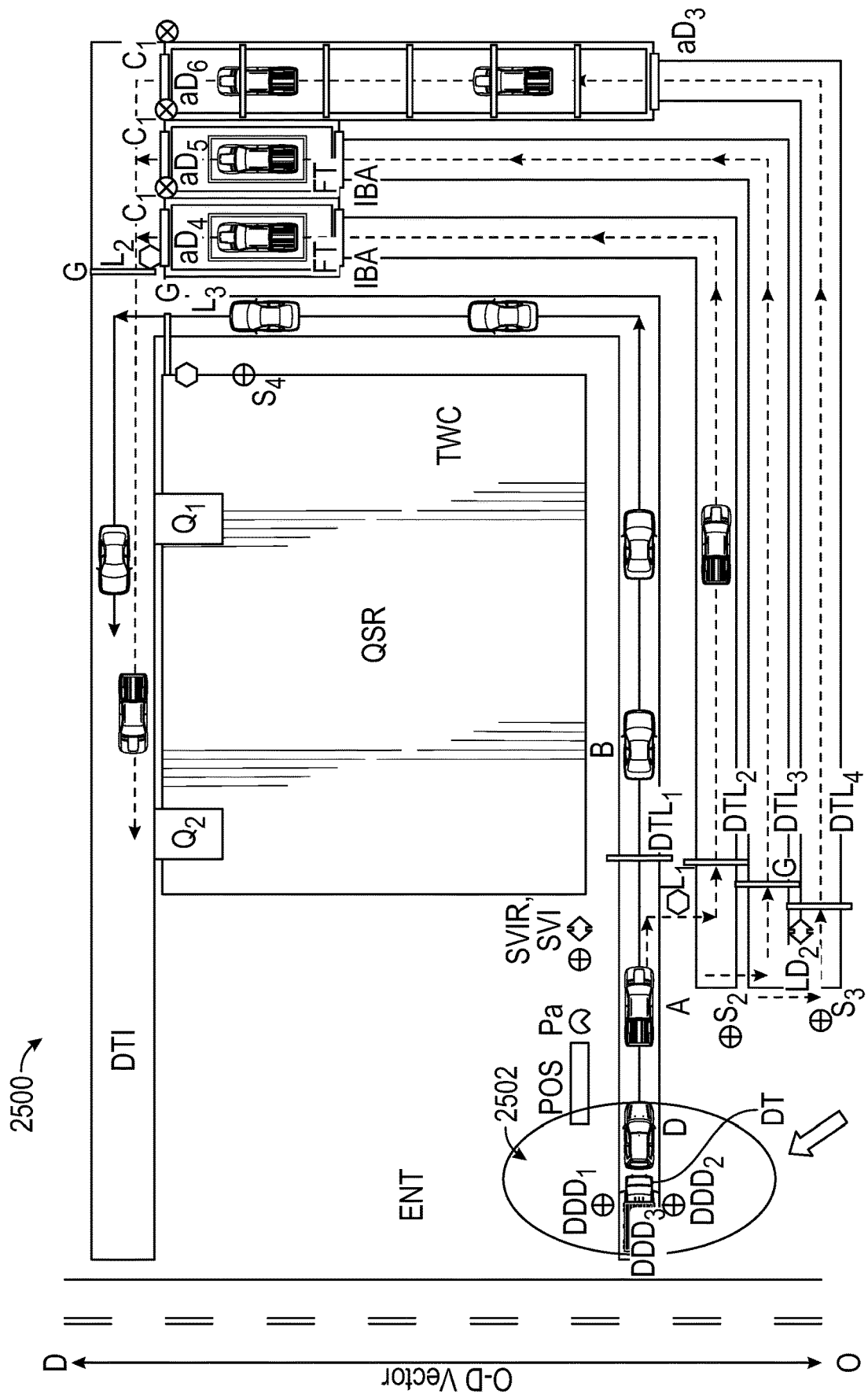
FIG. 25 is a diagram of another example facility that includes a QSR, a plurality of CW modules and a plurality of drive through lanes and also includes an automatic vehicle carwash diagnostic (AVCD) system.

FIG. 25 illustrates another example implementation of system 100 (FIG. 1) in the form of a facility 2500 that is substantially the same as facility 2400 but with the addition of an automatic vehicle carwash diagnostic (AVCD) system 2502 configured to perform a rapid diagnostic test and provide a recommendation for one or more CW services according to the results of the diagnostic analysis. In the illustrated example, after vehicle D crosses the entrance line ENT of the QSR, it immediately enters a diagnostic tunnel of system 2502. As the car moves through the diagnostic tunnel the state of cleanliness of the outside of the car is scanned and determined. In one example, the cleanliness of the car is determined with one or more cameras operably connected to a computing device, e.g., the server device 118 (FIG. 1), that are configured to execute a machine vision algorithm with instructions for determining a cleanliness of a vehicle. In one example, the machine vision algorithm may employ one or more of a periodic pattern detection filter, edge detection, and noise filtering to detect and segment out dirt areas on the vehicle. The extent of dirt areas can be used in conjunction with other variables, such as the customer's food order, to recommend one or more car washing options to provide a carwash menu option recommendation.

FIGS. 26A and 26B illustrate one example implementation of an automatic vehicle carwash diagnostic (AVCD) system 2502. Carwash diagnostics take place when the vehicle 2602 is moving and/or stationary. In one example, vehicle 2602 drives into a diagnostic tunnel 2604 and stops. A diagnostic scanner (DS) 2606 subsequently moves around the vehicle 2602 to determine the state of cleanliness of the outside of the vehicle. The diagnostic tunnel 2604 may also or alternately include one or more stationary sensors 2608, which may include cameras configured to capture images of the vehicle for image processing and the tunnel may also include one or more displays 2609 for displaying the status and results of a diagnostic analysis. Sensors 2608 may also include capacitive and acoustic sensors, for identifying dirt areas. In other examples, one or more of sensors 2608 and/or scanner 2606 may be located within a carwash system and/or may be located outside, for example adjacent or proximate a POS 106 or ordering window.

In one example sensors 2608 include a plurality of sensors lining interior walls 2610 of tunnel 2604, which may include sensors located in a ceiling and/or floor of the tunnel and positioned in a plurality of locations for evaluating the outer surface of a vehicle 2602 from top to bottom and from all angles. In some examples, AVCD 2502 may also include a sample collection system 2612, for example as part of the moving diagnostic scanner 2606 for collecting samples of material on an outer surface of a car, such as dirt, grime and debris including one or more of solid, liquid, or gaseous samples. The collection system 2612 may include one or more of a vacuum or collection wipe.

In some examples diagnostic analyses performed by AVCD 2502 include one or more of ultraviolet, infrared or visible light spectrometry, neutron activation analysis, mass spectrophotometry, and/or X-ray spectroscopy, which may be automatically compared against a database (e.g., database 126) of known spectra to determine the type of debris on the vehicle, gas or other types of chromatography and atomic absorption spectrophotometry. Sensors 2608 and/or scanner 2606 may further include one or more optical devices, e.g., a laser measurement device, for determining a thickness and composition of an existing wax coating on a surface of the vehicle. Diagnostics may also include analysis of an underside of each vehicle to detect excess oil and extent of debris and dirt as well as a tire analysis which may include contact and non-contact sensors for determining a flexibility of the rubber and tread life remaining. In some examples, diagnostics may also include molecular analyses and sensors 2608 and/or scanner 2606 may include scanning electron microscopes with energy dispersive x-ray spectroscopy to allow the identification of very small amounts of particles of dirt and debris and the subsequent analysis of the composition of individual particles with high accuracy.

Sensors 2608 and/or scanner 2606 may include a spectrometer configured to determine the composition of dirt and debris based on photon energy and the activity based on photon flux. In one example, the spectrometer is configured to detect and analyze radio nuclides from various types of environmental debris such as dust from rocks, minerals, sludge, slag, soil, plant, sediment and particulate matter found in, e.g., water droplets on the vehicle.

The results from the diagnostics analyses may be transmitted to other components of the system, e.g., system 100, including one or more of server device 118, carwash system 104 and POS 106 for determining a level of cleanliness of the exterior of the vehicle and identify and display recommended CW services according to the level of cleanliness. Carwash system 104 may also be configured to control a cleaning process according to the results of the analysis, for example, directing cleaning agents and water to areas of the car in greater need of cleaning. In some examples a user may be provided in an option for a rapid spot treatment rather than a full wash to obtain a carwash of short duration that cleans the areas in greatest need of cleaning prior to picking up the customer's food order.

Figure 27:
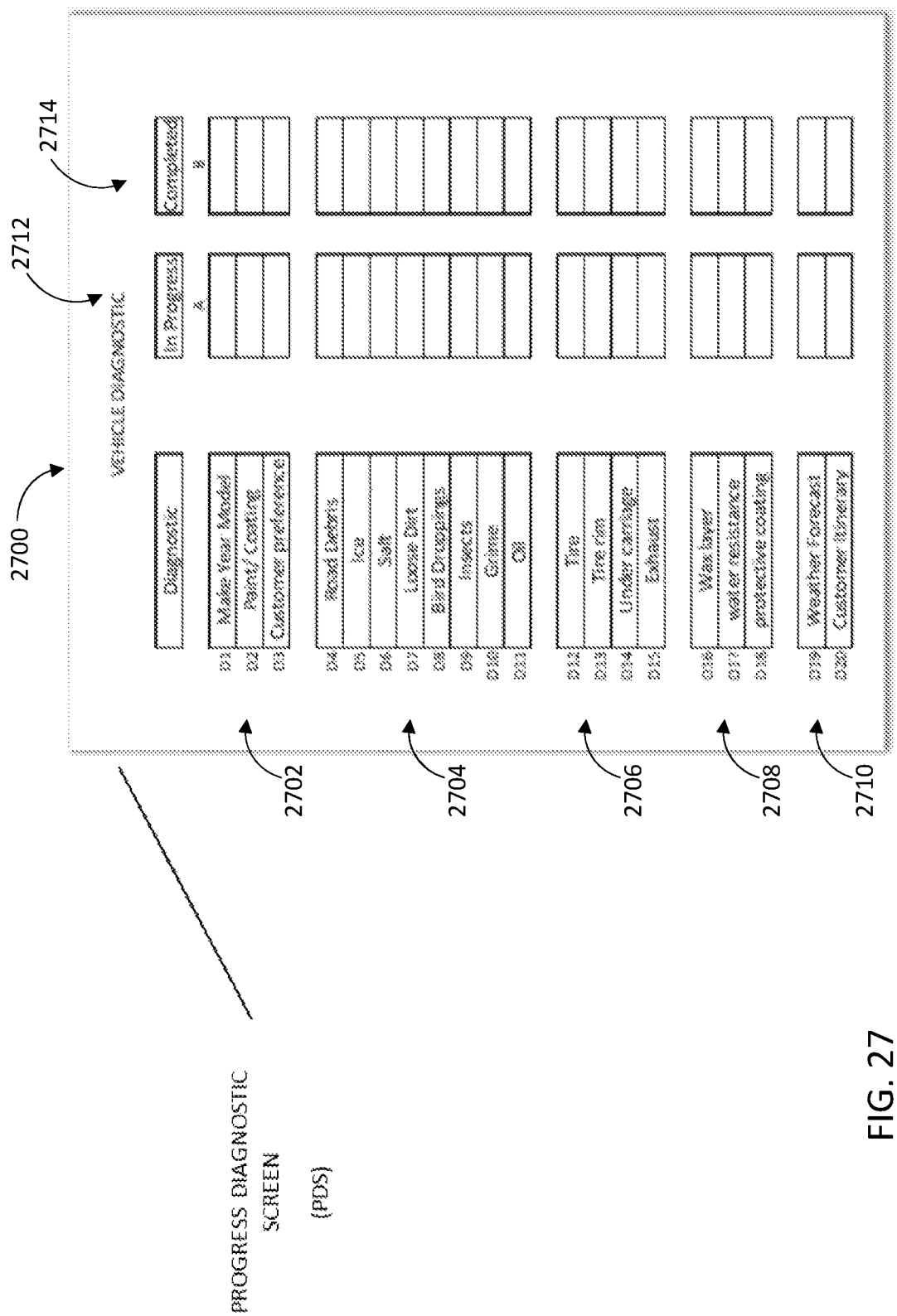
FIG. 27 illustrates an example GUI for communicating the progress of a diagnostic analysis being performed by an AVCD.

FIG. 27 illustrates an example GUI 2700 that may be displayed on display 2609 of AVCD 2502 for communicating the progress of a diagnostic analysis being performed by the AVCD and also illustrates example parameters D1-D20 that the AVCD may be determined to search for and analyze. In the illustrated example, the example parameters include baseline parameters 2702 such as make and model of vehicle and customer preferences. For example, particular carwash treatments may be recommended for certain makes and models according to material types and known issues such as known areas underneath the vehicle that are prone to collecting debris or rusting. In one example, sensors 2608 and/or scanner 2606 may include cameras and image processors determined to identify make and model from any identifying characteristics, such as VIN number, registration sticker, make logo, model name, etc. Parameters may also include cleanliness parameters 2704, structural parameters 2706, protective layer parameters 2708, and weather and travel parameters 2710. In some examples, drivers may be prompted, e.g. via display 2609 or a GUI displayed on user interface 114 user device 112, to add additional information to their custom carwash. For example, the driver may communicate that the vehicle may soon be driving a long distance through a desert, or a snowy mountain pass. The diagnostics status GUI 2700 may include indicators 2712 and 2714 for indicating the parameters being analyzed and when each parameter analysis is complete.

Figure 28:
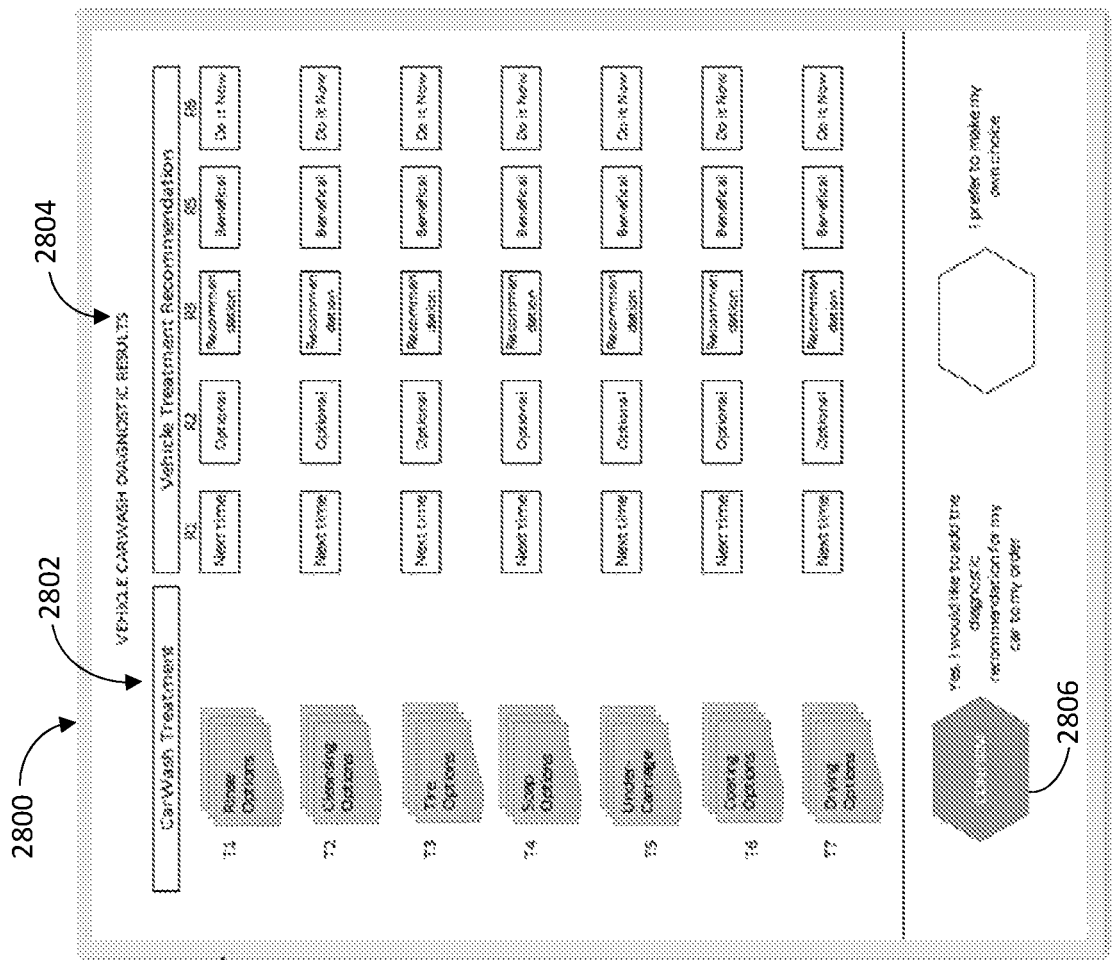
FIG. 28 illustrates an example GUI for communicating the results of a diagnostic analysis performed by an AVCD.

FIG. 28 illustrates an example GUI 2800 that may be displayed on display 2609 of AVCD 2502 and/or a POS station, e.g. displayed on user interface 108 of POS 106 that displays, according to the results of the diagnostic analysis performed by the AVCD, recommended carwash treatment options 2802 and an urgency level 2804 of each recommendation. The AVCD may also be configured to take customer preferences and the duration since the last carwash if such customer information is available, e.g., in customer data 138 of database 126. The AVCD may also be configured to take into account the time of year, and immediate weather forecast, to determine a best carwash treatment plan. Treatment recommendations may be based on a variation of the amount, length of time and sequence of the existing chemical solutions and carwash apparatuses, or a custom car treatment plan is recommended from a plurality of options for each particular carwash application. For example, input data suggesting wintery conditions may add a recommendation for preventive rust protector for the under-carriage, or an additional UV treatment in the wax coating may be recommended for sunny days, and a special hydrophobic rinse could be suggested for imminent inclement rainy weather. In another example, for a very dusty vehicle that is covered with thick layers of road debris, recommendations displayed on GUI 2800 may include a recommendation for a specifically designed treatment to addresses road debris that may include a custom-timed, extended pre-wash rinse to first remove the thick layers of debris. In another example, in response to detection of a grimy film on a vehicle, recommendations displayed on GUI 2800 may include an a la carte treatment available from a plurality of soap options T4 where, for example, a special de-greasing chemical solution is recommended to address the particular type of grime on the vehicle.

In the illustrated example, next to each of the recommendations 2802, an urgency level 2804 indicating the urgency of the treatment is displayed to the customer. For example, a diagnosis of an existing wax coating of the vehicle may conclude that the vehicle still has a reasonably sufficient wax coating. Here T6 would recommend a very light wax coating and the light R2/T6 (denoting 'optional treatment') would turn green, while the adjacent lights remain unlit. In another example, an analysis of the undercoating may show that no treatment is required at all; in this case light R1/T3 will turn green suggesting that the customer can wait until next time. The recommendations 2802 may take into account the time interval, or average time interval, when vehicles were last washed to help ensure that a very custom-wash package is presented to give the best care to the vehicle. In one example, GUI 2800 is presented to a customer when the customer pulls up to the POS or ordering window, the carwash recommendations intended to aid and encourage the driver to order a recommended wash package or add the carwash package to a QSR order.

The customer may accept the recommendation by hitting a confirm button 2806, or can select button 2808 if the customer would prefer to make his own selections. After completing the order, a traffic management system and carwash system may direct the vehicle to the proper type of carwash and the carwash apparatus preps, washes, waxes and dries according to the car diagnosis, measuring, and customer selection, for example, custom amounts and compositions of pre-wash and soap solutions that optimize the carwash for the particular condition of one specific vehicle, at a specific moment in time and place.

Embodiments of the present disclosure introduce systems and methods that may be used to increase profitability for a QSR establishment by way of an additional revenue stream, as well as increase customer satisfaction by way of offering carwash services or by increase sales volume of QSR menu items by adding a reduced price or free CW service. The examples disclosed herein include example implementations for configuring a QSR+CW facility and for optimizing traffic at the facility. Any piece, portion, element, system or aspect of any example disclosed herein may be combined with any piece, portion, element, system or aspect of any other example.

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 29:
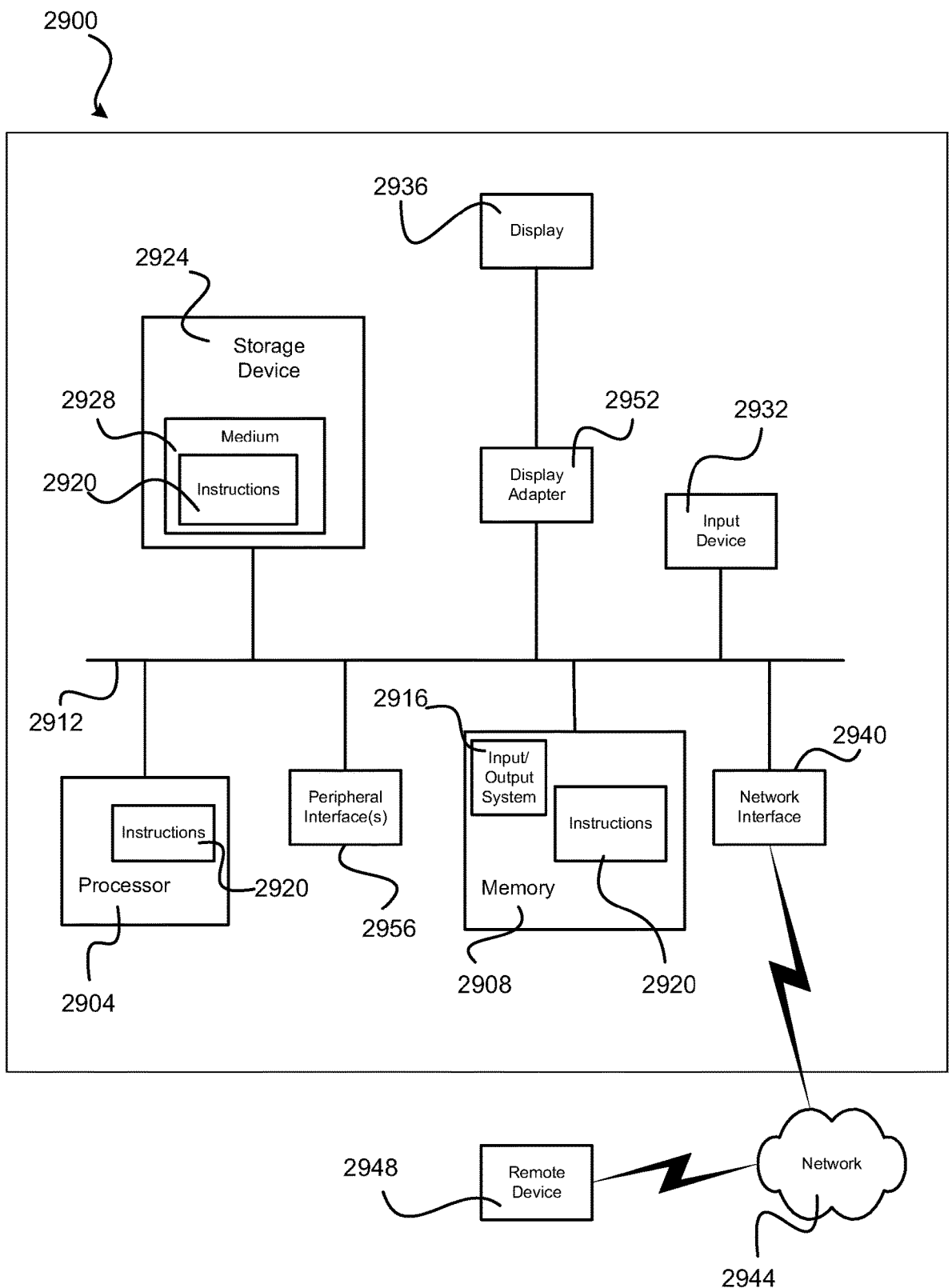
FIG. 29 is a functional block diagram of an example computing system.

FIG. 29 shows a diagrammatic representation of one embodiment of a computing device in the exemplary form of a computer system 2900 within which a set of instructions for causing a control system, such as system 100 of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2900 includes a processor 2904 and a memory 2908 that communicate with each other, and with other components, via a bus 2912. Bus 2912 may include any of several types of bus structures including, but not limited to, a memory bus, a memory controller, a peripheral bus, a local bus, and any combinations thereof, using any of a variety of bus architectures.

Memory 2908 may include various components (e.g., machine-readable media) including, but not limited to, a random access memory component, a read only component, and any combinations thereof. In one example, a basic input/output system 2916 (BIOS), including basic routines that help to transfer information between elements within computer system 2900, such as during start-up, may be stored in memory 2908. Memory 2908 may also include (e.g., stored on one or more machine-readable media) instructions (e.g., software) 2920 embodying any one or more of the aspects and/or methodologies of the present disclosure. In another example, memory 2908 may further include any number of program modules including, but not limited to, an operating system, one or more application programs, other program modules, program data, and any combinations thereof.

Computer system 2900 may also include a storage device 2924. Examples of a storage device (e.g., storage device 2924) include, but are not limited to, a hard disk drive, a magnetic disk drive, an optical disc drive in combination with an optical medium, a solid-state memory device, and any combinations thereof. Storage device 2924 may be connected to bus 2912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2924 (or one or more components thereof) may be removably interfaced with computer system 2900 (e.g., via an external port connector (not shown)). Particularly, storage device 2924 and an associated machine-readable medium 2928 may provide nonvolatile and/or volatile storage of machine-readable instructions, data structures, program modules, and/or other data for computer system 2900. In one example, software 2920 may reside, completely or partially, within machine-readable medium 2928. In another example, software 2920 may reside, completely or partially, within processor 2904.

Computer system 2900 may also include an input device 2932. In one example, a user of computer system 2900 may enter commands and/or other information into computer system 2900 via input device 2932. Examples of an input device 2932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2932 may be interfaced to bus 2912 via any of a variety of interfaces (not shown) including, but not limited to, a serial interface, a parallel interface, a game port, a USB interface, a FIREWIRE interface, a direct interface to bus 2912, and any combinations thereof. Input device 2932 may include a touch screen interface that may be a part of or separate from display 2936, discussed further below. Input device 2932 may be utilized as a user selection device for selecting one or more graphical representations in a graphical interface as described above.

A user may also input commands and/or other information to computer system 2900 via storage device 2924 (e.g., a removable disk drive, a flash drive, etc.) and/or network interface device 2940. A network interface device, such as network interface device 2940, may be utilized for connecting computer system 2900 to one or more of a variety of networks, such as network 2944, and one or more remote devices 2948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2944, may employ a wired and/or a wireless mode of communication. In general, any network topology may be used. Information (e.g., data, software 2920, etc.) may be communicated to and/or from computer system 2900 via network interface device 2940.

Computer system 2900 may further include a video display adapter 2952 for communicating a displayable image to a display device, such as display device 2936. Examples of a display device include, but are not limited to, a liquid crystal display (LCD), a cathode ray tube (CRT), a plasma display, a light emitting diode (LED) display, and any combinations thereof. Display adapter 2952 and display device 2936 may be utilized in combination with processor 2904 to provide graphical representations of aspects of the present disclosure. In addition to a display device, computer system 2900 may include one or more other peripheral output devices including, but not limited to, an audio speaker, a printer, and any combinations thereof. Such peripheral output devices may be connected to bus 2912 via a peripheral interface 2956. Examples of a peripheral interface include, but are not limited to, a serial port, a USB connection, a FIREWIRE connection, a parallel connection, and any combinations thereof.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

What is claimed is:

1. A computer implemented method for managing quick service restaurant (QSR) services and carwash (CW) services, the method comprising:
    displaying, on a graphical user interface (GUI), a plurality of QSR menu items, and a plurality of CW menu items;
    receiving, at a processor, QSR time duration information for the QSR menu items;
    receiving, at the processor, CW time duration information for the CW menu items;
    receiving, via the GUI, a selection of one or more of the QSR menu items;
    determining, by the processor, according to the received QSR time duration information, a predicted QSR order time duration to prepare the selected one or more QSR menu items;
    identifying, by the processor, according to the received CW time duration information, one or more of the CW menu items having a time duration that is less than or equal to the predicted QSR order time duration;
    displaying, on the GUI, an equal time indictor that identifies the identified one or more CW menu items to identify the CW menu items that could be added to an order of the selected one or more of the QSR menu items without increasing a wait time to receive the QSR menu items;
    in response to receiving an order via the GUI that includes one or more of the QSR menu items and none of the CW menu items:
        displaying a directional signal that directs a customer vehicle to a QSR pickup window and to bypass a CW system; and
        displaying QSR order information on a display screen of a QSR kitchen management system for preparing the selected one or more QSR menu items; and
    in response to receiving an order at the GUI that includes one or more of the QSR menu items and one or more of the CW menu items:
        displaying a directional signal that directs a customer vehicle to a CW system en route to a QSR pickup window; and
        displaying QSR order information on a display screen of a QSR kitchen management system for preparing the selected one or more QSR menu items.

2. The method of claim 1, wherein the received QSR time duration information includes at least one of real time data received from a QSR computing device coupled to the processor and historical data stored in one or more computer-readable storage devices coupled to the processor.

3. The method of claim 2, wherein the real time data includes at least one of food order que information, ingredient inventory levels, and kitchen equipment status.

4. The method of claim 3, wherein the historical data includes preparation times as a function of one or more of time of day, day of the year, weather conditions, and staffing level, and wherein determining the predicted QSR order time duration includes determining the predicted QSR order time according to the historical data and at least one of a current time of day, current day of the year, current weather conditions, or current staffing levels.

5. The method of claim 1, wherein the received CW time duration information includes at least one of real time data received from a CW computing device coupled to the processor and historical data stored in one or more computer-readable storage devices coupled to the processor.

6. The method of claim 5, wherein the identifying one or more of the CW menu items having a time duration that is less than or equal to the predicted QSR order time duration includes determining, by the processor, a predicted CW time duration for each of the CW menu items.

7. The method of claim 6, wherein the predicted CW time duration for each of the CW menu items is determined according at least one of a current time of day, current day of the year, or current weather conditions.

8. The method of claim 1, further comprising:
identifying, by the processor, one or more longer-duration CW menu items of the plurality of CW menu items having a time duration that is greater than the predicted QSR order time duration;
displaying, on the GUI, an additional time indicator for each of the longer-duration CW menu items that displays an estimated additional amount of time each of the longer-duration CW menu items would add to the predicted QSR order time duration.

9. The method of claim 1, wherein the displaying a directional signal includes at least one of displaying a directional signal on the GUI, activating a directional light of a drive through of a QSR or activating a traffic light of the drive through.

10. The method of claim 1, wherein the displaying an equal time indictor includes dynamically updating the equal time indicator in response to the user selecting and deselecting the QSR menu items.

11. The method of claim 1, further comprising:
displaying, on the GUI, a desired time portion that includes a user control element for entering a user-specified maximum wait time for a maximum amount of time a customer is willing to wait for a QSR order;
identifying, by the processor, according to the QSR time duration information and CW time duration information, ones of the QSR menu items and CW menu items that can be provided within the user-specified maximum wait time; and
displaying, on the GUI, one or more indicators identifying the identified ones of the QSR menu items and CW menu items that can be provided within the user-specified maximum wait time.

12. The method of claim 11, further comprising:
determining, by the processor, according to the QSR time duration information, CW time duration information, and user-specified maximum wait time, combinations of QSR menu items and CW menu items that can be provided within the user-specified maximum wait time; and
displaying, on the GUI, the combinations.

13. A non-transitory computer readable storage media storing one or more programs configured to be executed by a processor for managing quick service restaurant (QSR) services and carwash (CW) services, the one or more programs including instructions for:
displaying, on a graphical user interface (GUI), a plurality of QSR menu items, and a plurality of CW menu items;
receiving, at the processor, QSR time duration information for the QSR menu items;
receiving, at the processor, CW time duration information for the CW menu items;
receiving, via the GUI, a selection of one or more of the QSR menu items;
determining, by the processor, according to the received QSR time duration information, a predicted QSR order time duration to prepare the selected one or more QSR menu items;
identifying, by the processor, according to the received CW time duration information, one or more of the CW menu items having a time duration that is less than or equal to the predicted QSR order time duration;
displaying, on the GUI, an equal time indictor that identifies the identified one or more CW menu items to identify the CW menu items that could be added to an order of the selected one or more of the QSR menu items without increasing a wait time to receive the QSR menu items;
in response to receiving an order via the GUI that includes one or more of the QSR menu items and none of the CW menu items:
displaying a directional signal that directs a customer vehicle to a QSR pickup window and to bypass a CW system; and
displaying QSR order information on a display screen of a QSR kitchen management system for preparing the selected one or more QSR menu items; and
in response to receiving an order at the GUI that includes one or more of the QSR menu items and one or more of the CW menu items:
displaying a directional signal that directs a customer vehicle to a CW system en route to a QSR pickup window; and
displaying QSR order information on a display screen of a QSR kitchen management system for preparing the selected one or more QSR menu items.

14. The non-transitory computer readable storage media of claim 13, wherein the received QSR time duration information includes at least one of real time data received from a QSR computing device coupled to the processor and historical data stored in one or more computer-readable storage devices coupled to the processor.

15. The non-transitory computer readable storage media of claim 14, wherein the real time data includes at least one of food order que information, ingredient inventory levels, and kitchen equipment status.

16. The non-transitory computer readable storage media of claim 15, wherein the historical data includes preparation times as a function of one or more of time of day, day of the year, weather conditions, and staffing level, and wherein determining the predicted QSR order time duration includes determining the predicted QSR order time according to the historical data and at least one of a current time of day, current day of the year, current weather conditions, or current staffing levels.

17. The non-transitory computer readable storage media of claim 13, wherein the received CW time duration information includes at least one of real time data received from a CW computing device coupled to the processor and historical data stored in one or more computer-readable storage devices coupled to the processor.

18. The non-transitory computer readable storage media of claim 17, wherein the identifying one or more of the CW menu items having a time duration that is less than or equal to the predicted QSR order time duration includes determining, by the processor, a predicted CW time duration for each of the CW menu items.

19. The non-transitory computer readable storage media of claim 18, wherein the predicted CW time duration for each of the CW menu items is determined according at least one of a current time of day, current day of the year, or current weather conditions.

20. The non-transitory computer readable storage media of claim 13, the instructions further comprising:

identifying, by the processor, one or more longer-duration CW menu items of the plurality of CW menu items having a time duration that is greater than the predicted QSR order time duration;

displaying, on the GUI, an additional time indicator for each of the longer-duration CW menu items that displays an estimated additional amount of time each of the longer-duration CW menu items would add to the predicted QSR order time duration.

21. The non-transitory computer readable storage media of claim 13, wherein the displaying a directional signal includes at least one of displaying a directional signal on the GUI, activating a directional light of a drive through of a QSR or activating a traffic light of the drive through.

22. The non-transitory computer readable storage media of claim 13, wherein the displaying an equal time indictor includes dynamically updating the equal time indicator in response to the user selecting and deselecting the QSR menu items.

23. The non-transitory computer readable storage media of claim 13, the instructions further comprising:

displaying, on the GUI, a desired time portion that includes a user control element for entering a user-specified maximum wait time for a maximum amount of time a customer is willing to wait for a QSR order;

identifying, by the processor, according to the QSR time duration information and CW time duration information, ones of the QSR menu items and CW menu items that can be provided within the user-specified maximum wait time; and displaying, on the GUI, one or more indicators identifying the identified ones of the QSR menu items and CW menu items that can be provided within the user-specified maximum wait time.

24. The non-transitory computer readable storage media of claim 23, the instructions further comprising:

determining, by the processor, according to the QSR time duration information, CW time duration information, and user-specified maximum wait time, combinations of QSR menu items and CW menu items that can be provided within the user-specified maximum wait time; and displaying, on the GUI, the combinations.

25. A system for managing quick service restaurant (QSR) services and carwash (CW) services, the system comprising:

an electronic device configured to display a graphical user interface (GUI);

a processor coupled to the electronic device; and a non-transitory computer-readable storage media storing one or more programs configured to be executed by the processor, the one or more programs including instructions for:

displaying, on a graphical user interface (GUI), a plurality of QSR menu items, and a plurality of CW menu items;

receiving, at the processor, QSR time duration information for the QSR menu items;

receiving, at the processor, CW time duration information for the CW menu items;

receiving, via the GUI, a selection of one or more of the QSR menu items;

determining, by the processor, according to the received QSR time duration information, a predicted QSR order time duration to prepare the selected one or more QSR menu items;

identifying, by the processor, according to the received CW time duration information, one or more of the CW menu items having a time duration that is less than or equal to the predicted QSR order time duration to identify the CW menu items that could be added to an order of the selected one or more of the QSR menu items without increasing a wait time to receive the QSR menu items;

displaying, on the GUI, an equal time indictor that identifies the identified one or more CW menu items;

in response to receiving an order via the GUI that includes one or more of the QSR menu items and none of the CW menu items:

displaying a directional signal that directs a customer vehicle to a QSR pickup window and to bypass a CW system; and displaying QSR order information on a display screen of a QSR kitchen management system for preparing the selected one or more QSR menu items; and in response to receiving an order at the GUI that includes one or more of the QSR menu items and one or more of the CW menu items:

displaying a directional signal that directs a customer vehicle to a CW system en route to a QSR pickup window; and displaying QSR order information on a display screen of a QSR kitchen management system for preparing the selected one or more QSR menu items.

26. The system of claim 25:

wherein the received QSR time duration information includes at least one of real time data received from a QSR computing device coupled to the processor and historical data stored in one or more computer-readable storage devices coupled to the processor; and wherein the received CW time duration information includes at least one of real time data received from a CW computing device coupled to the processor and historical data stored in the one or more computer-readable storage devices.

* * * * *